(12) United States Patent
Peto et al.

(10) Patent No.: US 12,308,630 B2
(45) Date of Patent: *May 20, 2025

(54) ADJUSTABLE INSERT SYSTEM FOR WALL-MOUNTED ENCLOSURES

(71) Applicant: Leviton Manufacturing Co., Inc., Melville, NY (US)

(72) Inventors: Anthony Charles Peto, Seattle, WA (US); Ryan Moore, Seattle, WA (US); Dean Lipke, Mill Creek, WA (US); John Seger, Brier, WA (US)

(73) Assignee: LEVITON MANUFACTURING CO., INC., Melville, NY (US)

( * ) Notice: Subject to any disclaimer, the term of this patent is extended or adjusted under 35 U.S.C. 154(b) by 570 days.

This patent is subject to a terminal disclaimer.

(21) Appl. No.: 17/534,504

(22) Filed: Nov. 24, 2021

(65) Prior Publication Data

US 2022/0085586 A1 Mar. 17, 2022

Related U.S. Application Data

(63) Continuation of application No. 16/188,966, filed on Nov. 13, 2018, now Pat. No. 11,228,167.

(51) Int. Cl.
*H02G 3/14* (2006.01)
*H02G 3/08* (2006.01)
(Continued)

(52) U.S. Cl.
CPC .............. *H02G 3/14* (2013.01); *H02G 3/081* (2013.01); *H02G 3/10* (2013.01); *H02G 3/12* (2013.01)

(58) Field of Classification Search
CPC .................................. H02G 3/14; H02G 3/085
See application file for complete search history.

(56) References Cited

U.S. PATENT DOCUMENTS

| 2,371,210 A | 3/1945 | Atkinson |
| 2,927,149 A | 3/1960 | Kern, Jr. |

(Continued)

FOREIGN PATENT DOCUMENTS

| CA | 2791583 C | 9/2014 |
| CA | 2985012 A1 | 2/2018 |

OTHER PUBLICATIONS

Notice of Allowance mailed Feb. 1, 2023 for U.S. Appl. No. 17/318,990, 21 pages.

(Continued)

*Primary Examiner* — Don M Anderson
(74) *Attorney, Agent, or Firm* — Amin, Turocy & Watson, LLP

(57) ABSTRACT

A wall-mounted enclosure assembly utilizes insertable door mounting components that allow the enclosure door to be easily mounted to the enclosure main housing without the use of tools and in a manner that easily sets the door installation depth to match the depth of the surrounding drywall. After the enclosure main housing is mounted in the wall, insertable mounting components that serve as hinges and latches for the door are inserted into slots formed on the vertical sides of the main housing. The insertable mounting components can be inserted to a desired depth but cannot be withdrawn from the slots until a release tab is pressed. The installation depth of the hinges and latches is correctly set to match the thickness of the drywall merely by inserting the insertable mounting components until a stopping surface on the components abuts the drywall.

19 Claims, 47 Drawing Sheets

(51) Int. Cl.
    *H02G 3/10*           (2006.01)
    *H02G 3/12*           (2006.01)

(56) References Cited

U.S. PATENT DOCUMENTS

| | | | |
|---|---|---|---|
| 4,433,732 A | 2/1984 | Licht et al. | |
| 4,449,015 A | 5/1984 | Hotchkiss et al. | |
| 5,741,102 A | 4/1998 | Everett et al. | |
| 6,940,012 B2 | 9/2005 | Case | |
| 7,086,554 B2 | 8/2006 | Ehret et al. | |
| 7,737,360 B2 * | 6/2010 | Wiemeyer | H04Q 1/13 |
| | | | 361/679.01 |
| 8,109,785 B2 | 2/2012 | Kidman | |
| 8,672,601 B2 | 3/2014 | Nitsche | |
| 8,967,571 B2 | 3/2015 | James | |
| 9,258,919 B1 | 2/2016 | Rose | |
| 9,470,867 B1 * | 10/2016 | James | G02B 6/4471 |
| 9,496,697 B1 * | 11/2016 | Wentworth | H02G 3/088 |
| 9,534,728 B2 | 1/2017 | Harji et al. | |
| 2006/0265853 A1 * | 11/2006 | Povolny | H02B 1/30 |
| | | | 29/469 |
| 2007/0063008 A1 | 3/2007 | El-Afandi | |
| 2007/0131299 A1 | 6/2007 | Kornbleet | |
| 2007/0175649 A1 | 8/2007 | Moselle | |
| 2008/0006430 A1 * | 1/2008 | Chen | G06F 1/181 |
| | | | 174/66 |
| 2008/0213652 A1 * | 9/2008 | Scheucher | B60L 8/003 |
| | | | 429/97 |
| 2008/0236884 A1 | 10/2008 | Arbel | |
| 2009/0173397 A1 | 7/2009 | Mallela et al. | |
| 2010/0025064 A1 | 2/2010 | Nelson | |
| 2011/0164373 A1 | 7/2011 | Sanders | |
| 2011/0278060 A1 * | 11/2011 | Rajvanshi | H02G 3/085 |
| | | | 174/666 |
| 2013/0269999 A1 * | 10/2013 | Cortes Rico | H05K 5/0214 |
| | | | 174/547 |
| 2014/0041928 A1 | 2/2014 | Yamamoto et al. | |
| 2016/0105977 A1 * | 4/2016 | Harji | F16M 11/00 |
| | | | 248/346.03 |
| 2016/0164271 A1 * | 6/2016 | Franck | H03H 7/00 |
| | | | 174/480 |
| 2016/0295722 A1 * | 10/2016 | Franck | H02G 3/081 |
| 2016/0365711 A1 | 12/2016 | Lalancette et al. | |
| 2019/0140437 A1 * | 5/2019 | Chen | H05K 5/0004 |
| 2019/0319443 A1 | 10/2019 | Claessens | |
| 2020/0015377 A1 * | 1/2020 | O'Connor | H05K 5/0004 |
| 2020/0153214 A1 * | 5/2020 | Vaught | H01R 13/74 |
| 2020/0153217 A1 * | 5/2020 | Peto | H02G 3/12 |
| 2020/0165808 A1 | 5/2020 | Carolan | |
| 2021/0044097 A1 * | 2/2021 | Peto | H02G 3/088 |
| 2021/0265826 A1 * | 8/2021 | Peto | H02G 3/085 |
| 2022/0085586 A1 * | 3/2022 | Peto | H02G 3/123 |

OTHER PUBLICATIONS

Non Final Office action received for U.S. Appl. No. 16/537,159 dated Oct. 23, 2020, 19 Pages.

Notice of Allowance received for U.S. Appl. No. 16/537,159 dated Feb. 12, 2021, 19 Pages.

Non Final Office action received for U.S. Appl. No. 16/188,966 dated May 17, 2021, 22 Pages.

Non Final Office Action received for U.S. Appl. No. 17/318,990 dated Sep. 22, 2022, 24 pages.

* cited by examiner

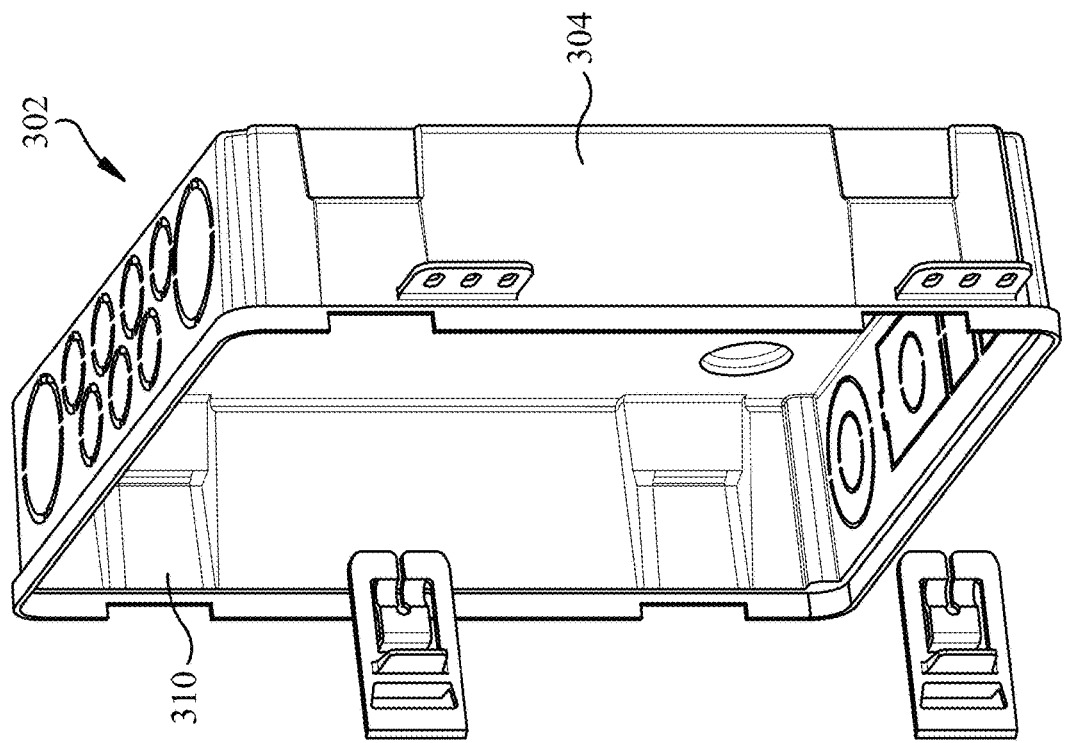
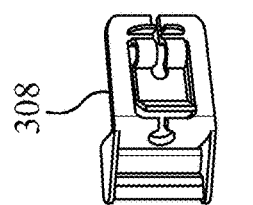
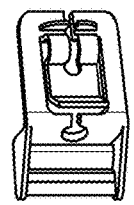
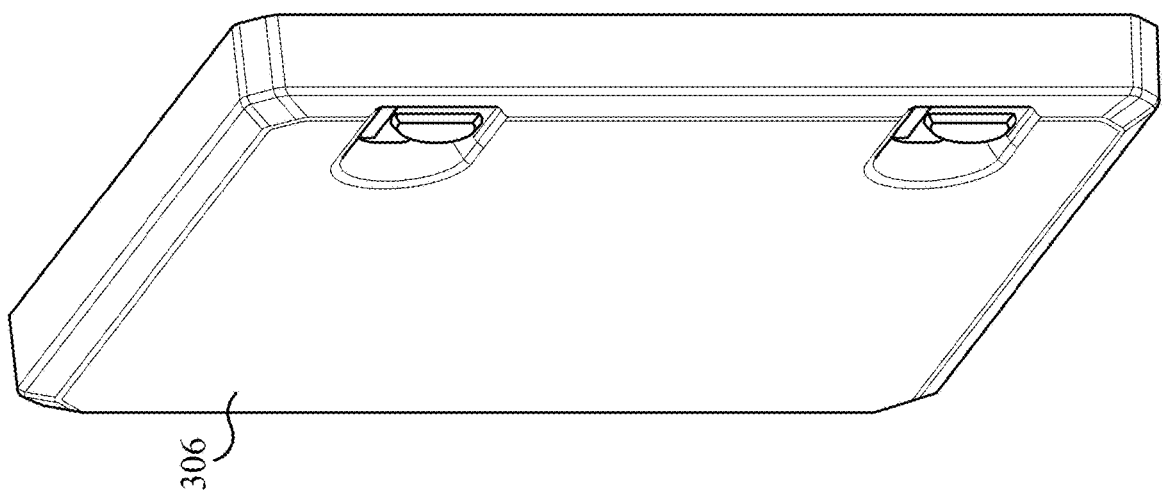
FIG. 3

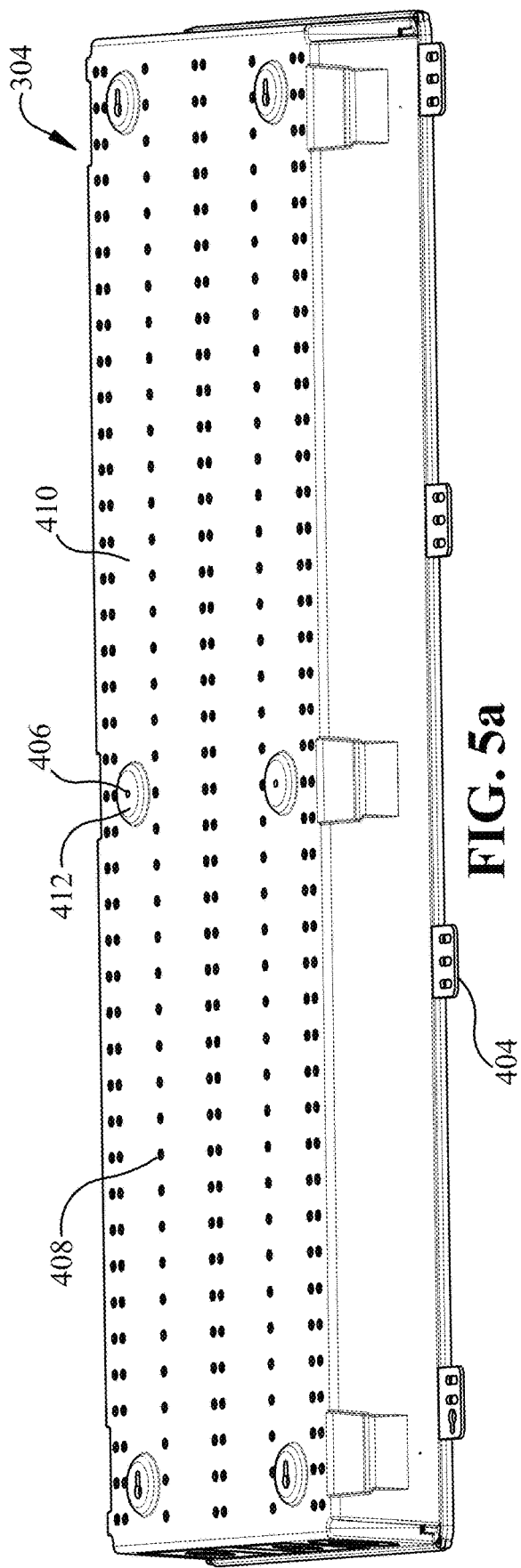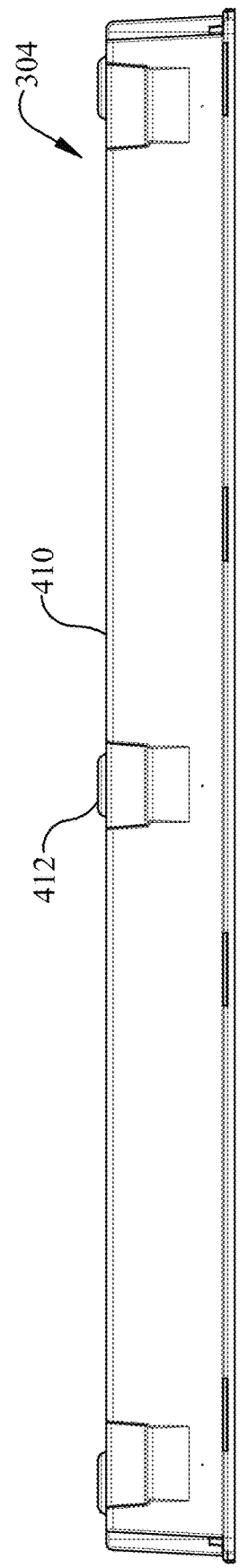

ADJUSTABLE INSERT SYSTEM FOR WALL-MOUNTED ENCLOSURES

CROSS-REFERENCE TO RELATED APPLICATIONS

This application is a continuation of, and claims priority to, U.S. patent application Ser. No. 16/188,966, filed on Nov. 13, 2018, and entitled "ADJUSTABLE INSERT SYSTEM FOR WALL-MOUNTED ENCLOSURES," the entirety of which is hereby incorporated herein by reference.

TECHNICAL FIELD

The disclosed subject matter relates generally to wall-mounted electrical and networking enclosures

BACKGROUND

Drywall-mounted electrical enclosures or structured media centers are often used as junction boxes for in-wall electrical connection or to house electronic networking equipment. These enclosures typically comprise a main housing that mounts within a recess in finished drywall and a door that fits over the housing's open side. The depth of the wall recess within which an electrical enclosure resides can vary across different installation environments as a function of drywall thickness. Consequently, techniques for installing and assembling these enclosures must be able to compensate for a range of standard drywall thicknesses. However, present mounting techniques typically require the use of tools in order to adjust for depth.

The above-described deficiencies of current enclosures are merely intended to provide an overview of some of the problems of current technology, and are not intended to be exhaustive. Other problems with the state of the art, and corresponding benefits of some of the various non-limiting embodiments described herein, may become further apparent upon review of the following detailed description.

SUMMARY

The following presents a simplified summary of the disclosed subject matter in order to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

Various embodiments described herein provide an enclosure assembly comprising door hinge and latch components that can be installed easily to match the depth of surrounding drywall without the use of tools. In one or more embodiments, the enclosure assembly comprises insertable mounting components that insert into slots in the main housing of the enclosure and that serve as either hinges or latches for the enclosure door. After the enclosure main housing has been mounted in the wall and drywall has been installed around the enclosure, the insertable mounting components can be installed in the slots of the main housing so that the enclosure door can be mounted. Each insertable mounting component is inserted into its corresponding slot to a depth that brings a stopping surface on the insertable mounting component into contact with the drywall, thereby setting the correct installation depth. The insertable mounting components comprise ratchetting teeth on one side that engage with an engagement mechanism in the slot, preventing removal of the insertable mounting component until a release tab is pressed.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description may include additional or alternative embodiments beyond those described in this summary.

BRIEF DESCRIPTION OF DRAWINGS

FIG. 3 is an exploded view of an example enclosure assembly.

FIG. 5a is a rear perspective view of an enclosure main housing that illustrates offset areas from the exterior of main housing.

FIG. 5b is a side view of an enclosure main housing that illustrates offset areas from the exterior of main housing.

DETAILED DESCRIPTION

Figure 1:
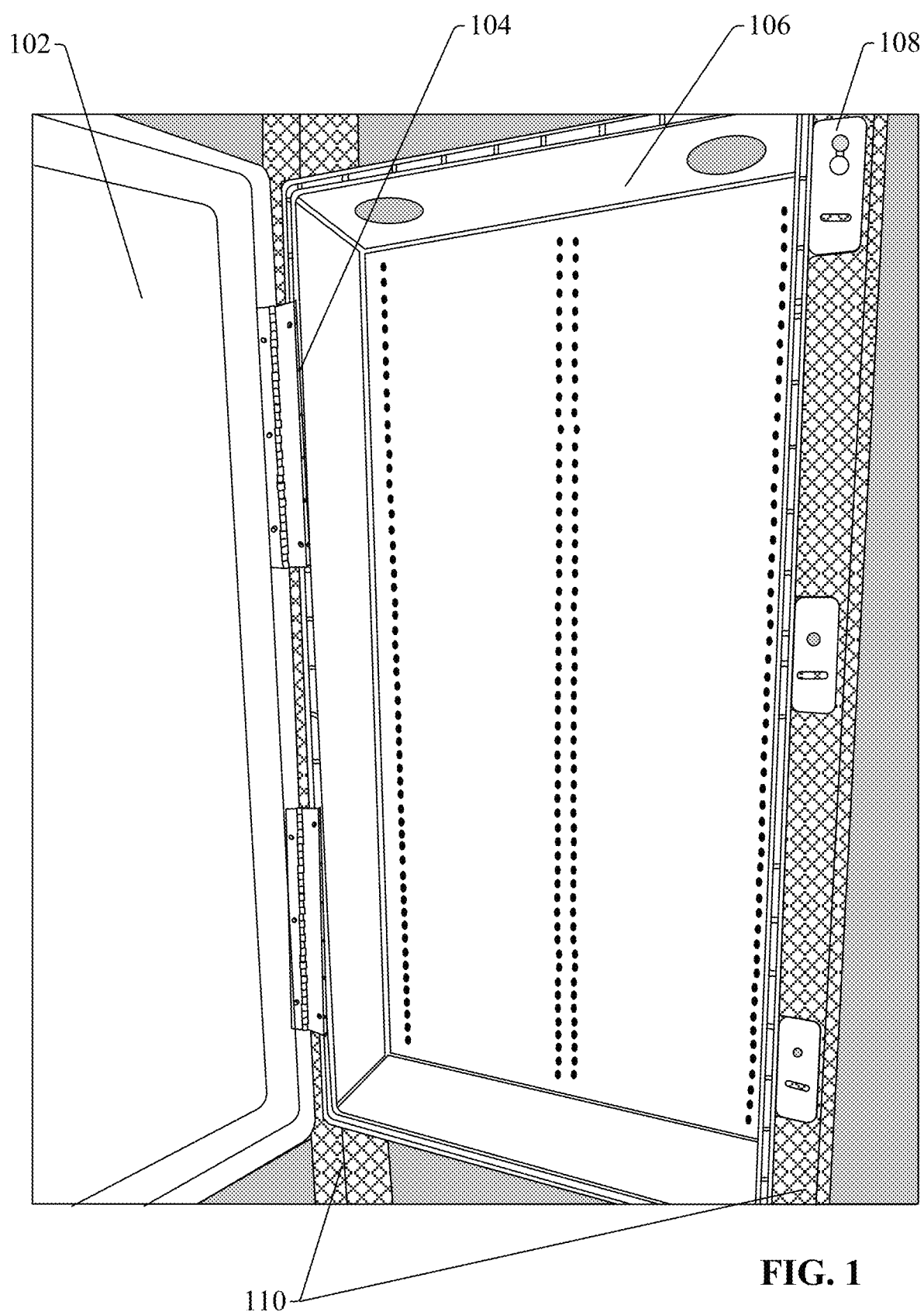
FIG. 1 is a view of an example in-wall electrical enclosure assembly installed in an unfinished wall.

The subject disclosure is now described with reference to the drawings wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

FIG. 1 is a view of an example in-wall electrical enclosure assembly installed in an unfinished wall. The assembly comprises an enclosure main housing 106 and an enclosure door 102 attached to the main housing 106 by a pair of piano hinges 104. A set of mounting brackets 108 are attached along the vertical sides of the main housing 106 and are used to mount the main housing 106 to a pair of adjacent wall studs 110.

Figure 2:
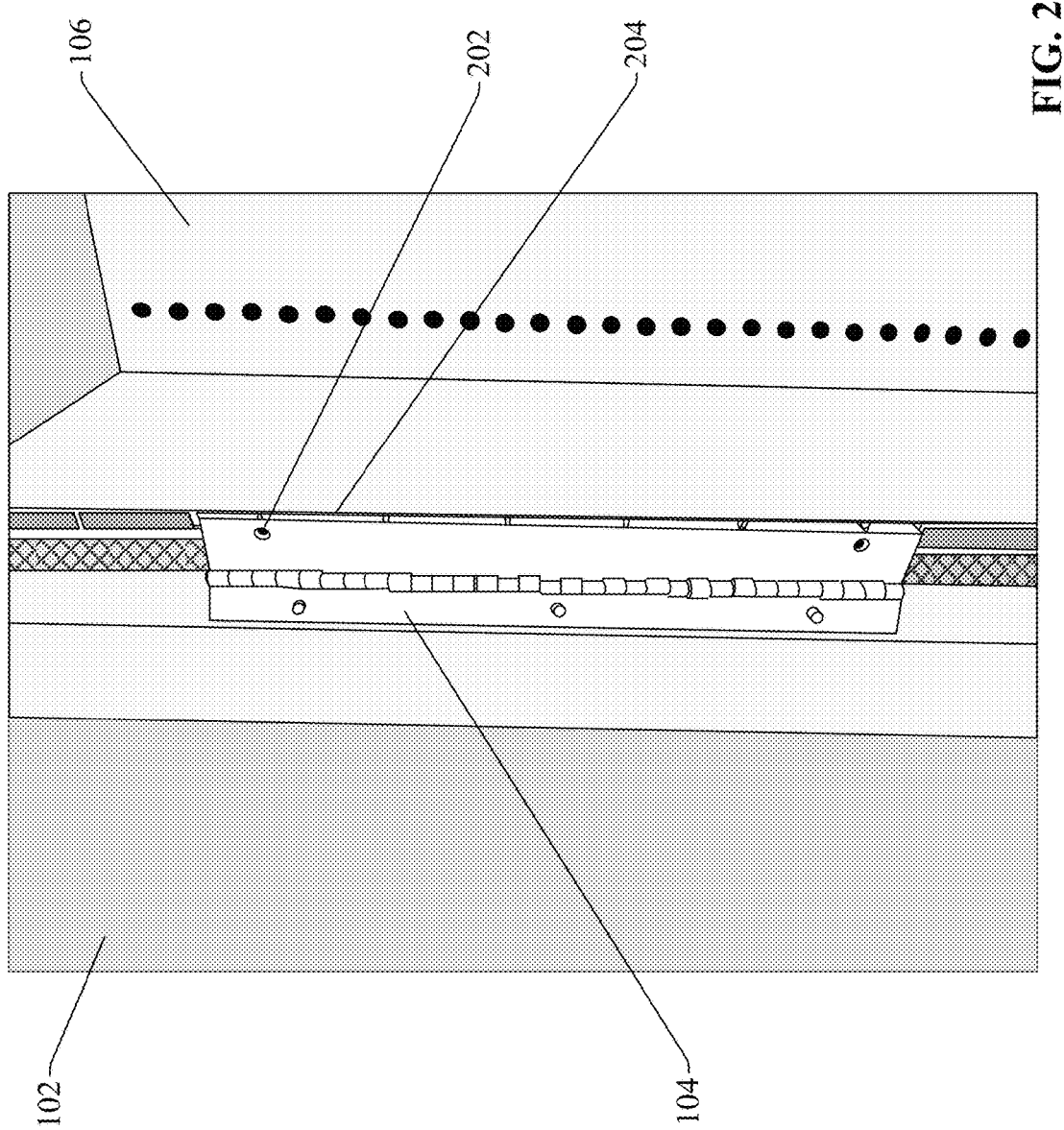
FIG. 2 is a close-up view of a piano hinge used to mount a door to an enclosure.

Typically, the main enclosure housing 106 will be mounted to the wall studs 110 prior to installation of the drywall. The drywall is then installed around the main housing 106, with a hole cut into the drywall to accommodate the main housing 106. After the drywall is installed, the door 102 is assembled to the main housing 106 using the piano hinges 104. FIG. 2 is a close-up view of one of the piano hinges 104. In this example, one edge of the piano hinge 104 is inserted into one or more receiving slots 204 along a front edge of the main housing 106. Since the amount of separation between the door 102 and the main housing 106 depends on the thickness of the drywall within which the main housing 106 is recessed, piano hinges 104 are configured to allow the amount of separation between the door 102 and main housing 106 to be adjusted as needed to accommodate different standard drywall depths. For shallower drywall, the piano hinges 104 can be inserted further into the receiving slots 204, resulting in less separation between the main housing 106 and door 102. For thicker drywall, the piano hinges 104 can be retracted from the receiving slots 204 to accommodate the greater distance between the door 102 and the main housing 106. However, although piano hinges 104 allow for adjustability of depth, appropriate tools are required to set the depth of the piano hinges. For example, the depth of piano hinge 104 is set using screws driven into screw holes 202. Because these depth adjustment techniques require the use of tools, more time and manual dexterity is required to adjust the enclosures for depth compared to potentially simpler techniques.

To address these and other issues, one or more embodiments described herein provide a wall-mounted enclosure assembly that allows an enclosure door to be mounted to the enclosure main housing in a manner that easily sets the door installation depth to match the depth of the surrounding drywall without the use of tools. In one or more embodiments, after the enclosure's main housing has been mounted in the wall and the drywall has been installed around the main housing, insertable mounting components that serve as hinges and latches can be inserted into slots formed on the vertical sides of the main housing. The insertable mounting components are designed to engage with the slots in a ratchetting manner such that the insertable mounting components can be inserted to a selected depth of multiple pre-set depths (determined by the spacing between the mounting component's ratcheting teeth) but cannot be withdrawn from the slots until a release tab or tongue on the insertable mounting component is pressed. Each insertable mounting component is inserted into a slot until a stopping surface on the insertable mounting component abuts against the drywall surrounding the enclosure main housing. Since the insertable mounting component is locked in this position, the installation depths of the hinges and latches are correctly set to match the thickness of the drywall merely by inserting the insertable mounting components until the stopping surface abuts the drywall. The enclosure door can then be mounted to the main housing by engaging hinges and latches on the door with the insertable hinges and latches installed in the main housing.

FIG. 3 is an exploded view of an example enclosure 302 according to one or more embodiments. Enclosure 302 comprises a main housing 304, a door 306, and a number of insertable mounting components 308 which are configured to be installed in slots 310 located on the inside surfaces of the two long (vertical) sides of main housing 304. As will be described in more detail below, insertable mounting components 308 serve as hinges and latches for door 306. Various embodiments of insertable mounting components 308 are provided. In some embodiments, insertable mounting components 308 may all be designed to function as either a hinge or a latch. In other embodiments, two different types of insertable mounting components 308 may be available—a first type that serves as a hinge and a second type that serves as a latch. These embodiments will be described in more detail herein. Insertable mounting components 308 are configured to be installed in slots 310 in a depth-adjustable manner without requiring the use of tools, thereby allowing the door 306 to be installed more quickly and requiring less manual dexterity relative to enclosure systems that require tools for depth adjustment and installation.

Figure 4:
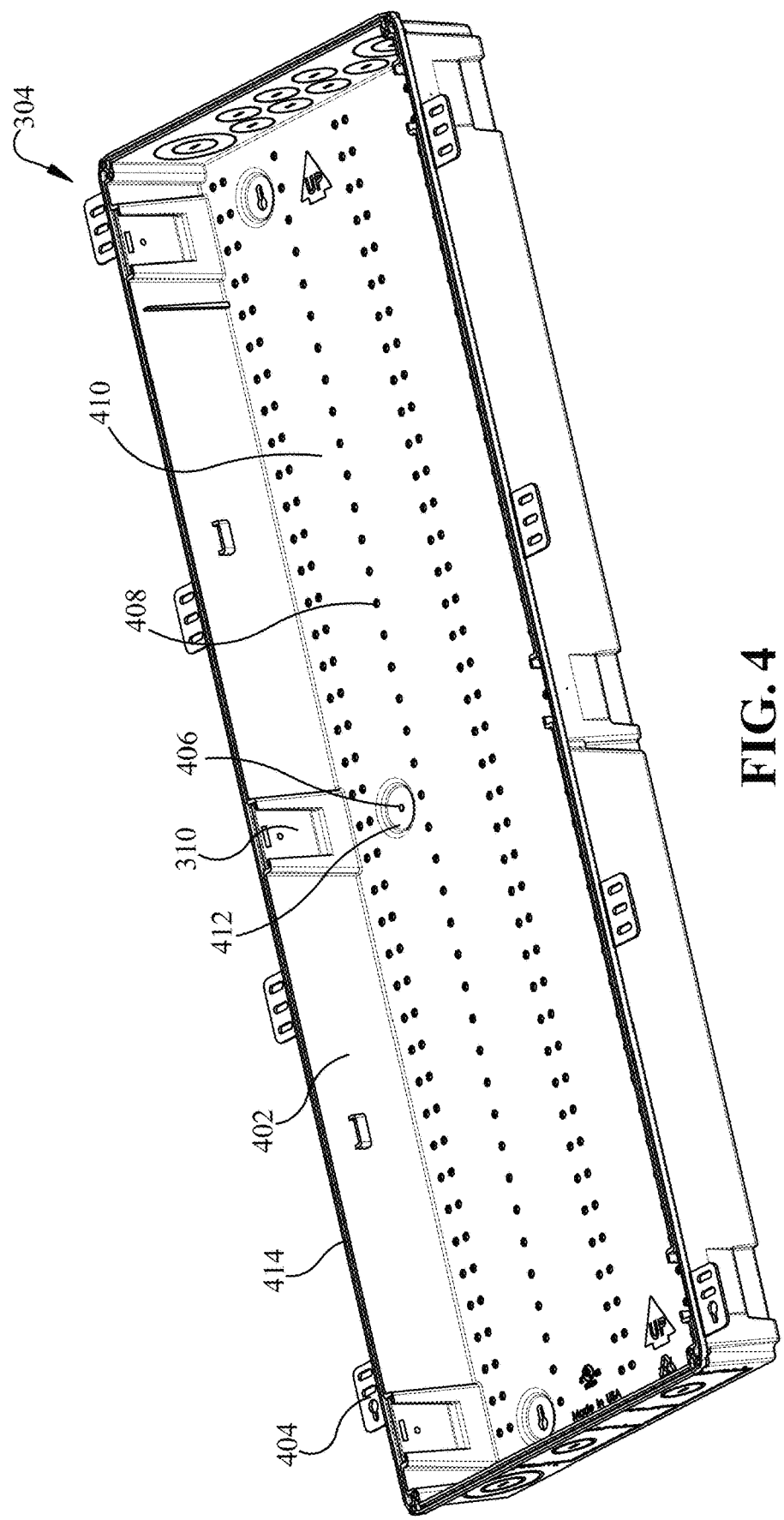
FIG. 4 is a perspective view of an example main housing that includes three slots on the inside surfaces of its two longer (vertical) sides.

Main housing 304 depicted in FIG. 3 includes two slots 310 on each vertical side. Embodiments of main housing 304 having larger dimensions may include more than four slots 310. FIG. 4 is a perspective view of an example main housing 304 that includes three slots 310 on the inside surfaces 402 of its two longer (vertical) sides. As shown in FIG. 4, mounting brackets 404 are affixed along the vertical edges 414 of the main housing 304. These mounting brackets 404 can be used to mount the main housing 304 to wall studs (e.g., studs 110).

As an alternative to mounting brackets 404, a number of screw holes 406 are formed through the rear wall 410 of main housing 304. These screw holes 406 can be used to mount the rear wall 410 to a supporting surface within the wall. In some embodiments, screw holes 406 can each be formed within an offset 412 formed on the rear wall 410. FIGS. 5a and 5b are a rear perspective view and a side view, respectively, of main housing 304 that illustrate the offset areas from the exterior of main housing 304. Each offset 412 comprises a recessed area on the inside surface of the rear wall 410 (as can be seen in FIG. 4) which translates to a raised area on the outside surface of the rear wall 410. When screw holes 406 are used to mount main housing 304 on a supporting surface, offsets 412 maintain a minimum distance between the rear wall 410 and the mounting surface. This ensures compliance with fire resistance regulations by maintaining a space between the enclosure and the supporting surface.

Figure 6:
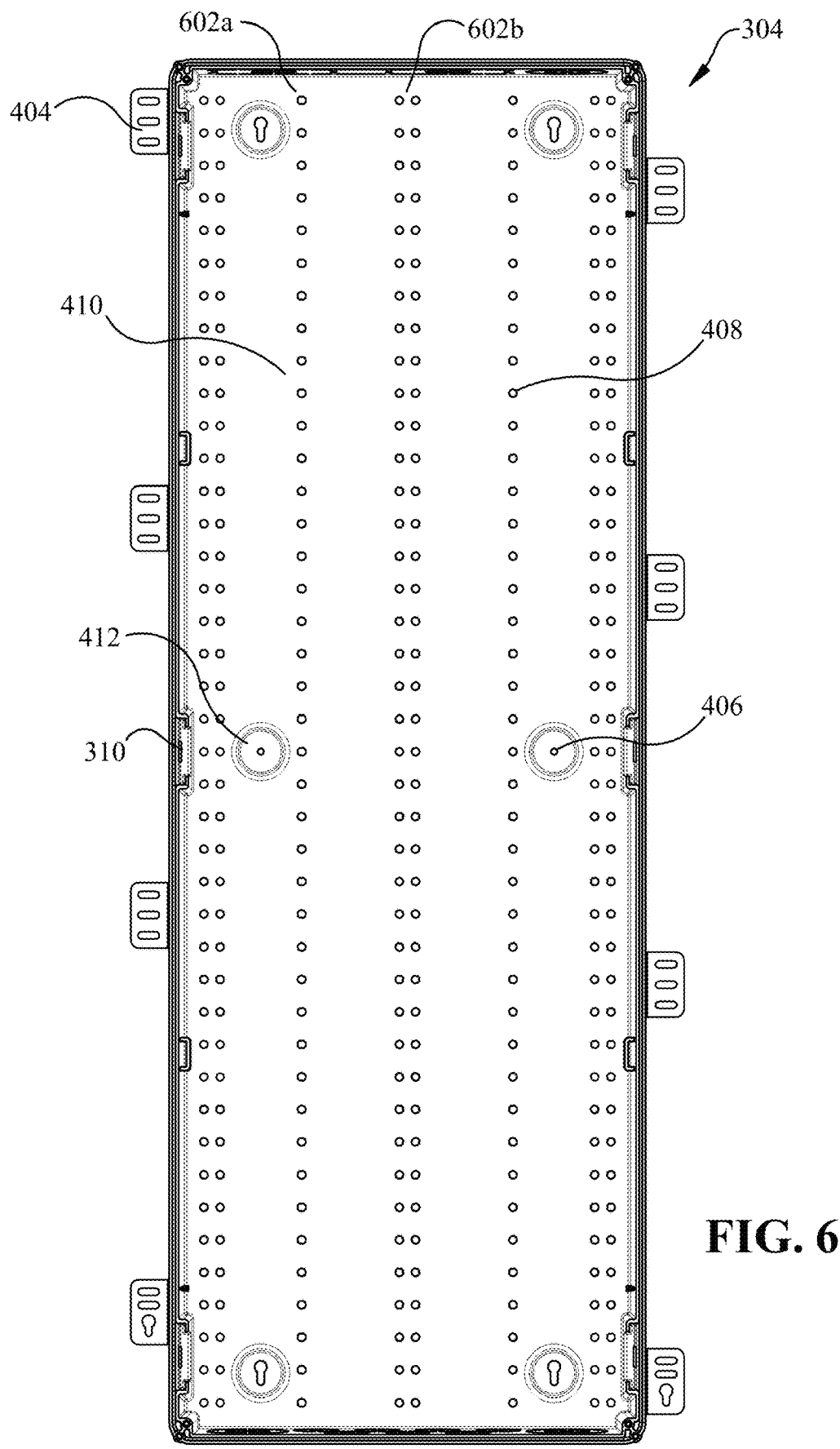
FIG. 6 is a front view of an enclosure main housing that illustrates equipment mounting holes.

A number of equipment mounting holes 408 are also formed through the rear wall 410. FIG. 6 is a front view of main housing 304 that illustrates these equipment mounting holes 408 more clearly. In the embodiment depicted in FIG. 6, equipment mounting holes 408 are arranged in vertical columns 602 on the rear wall 410, with some columns (e.g., columns 602a) comprising a single set of vertically arranged equipment mounting holes 408 and other columns (e.g., columns 602b) comprising a pair of vertically arranged equipment mounting holes 408. The horizontal spacing between the pair of vertically arranged equipment mounting holes 408 in column 602b is less than the horizontal pacing between column 602a and 602b. The additional sets of vertically arranged equipment mounting holes 408 in some columns 602 (e.g., column 602b) can allow a greater degree of flexibility in aligning devices mounted within the enclosure 302 during installation. Mounting holes 408 can also be used to mount shelves and saddle ties, examples of which are illustrated and described herein in connection with FIGS. 39-41.

Figure 7A:
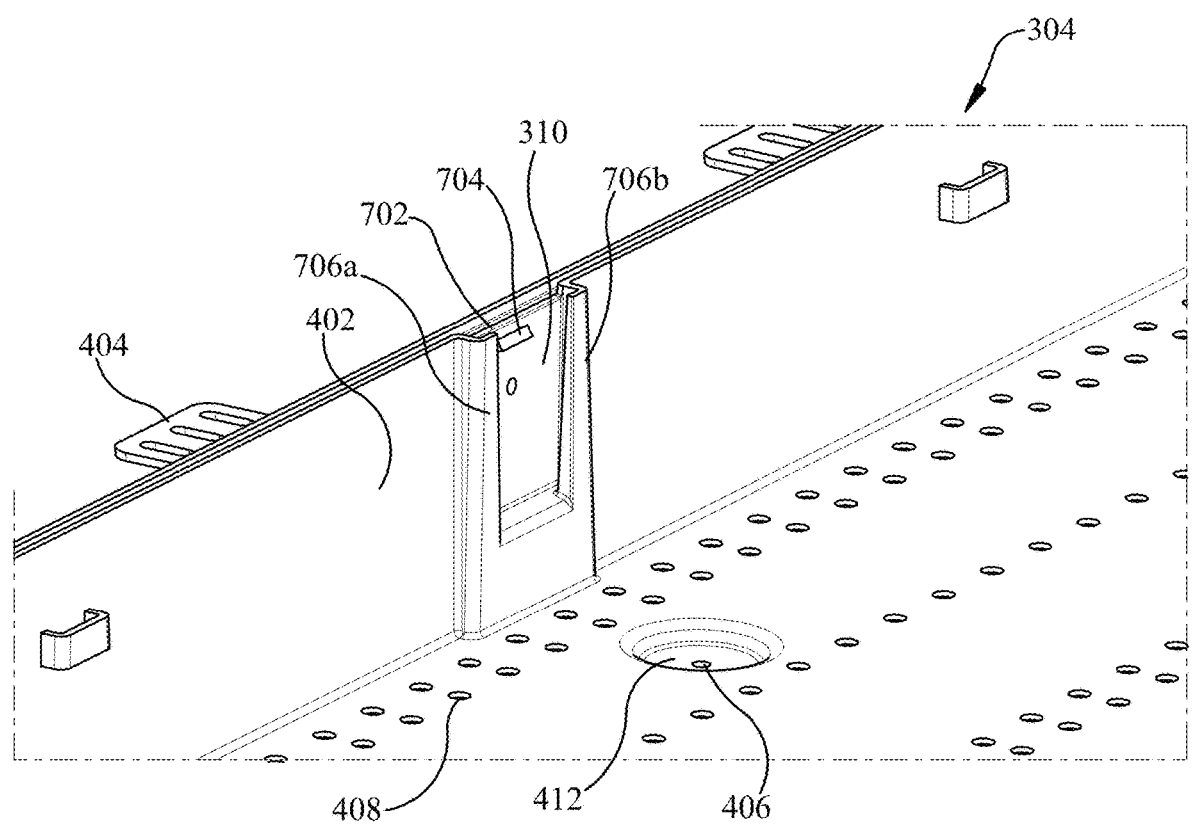
FIG. 7a is a close-up view of a slot of an enclosure main housing.

FIG. 7a is a close-up view of one of the slots 310 of main housing 304. Each slot 310 is defined by a pair of guide rails 706a and 706b formed on the inside surface 402 of a vertical side of the main housing 304. Guide rails 706a and 706b face one another, thereby defining a receiving opening 702 that faces toward the front of main housing 304 so that insertable mounting components 308 can be received. An engagement feature 704 comprising a raised notch is formed inside the slot 310 on the inside surface 402 of the main housing between the two guide rails 706a and 706b. As will be explained below, engagement feature 704 is configured to engage with a ratcheting feature of an insertable mounting component 308 to prevent removal of the insertable mounting component 308 until a release mechanism is acted upon.

Figure 7B:
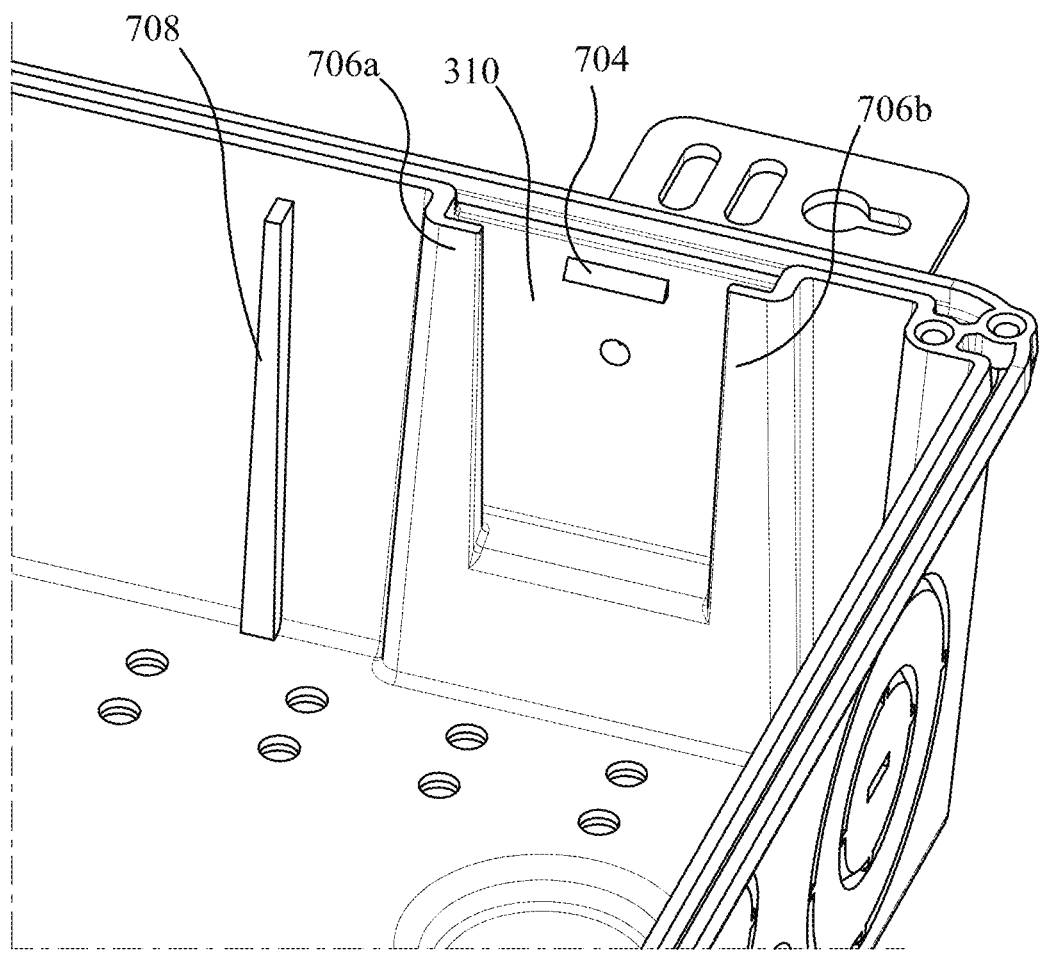
FIG. 7b is a close-up view of the inside of an enclosure main housing depicting an example nesting hard stop formed near the slot.

Although not shown in FIG. 7a, some embodiments of main housing 304 can include nesting hard stops that can prevent two main housings 304 from becoming tightly affixed together when the housings are nested together for shipment. FIG. 7b is a close-up view of the inside of main housing 304 depicting an example nesting hard stop 708 formed near the slot 310. Nesting hard stop 708 can comprise a raised, elongated protrusion formed at designated locations along the inside surface 402 of the vertical sides of the main housing 304. By including nesting hard stops 708 at various locations along the inside surface 402 of two or more vertical sides of the main housing 304, two main housings 304 can be nested within one another for shipping and handling with less risk of the two main housings 304 adhering tightly together, since the nesting hard stops 708 maintain a small amount of space between the two nested housings 304 that can allow the housings 304 to be pulled apart more easily.

Figure 8A:
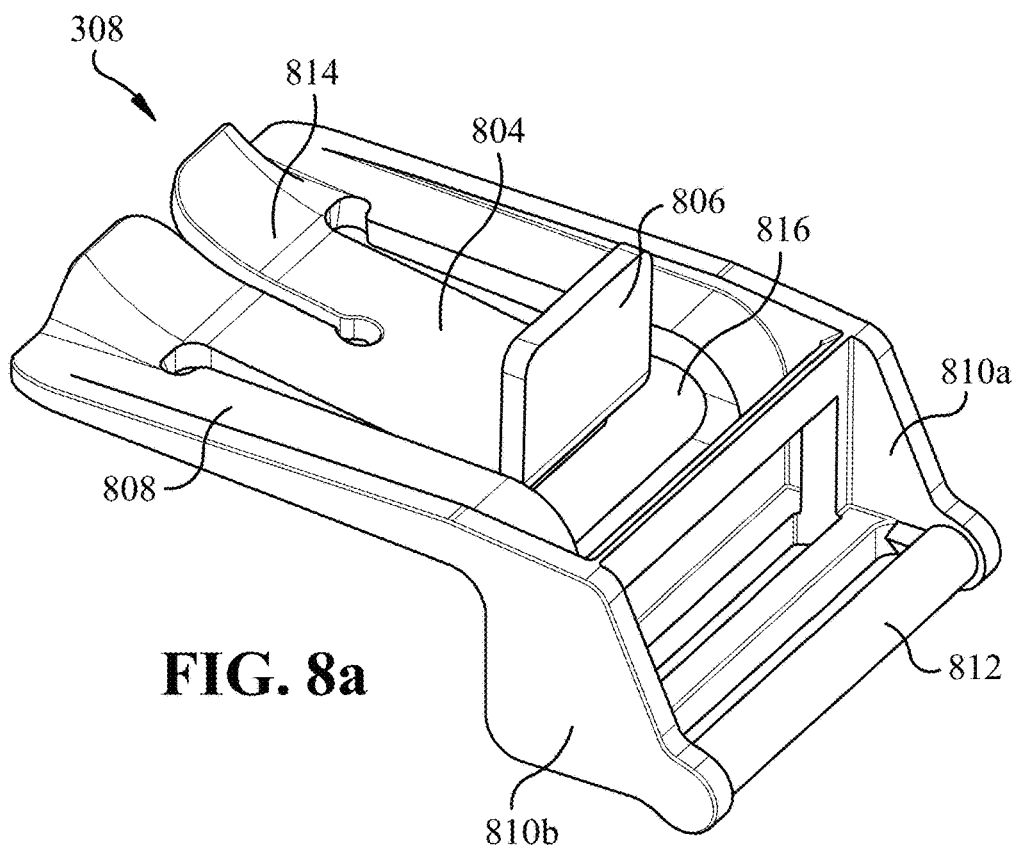
FIG. 8a is a first perspective view of an example insertable mounting component.
Figure 8B:
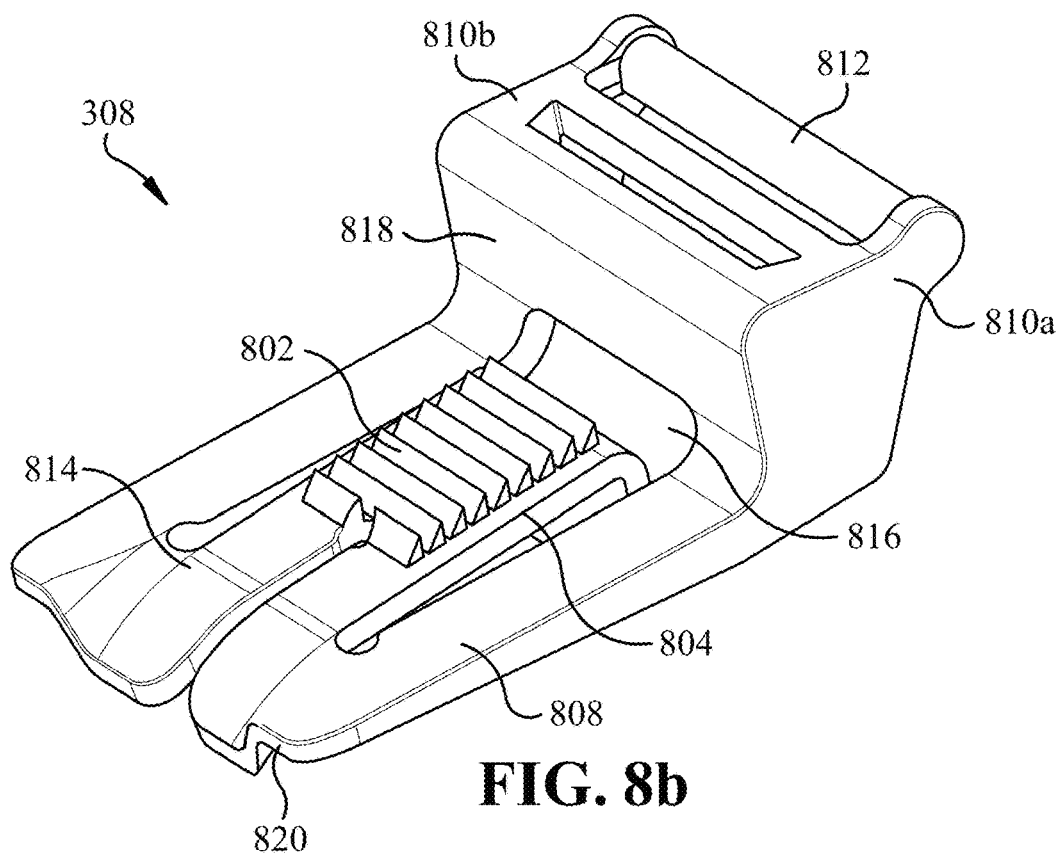
FIG. 8b is a second perspective view of the example insertable mounting component.
Figure 9:
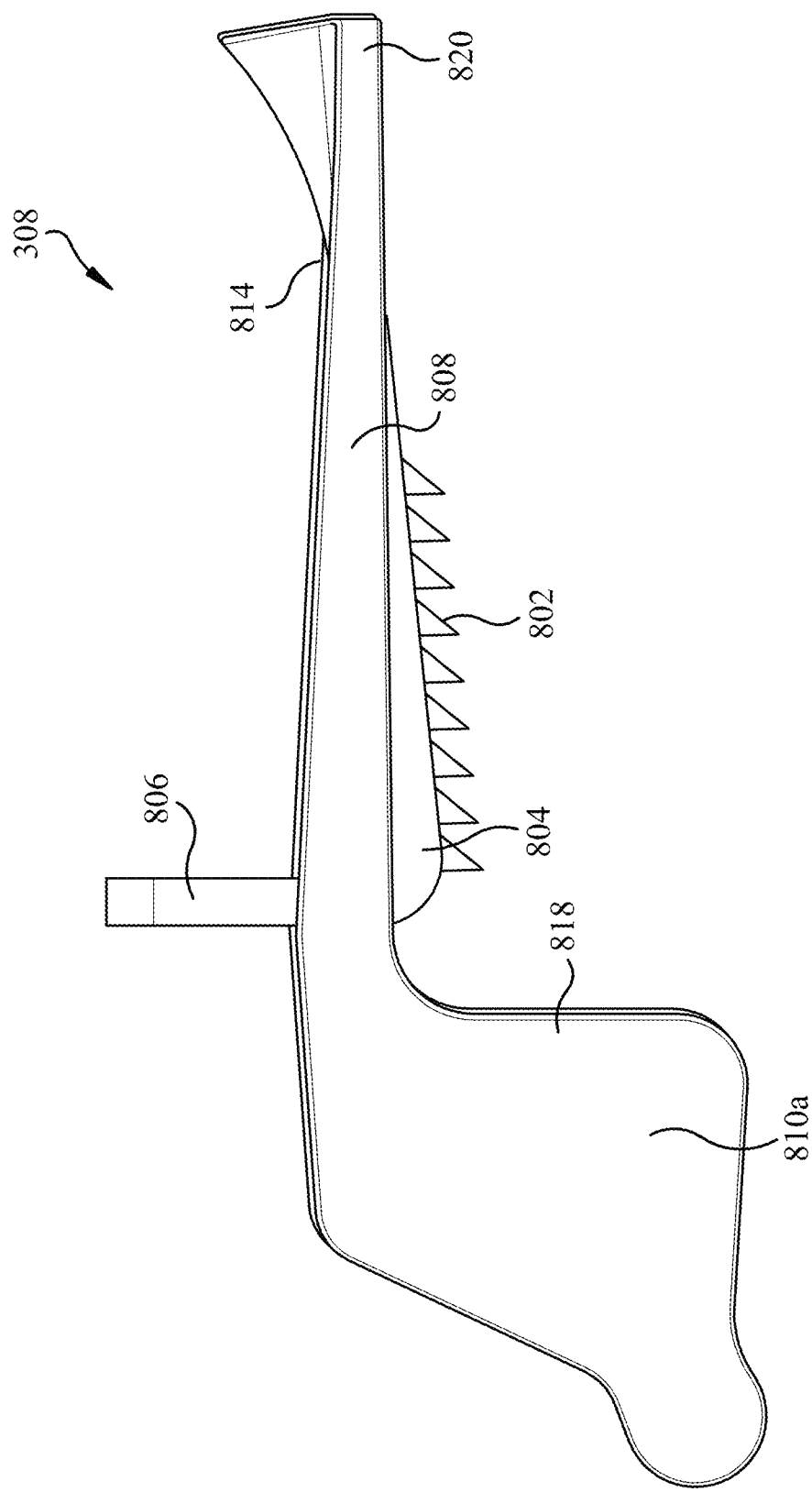
FIG. 9 is a side view of an insertable mounting component.
Figure 10B:
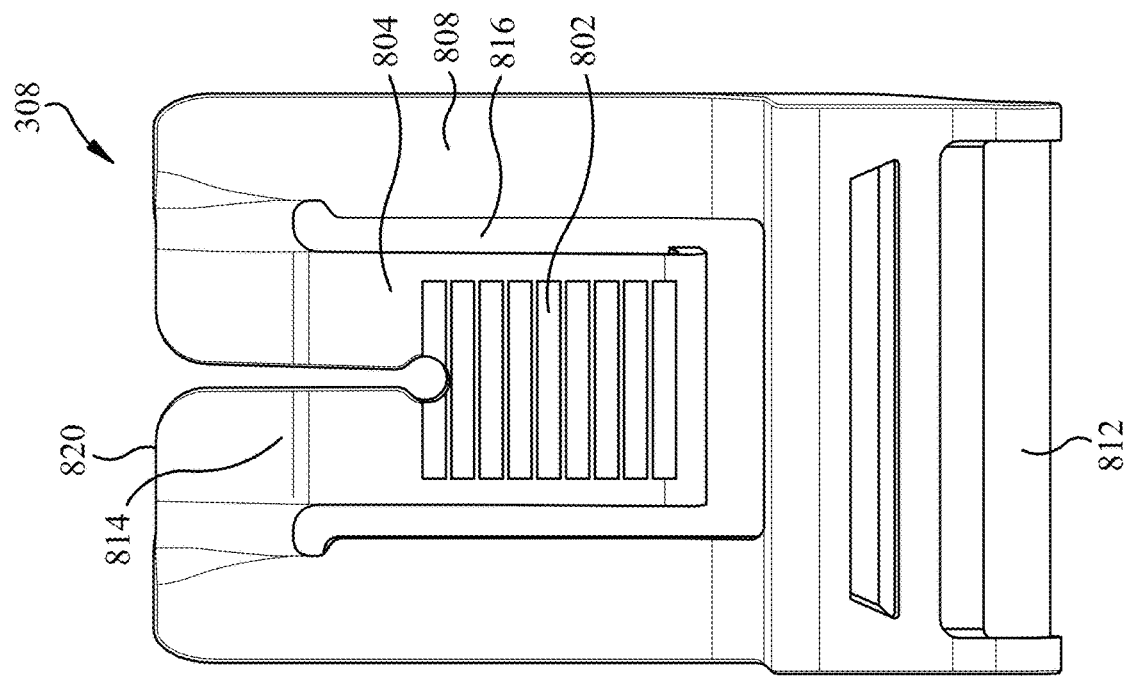
FIG. 10b is a view of a second side of the insertable mounting component.
Figure 10A:
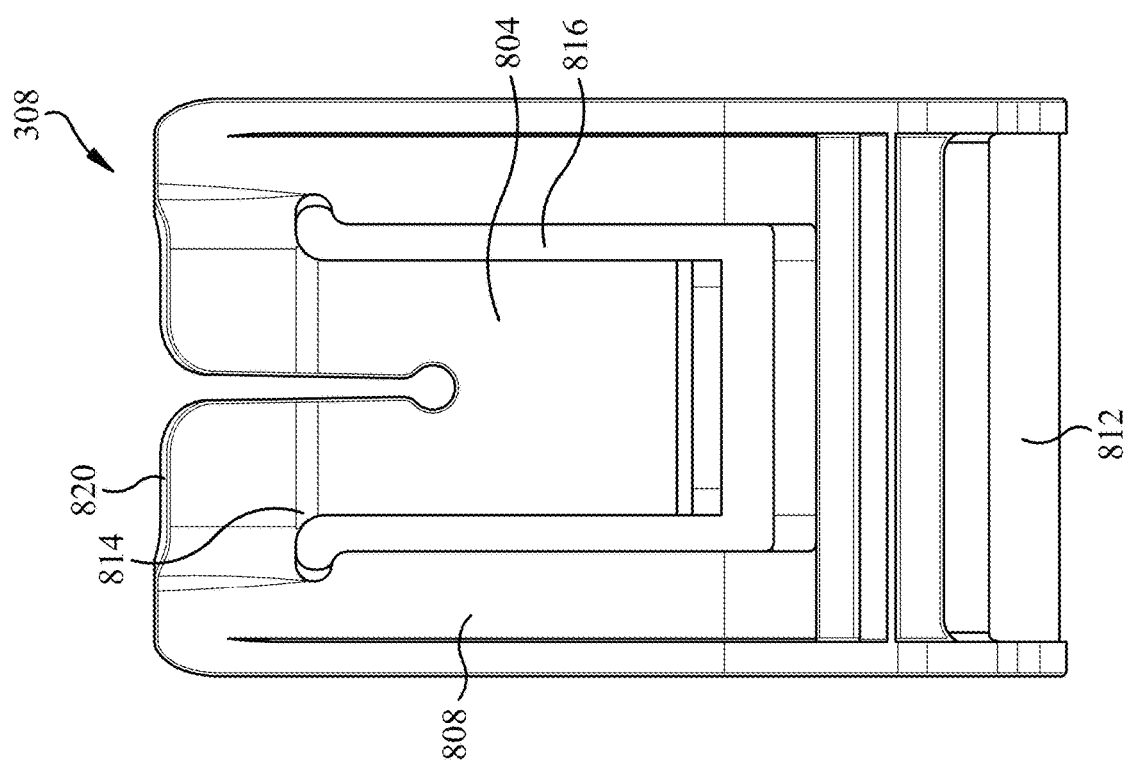
FIG. 10a is a view of a first side of an insertable mounting component.

FIGS. 8a and 8b are perspective views of an example insertable mounting component 308 according to one or more embodiments. FIG. 8a is a perspective view of a first side of the insertable mounting component 308 and FIG. 8b is a perspective view of a second side of the insertable mounting component 308 opposite the first side. FIG. 9 is a side view of insertable mounting component 308. FIGS. 10a and 10b are views of the first side and second side, respectively, of insertable mounting component. In this embodiment, the same insertable mounting component 308 can be used as either a hinge or a latch for mounting a door 306 to a main housing 304. This embodiment is referred to as a one-piece embodiment, since only one type of insertable mounting component 308 is required.

Insertable mounting component 308 comprises a tongue 808 shaped to fit inside any of the slots 310 on the main housing 304. In the illustrated embodiment, the thickness of the tongue 808 tapers slightly toward the end 820 of the tongue 808 to facilitate insertion into the slot 310. A middle section of tongue 808 comprises a flexible strip 804 that can be flexed independently of the tongue 808 about an attachment point 814 located near the end 820 of the tongue 808. Flexible strip 804 resides within a cut-out 816 formed in the tongue 808, with attachment point 814 comprising an edge of the cut-out 816 nearest the end 820 of the tongue 808. A set of parallel ratchetting teeth 802 are formed on one side of the flexible strip 804—the side that will face the vertical wall of main housing 304 while the tongue 808 is inserted in slot 310—and are configured to engage with engagement feature 704 inside the slot 310 of main housing 304 when the insertable mounting component 308 is inserted into the slot 310. An end of the flexible strip 804 opposite the attachment point 814 is bent at a substantially right angle to form a release tab 806 that can be pressed to disengage the ratchetting teeth 802 from the engagement feature 704.

A stopping surface 818 extends from the end of the insertable mounting component 308 opposite the tapered end 820. The plane of the stopping surface 818 is substantially perpendicular to the plane of the tongue 808. Stopping surface 818 rests flush against the drywall surface while insertable mounting component 308 is installed in a slot of a wall-mounted main housing 304, as will be described in more detail below.

A rod 812 is held between two arms 810a and 810b that extend from respective corners of the stopping surface 818 in a direction opposite the tongue 808. In this configuration, rod 812 is held at a location that is offset from the plane of the tongue 808. As will be described below, rod 812 can serve as either a hinge or a latch depending on the attachment feature of the door with which the rod 812 interacts.

Figure 11:
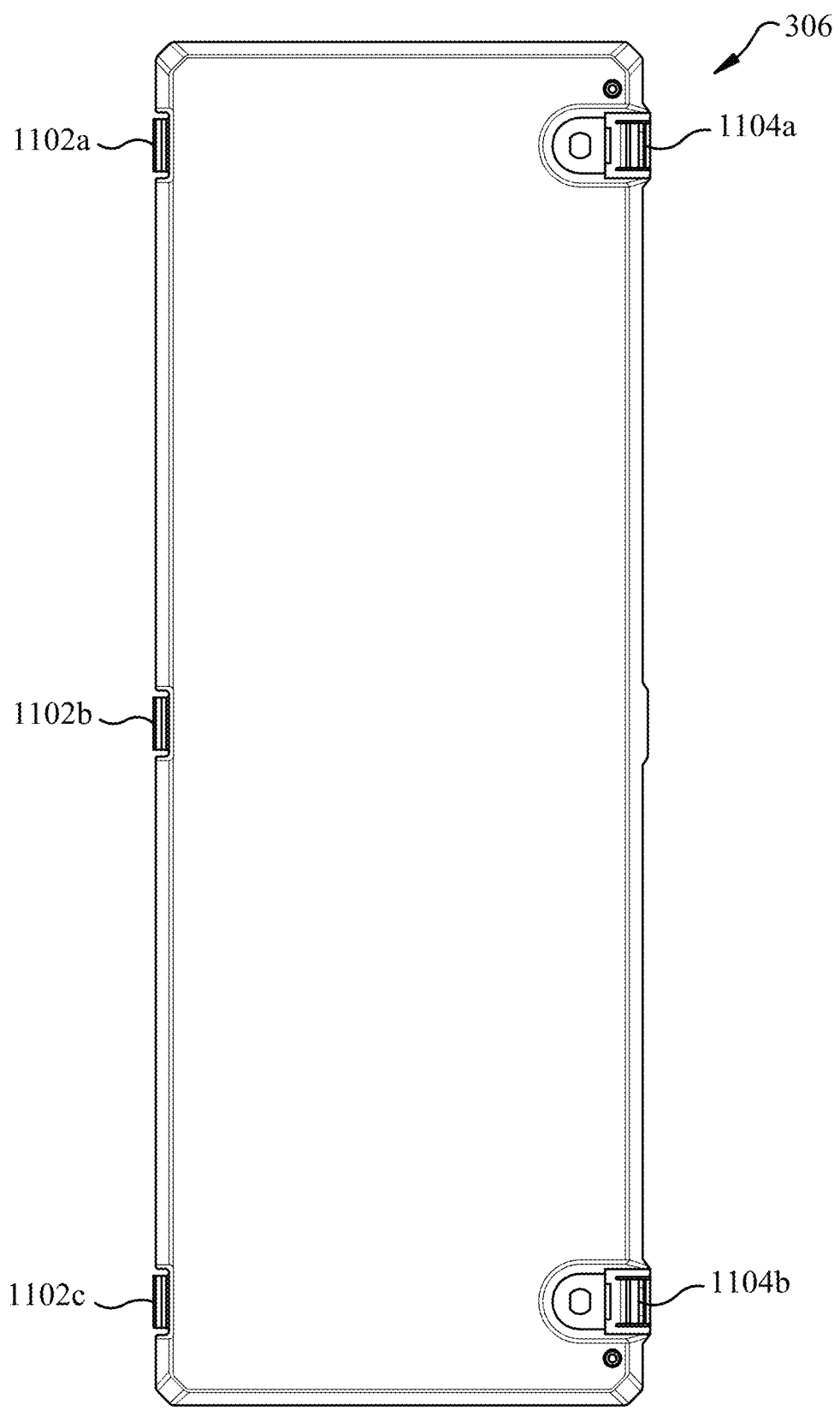
FIG. 11 is a front view of an enclosure door that is configured to engage with insertable mounting components.

FIG. 11 is a front view of a door 306 that is configured to engage with insertable mounting components 308. As with the main housing 304, various embodiments of door 306 can be provided that conform to different sizes. Door 306 depicted in FIG. 11 is sized to correspond to the size of main housing 304 depicted in FIGS. 4-7.

One or more hinges 1102 are formed along one of the vertical sides of the door 306, and one or more latches 1104 are formed along the other vertical side of the door 306. The example door 306 depicted in FIG. 11 comprises three hinges (1102a, 1102b, and 1102c) and two latches (1104a and 1104b).

Figure 12:
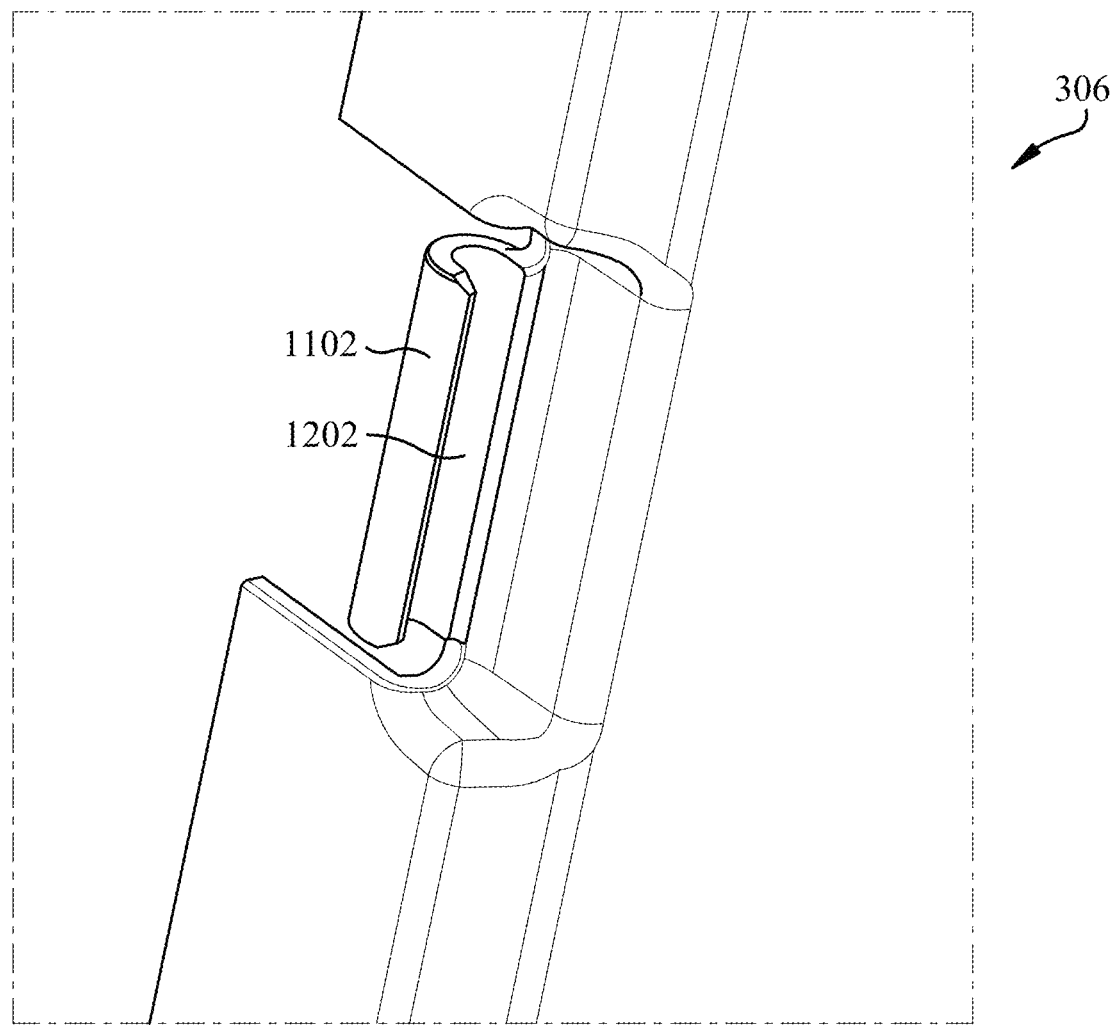
FIG. 12 is a close-up perspective view of one of a hinge of an enclosure door.

FIG. 12 is a close-up perspective view of one of the hinges 1102 of door 306. Hinge 1102 comprises a cylindrical sleeve attached to the door 306 and having an opening 1202 along its length that allows the hinge 1102 to engage with rod 812 of insertable mounting component 308. As will be described below, engaging hinge 1102 with rod 812 holds the door 306 in place and allows the door 306 to pivot about the hinge 1102.

Figure 13:
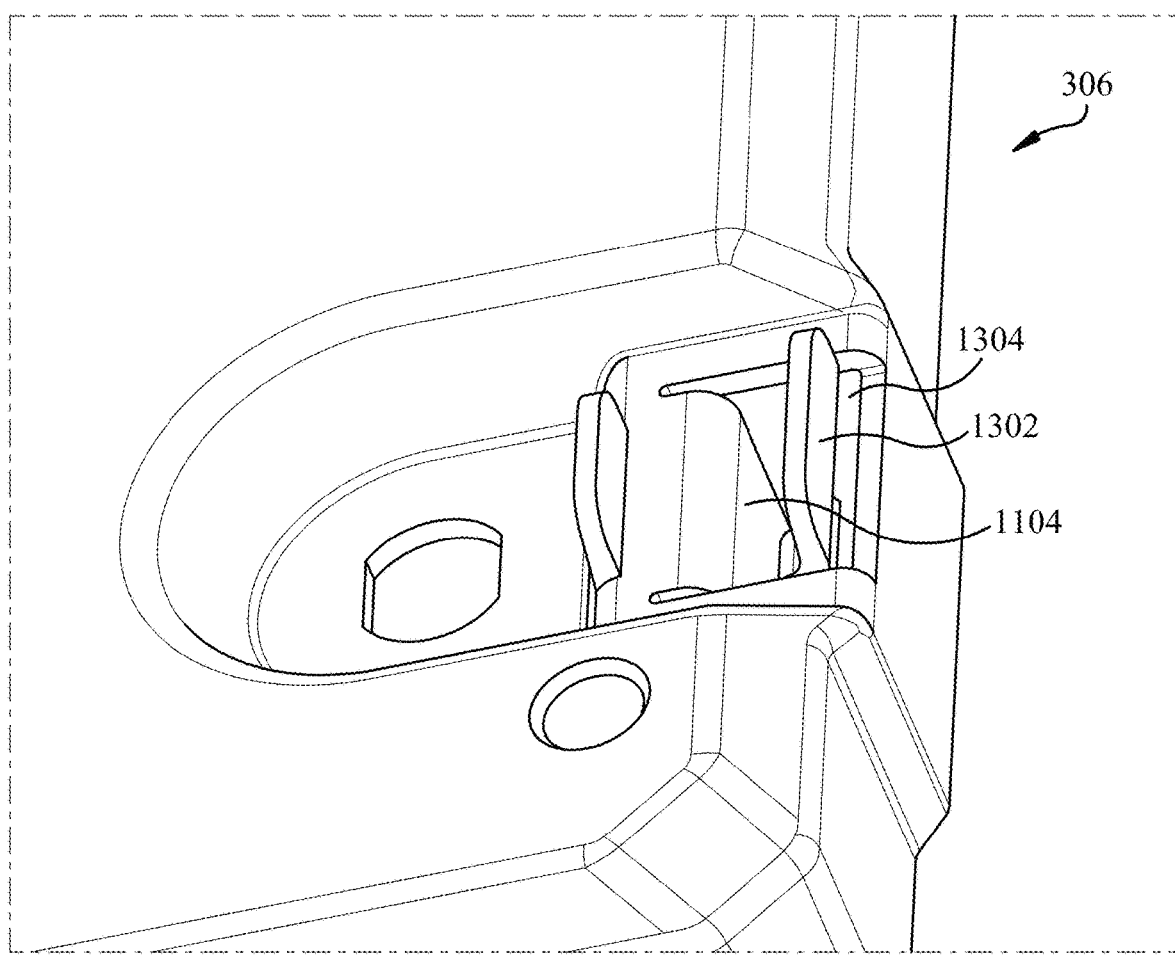
FIG. 13 is a close-up perspective view of a latch from outside an enclosure door.
Figure 14:
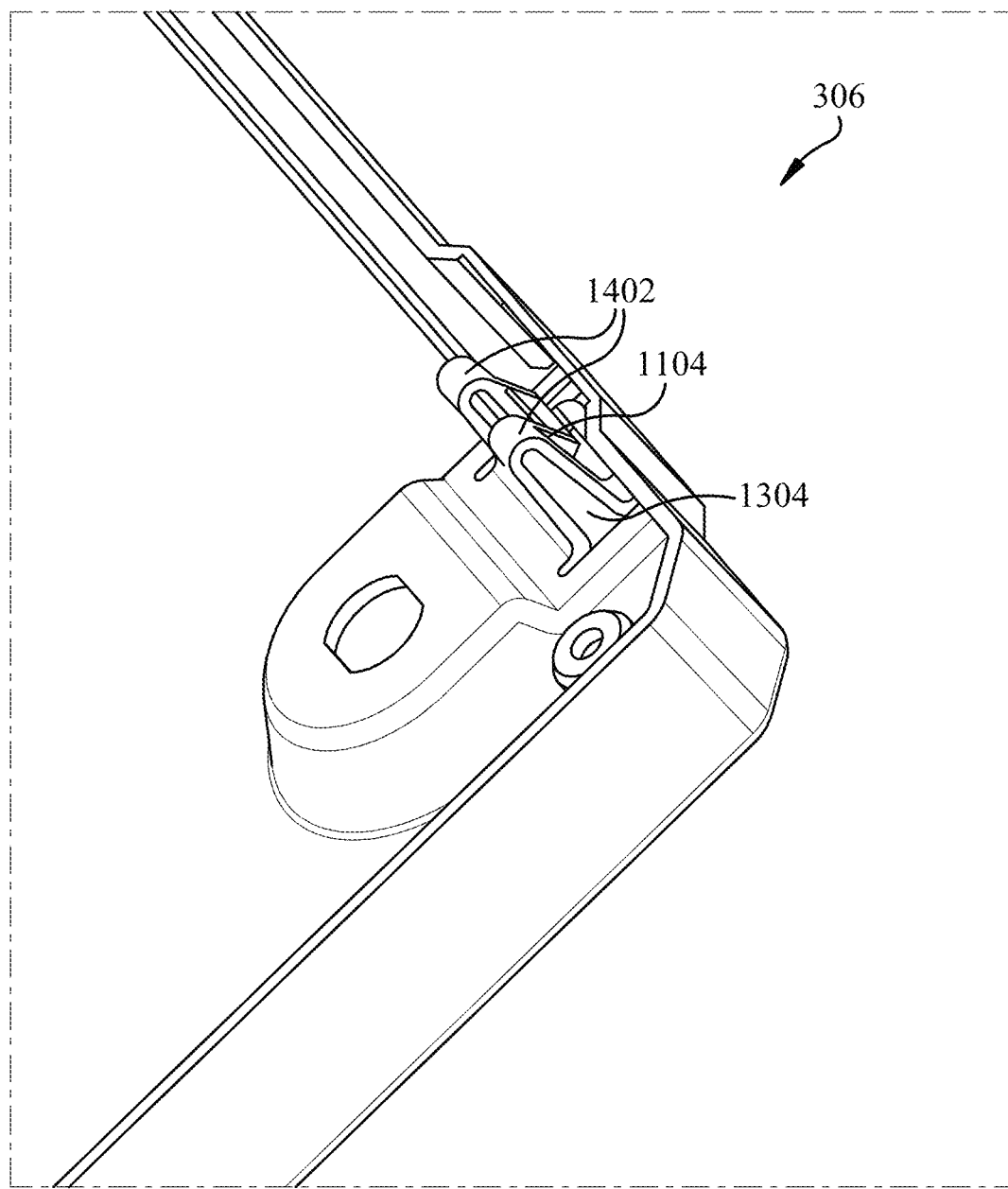
FIG. 14 is a close-up perspective view of the latch from inside the enclosure door.

FIG. 13 is a close-up perspective view of one of the latches 1104 from outside the door 306, and FIG. 14 is a close-up perspective view of the latch 1104 from inside the door 306. In the illustrated embodiment, latch 1104 resides within a cut-out 1304 near the edge of the door 306 and comprises two flexible arms 1402 bent into a "V" shape (as see more clearly in FIG. 14). Although the illustrated example depicts latch 1104 as comprising two flexible arms 1402, some embodiments may comprise only one flexible arm per latch 1104. First ends of the arms 1402 are fixed to the door 306 on the edge of the cut-out furthest from the outer edge of the door 306, and the arms 1402 are oriented such that the point of the "V" is directed toward the interior of the door. The second ends of arms 1402 are connected together by a release tab 1302 that protrudes through the cut-out 1304 toward the front side of the door 306 so that a user can manipulate the release tab 1302 from outside the enclosure.

Figure 15:
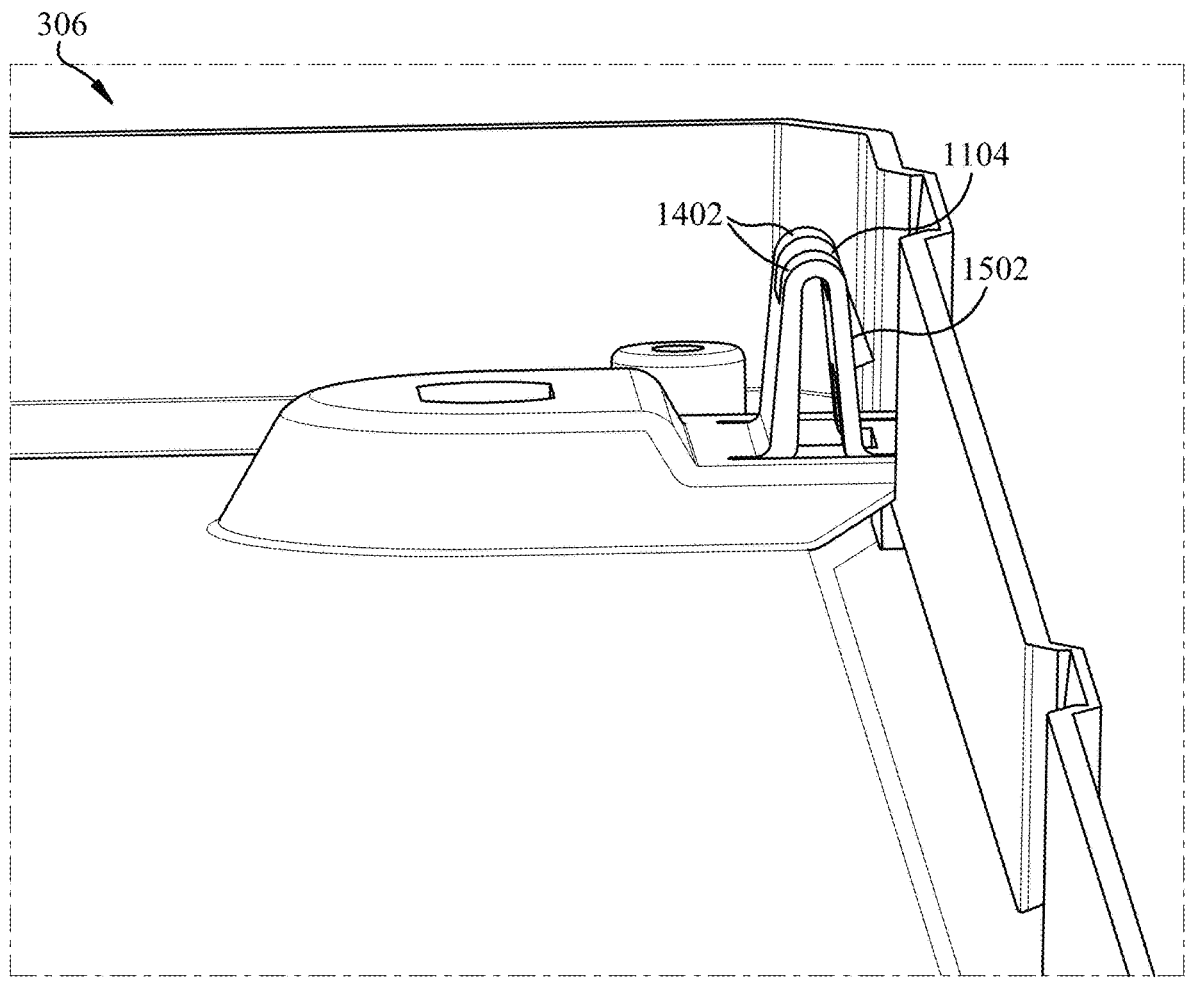
FIG. 15 is another close-up perspective view of the latch from inside the enclosure door.

FIG. 15 is another close-up perspective view of the latch 1104 from inside the door 306. As shown in this view, each arm 1402 of latch 1104 has a raised latching protrusion 1502 formed on the outer leg of the arm 1402. Each latching protrusion 1502 is configured to engage with rod 812 on one of the insertable mounting components 308, as will be described below. Pressing the release tab 1302 displaces the outer legs of the arms 1402 toward the inner legs of the latch 1104, disengaging the latching protrusion 1502 from the rod 812 and allowing door 306 to be opened.

Figure 16:
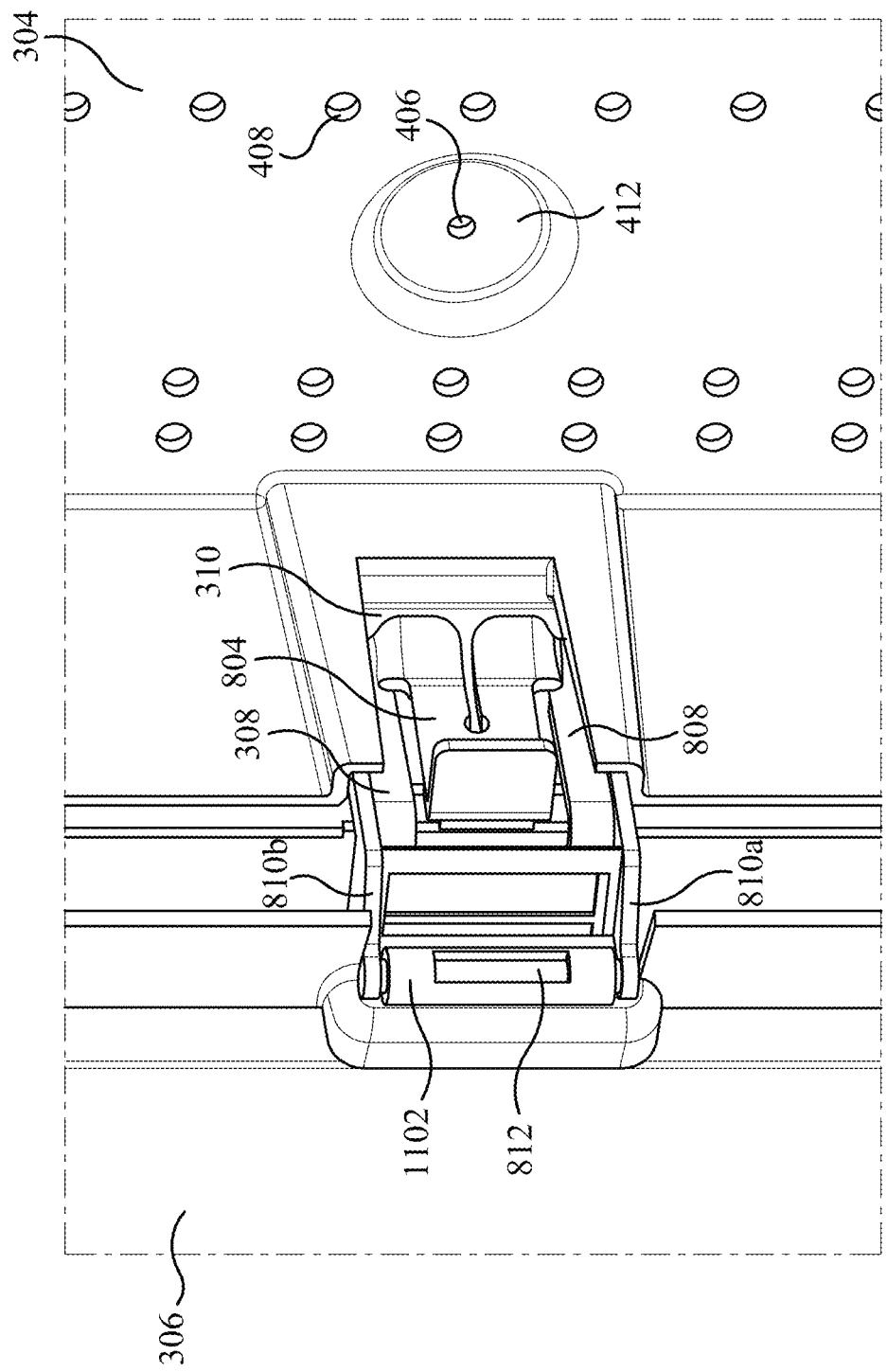
FIG. 16 is a close-up view of a slots of an enclosure main housing with an insertable mounting component inserted therein.

FIG. 16 is a close-up view of one of the slots 310 of main housing 304 with an insertable mounting component 308 inserted therein. The tongue 808 of insertable mounting component 308 is installed into slot 310 with the ratchetting teeth 802 (not visible in FIG. 16) facing the inner surface 402 of the vertical wall of the main housing 304, allowing the teeth 802 to engage with engagement feature 704 (see, e.g., FIG. 7a) inside the slot 310.

Figure 17:
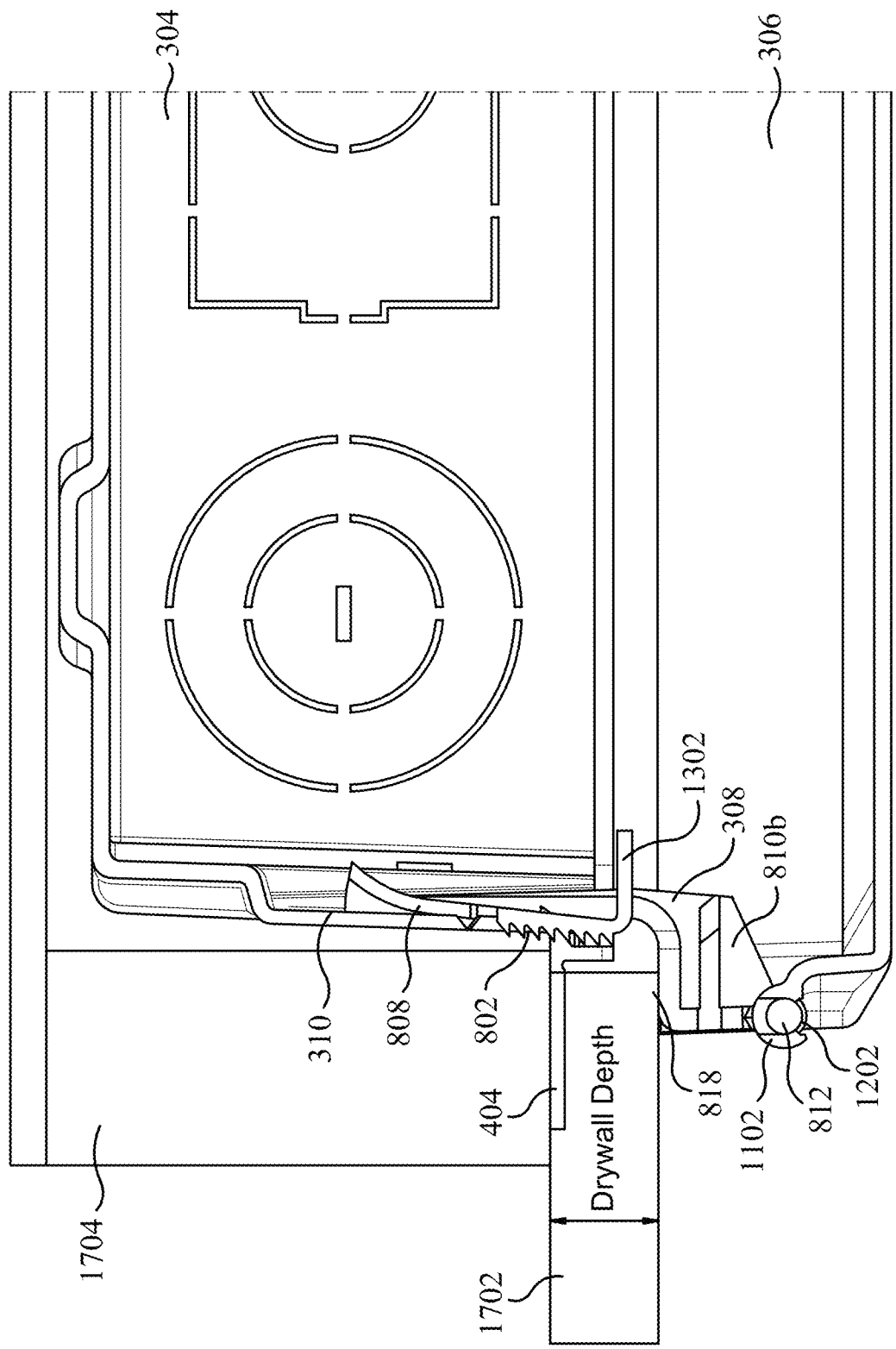
FIG. 17 is a cross-sectional top view of an enclosure main housing installed in a wall with a door attached to the main housing using an insertable mounting component.
Figure 18:
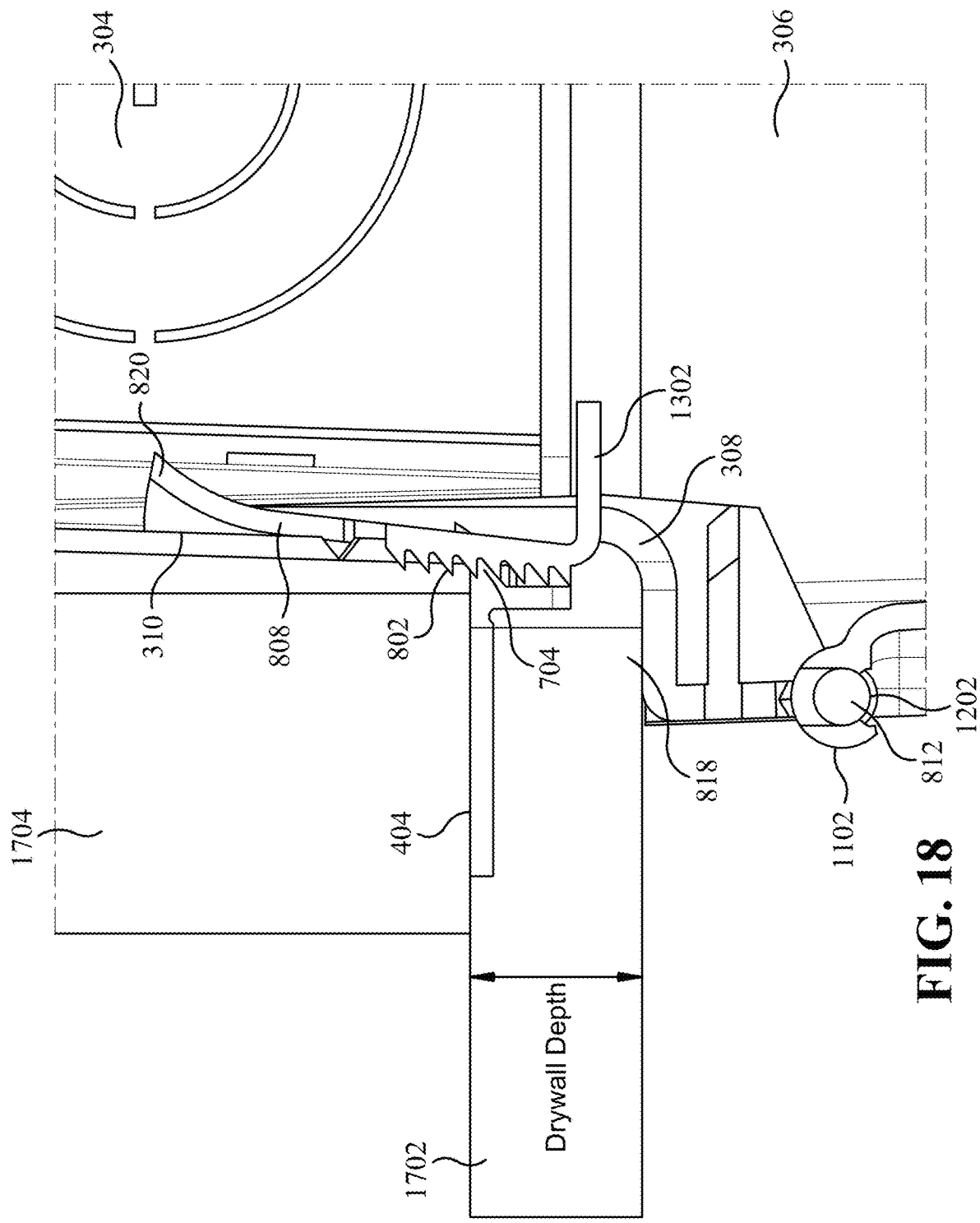
FIG. 18 is a close-up cross-sectional top view that illustrates interactions between an insertable mounting component, a slot, and drywall.

FIG. 17 is a cross-sectional top view of main housing 304 installed in a wall with the door 306 attached to the main housing 304 using insertable mounting component 308. In this illustrated example, brackets 404 of main housing 304 are mounted to studs 1704 in the wall (only the left stud 1704 and left-hand brackets 404 are depicted in FIG. 17 for clarity). A layer of drywall 1702 has been installed over the studs 1704 and around the main housing 304, with a cut-out removed from the drywall sheet to allow access to the interior of the main housing 304 of the enclosure. After the drywall 1702 is installed, insertable mounting component 308 is inserted into slot 310 of the main housing 304. FIG. 18 is a close-up cross-sectional top view that illustrates the interactions between insertable mounting component 308, slot 310, and drywall 1702 more clearly. The tapered end 820 of insertable mounting component 308 is inserted into slot 310 until the stopping surface 818 of the insertable mounting component 308 abuts against the drywall 1702. As the insertable mounting component 308 is pushed into slot 310, the ratchetting teeth 802 on the tongue 808 engage with the engagement feature 704 inside the slot 310 in a ratchetting manner to prevent the insertable mounting component 308 from being retracted from the slot 310 (unless released by applying pressure to release tab 1302). When the insertable mounting component 308 is pushed into the slot 310 to a depth that brings the stopping surface 818 into abutment with the drywall 1702, the engagement between the ratchetting teeth 802 on the tongue 808 and the engagement feature 704 in the slot 310 locks the insertable mounting component 308 at the present depth, preventing the insertable mounting component 308 from being withdrawn from the slot 310. Engagement between the ratchetting teeth 802 and the engagement feature 704 yields a set of possible insertion depths corresponding to each of the ratchetting teeth 802, such that the insertable mounting component 308 can be inserted to a depth corresponding to one of these possible depths and prevents removal of the insertable mounting component 308 while at this depth.

As can be seen in FIG. 18, the depth of the drywall 1702 determines how far the insertable mounting component 308 is inserted into slot 310. For thicker drywall depths, the insertable mounting component 308 will be inserted less deeply and will be held in place by one of the ratcheting teeth 802 closer to the tapered end of the tongue 808. For shallower drywall depths, the insertable mounting component 308 will be installed more deeply and will be held in place by one of the ratchetting teeth 802 nearer to the release tab 1302. Thus, the proper insertion depth of the insertable mounting component 308 is easily set without the use of tools by merely inserting the insertable mounting component 308 into slot 310 until stopping surface 818 abuts the drywall 1702.

Figure 19:
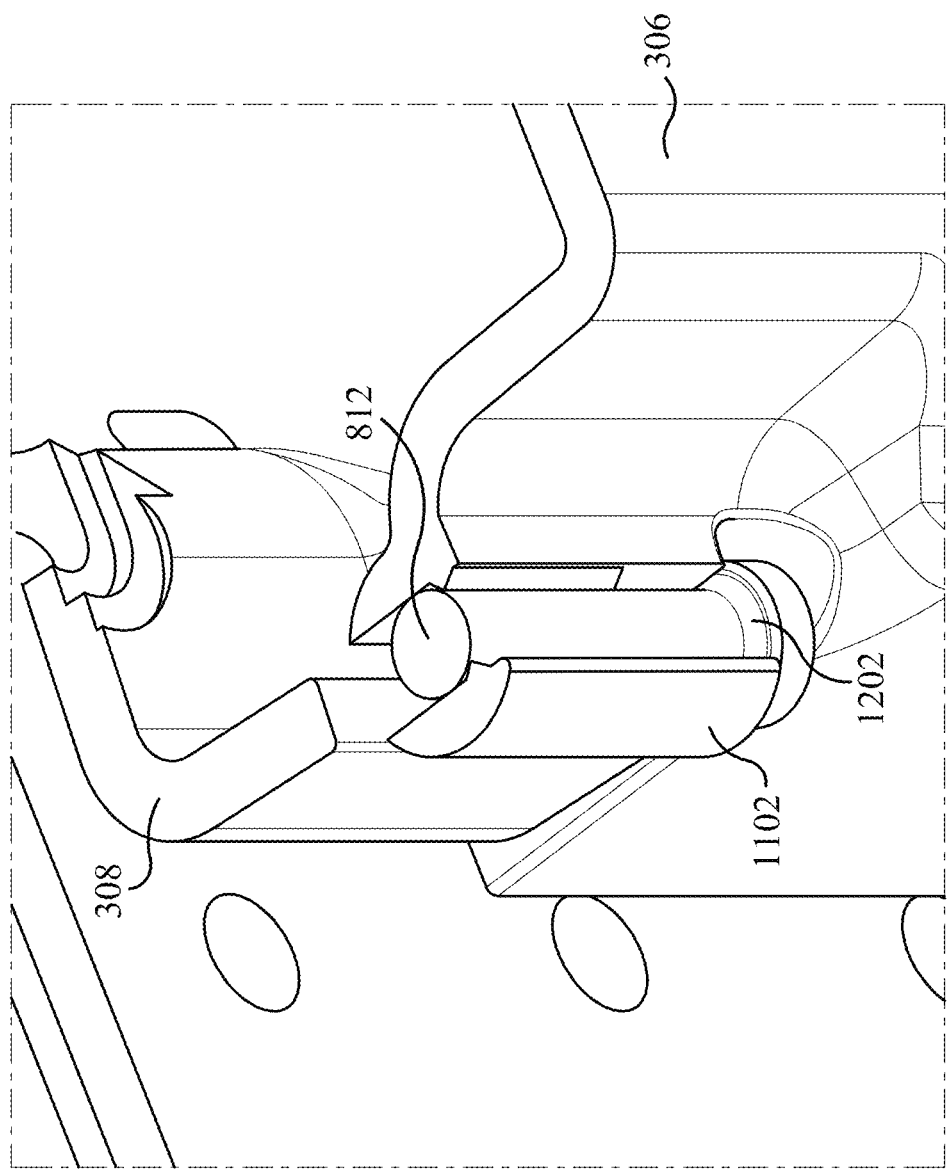
FIG. 19 is a close-up cross-sectional view of a hinge engaged with a rod of an insertable mounting component.

With the insertable mounting component 308 installed in the main housing 304, rod 812 is held vertically, allowing the hinge 1102 on door 306 to be engaged with the rod 812, as shown in FIGS. 17 and 18. FIG. 19 is a close-up cross-sectional view of hinge 1102 engaged with rod 812. The hinge 1102 can be engaged by snapping the rod 812 through the opening 1202 that runs along the length of the hinge 1102. Once engaged, the hinge 1102 can pivot freely about the rod 812, allowing door 306 to be swung open and closed. Although not shown in FIG. 19, some embodiments of the door 306 and/or the rod 812 may include a detent positioned to prevent the door 306 from accidentally swinging to the closed position once the door 306 has been opened past a certain angle. The detent can introduce a degree of resistance that prevents the door 308 from swinging to the closed position, but which can be overcome with a relatively small amount of pressure applied to the door 308 by hand.

Figure 20:
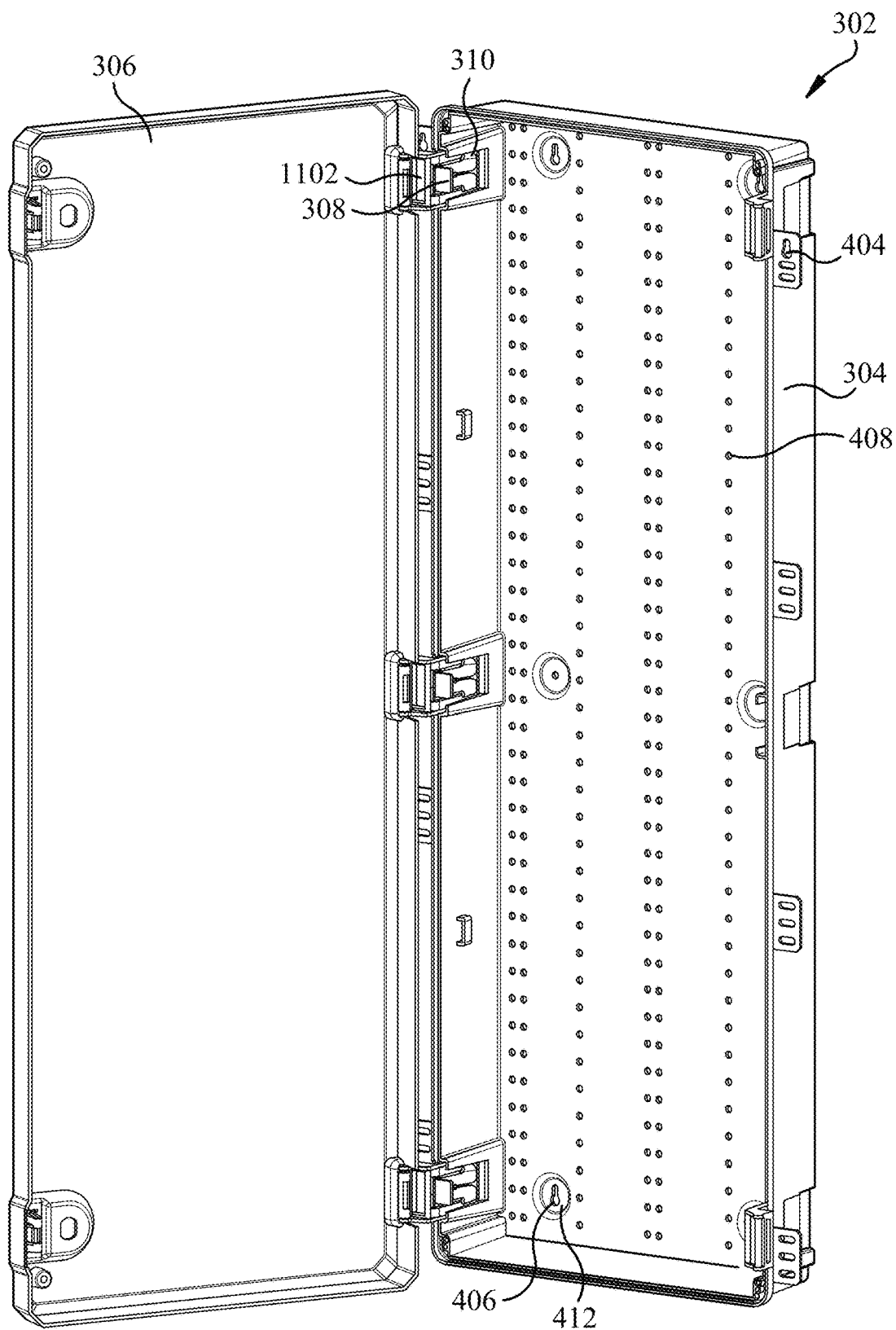
FIG. 20 is a view of an enclosure with a door attached to the enclosure's main housing using insertable mounting components.

FIG. 20 is a view of enclosure 302 with door 306 attached to main housing 304 using insertable mounting components 308. The enclosure main housing 304 depicted in FIG. 20 comprises three slots 310 on each of its two vertical sides. The insertable mounting components 308 installed in the three slots 310 on the left-hand vertical side serve as hinges for door 306, with each of the three hinges 1102 of door 306 being engaged with one of the three left-hand insertable mounting components 308 as described above in connection with FIGS. 16-19. Other embodiments of main housing 304 and door 306 may have different numbers of slots 310 and hinges 1102 on their vertical sides, where the number of slots 310 and hinges 1102 may depend on the size of the enclosure's vertical dimension. For example, FIG. 3 depicts a shorter enclosure 302 comprising only two slots 310 on each vertical side of main housing 304.

Figure 21:
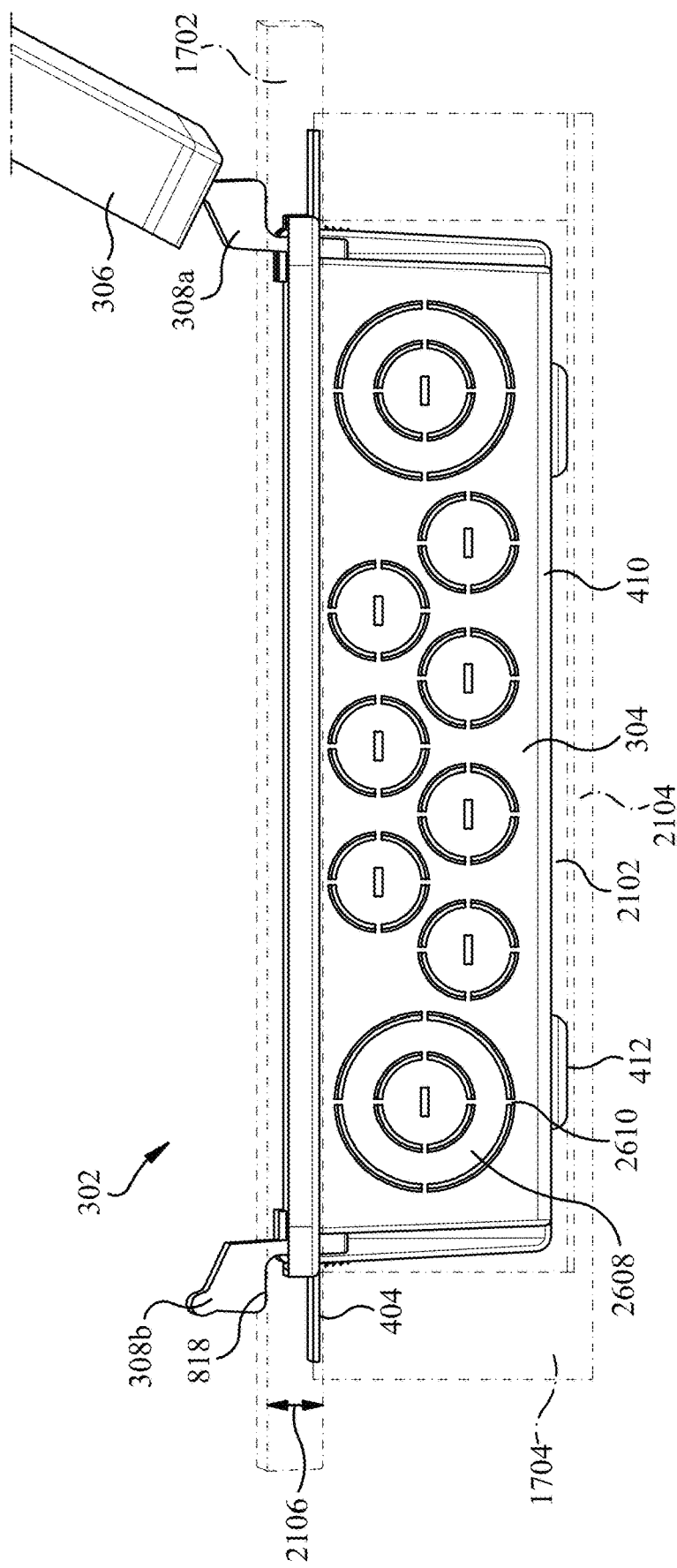
FIG. 21 is a top view of an enclosure installed in a wall with its door open.

FIG. 21 is a top view of enclosure 302 installed in a wall with door 306 open. Insertable mounting components 308 have been inserted into the slots until stopping surface 818 of each component 308 abuts against drywall 1702, thereby setting the insertion depth of the insertable mounting components 308 to correctly accommodate depth 2106 of drywall 1702. Offsets 412 on the rear wall 410 of main housing 304 maintain a clearance 2102 between the rear wall 410 and an interior surface 2104 within the wall if the main housing 304 abuts against the interior surface 2104. As described above, insertable mounting components 308 are installed in the left-side and right-side slots of main housing 304, with the hinges of door 306 attached to insertable mounting components 308a on one vertical side of the main housing 304. The engagement between rods 812 on the insertable mounting components 308 and hinges 1102 on the door 306 allows the door 306 to swing freely about rods 812. In the presently described one-piece embodiment, the same type of insertable mounting component 308 is installed in both vertical sides of main housing 304. That is, insertable mounting components 308a and 308b are of the same type, with insertable mounting components 308a serving as hinges and insertable mounting components 308b serving as latches.

Figure 22:
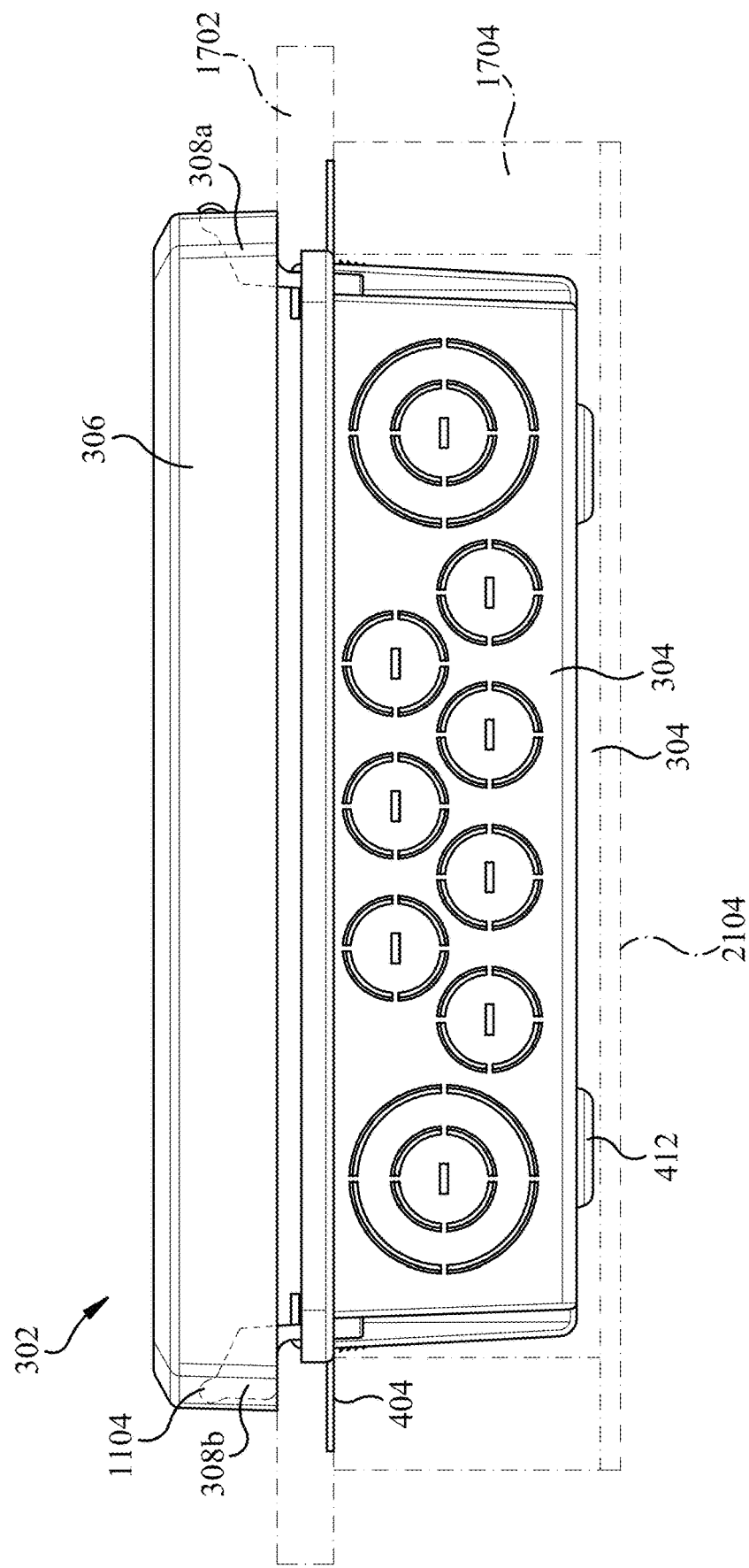
FIG. 22 is a top view of an enclosure inside the wall with its door closed.
Figure 23A:
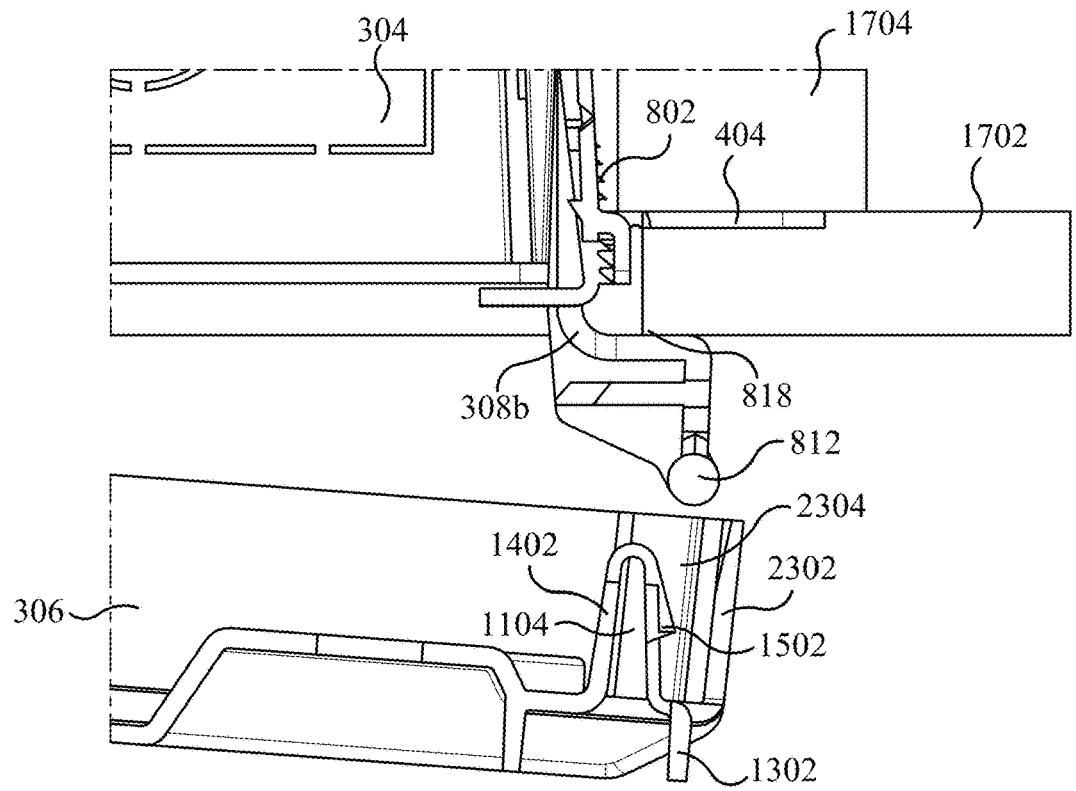
FIG. 23a is a close-up cross-sectional top view of an enclosure main housing and door as the door is being swung into the closed position.
Figure 23B:
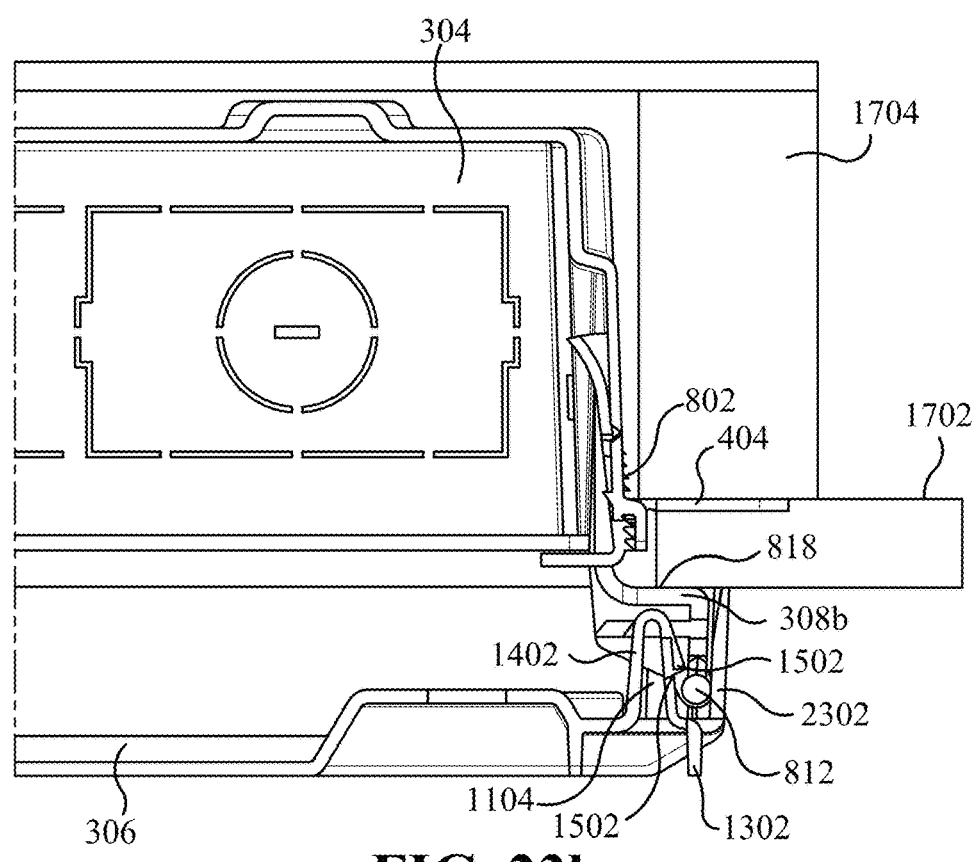
FIG. 23b is a close-up cross-sectional top view of the enclosure main housing and door with the door in the closed position.
Figure 24:
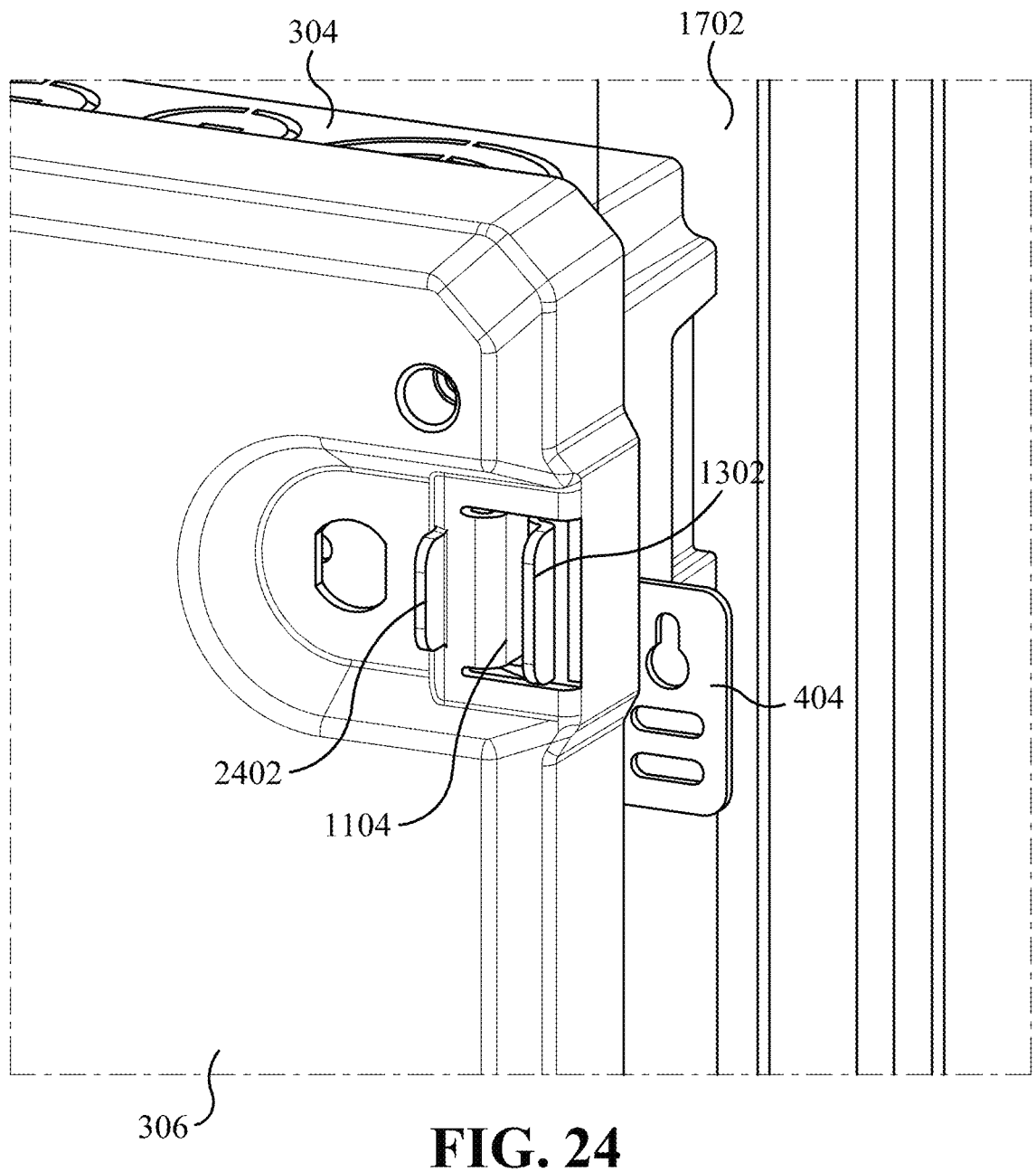
FIG. 24 is a close-up exterior view of a latch that shows a release tab protruding through the enclosure door.

FIG. 22 is a top view of enclosure 302 inside the wall with door 306 closed. Door 306 has been swung closed such that latches 1104 on door 306 engage with insertable mounting components 308b installed on the opposite vertical side of main housing 304 relative to insertable mounting components 308a. FIGS. 23a and 23b are close-up cross-sectional top views of main housing 304 and door 306 illustrating engagement of door latches 1104 and insertable mounting components 308. FIG. 23a depicts door 306 approaching insertable mounting component 308 as the door 306 is being swung into the closed position. While door 306 is hinged to the main housing 304, the space 2304 between flexible arms 1402 of latch 1104 and the vertical wall 2302 adjacent to the latch 1104 is aligned with rod 812 of insertable mounting component 308b. This alignment causes rod 812 to engage with the raised latching protrusion 1502 formed on the outer leg of flexible arm 1402 when the door 306 is closed. Once door 306 is swung to a position at which rod 318 comes into contact with latching protrusion 1502, application of force to the door 306 causes rod 812 to snap into position behind latching protrusion 1502, as shown in FIG. 23b. Flexible arms 1402 of latch 1104 are displaced by the interaction between rod 812 and latching protrusion 1502, allowing rod 812 to move into position behind latching protrusion 1502. While door 306 is in this fully closed position, latching protrusion 1502 prevents door 306 from being opened by locking the rod 812 into place within space 2304. To disengage latch 1104 and open the door 306, pressure can be applied to release tab 1302 to displace flexible arms 1402, thereby disengaging the latching protrusion. FIG. 24 is a close-up exterior view of latch 1104 that shows release tab 1302 protruding through the door 306. In some embodiments, fixed tab 2402 can be formed on the door near the latch 1104 and oriented substantially parallel with the release tab 1302. This fixed tab 2402 can aid the user in unlatching the door 306 by serving as a purchase for the user's finger or thumb, allowing release tab 1302 to be displaced using a pinching action.

The embodiments described above can simplify installation of wall-mounted electrical enclosures by allowing the installation depth of the enclosure's door hinges and latches to be set to match the thickness of the surrounding drywall without the use of tools. For the one-piece embodiments described above, a single type of insertable mounting component 308 can be used as either a hinge or a latch for the enclosure, reducing the number of different types of mounting components that must be kept in stock for enclosure installations.

Figure 25:
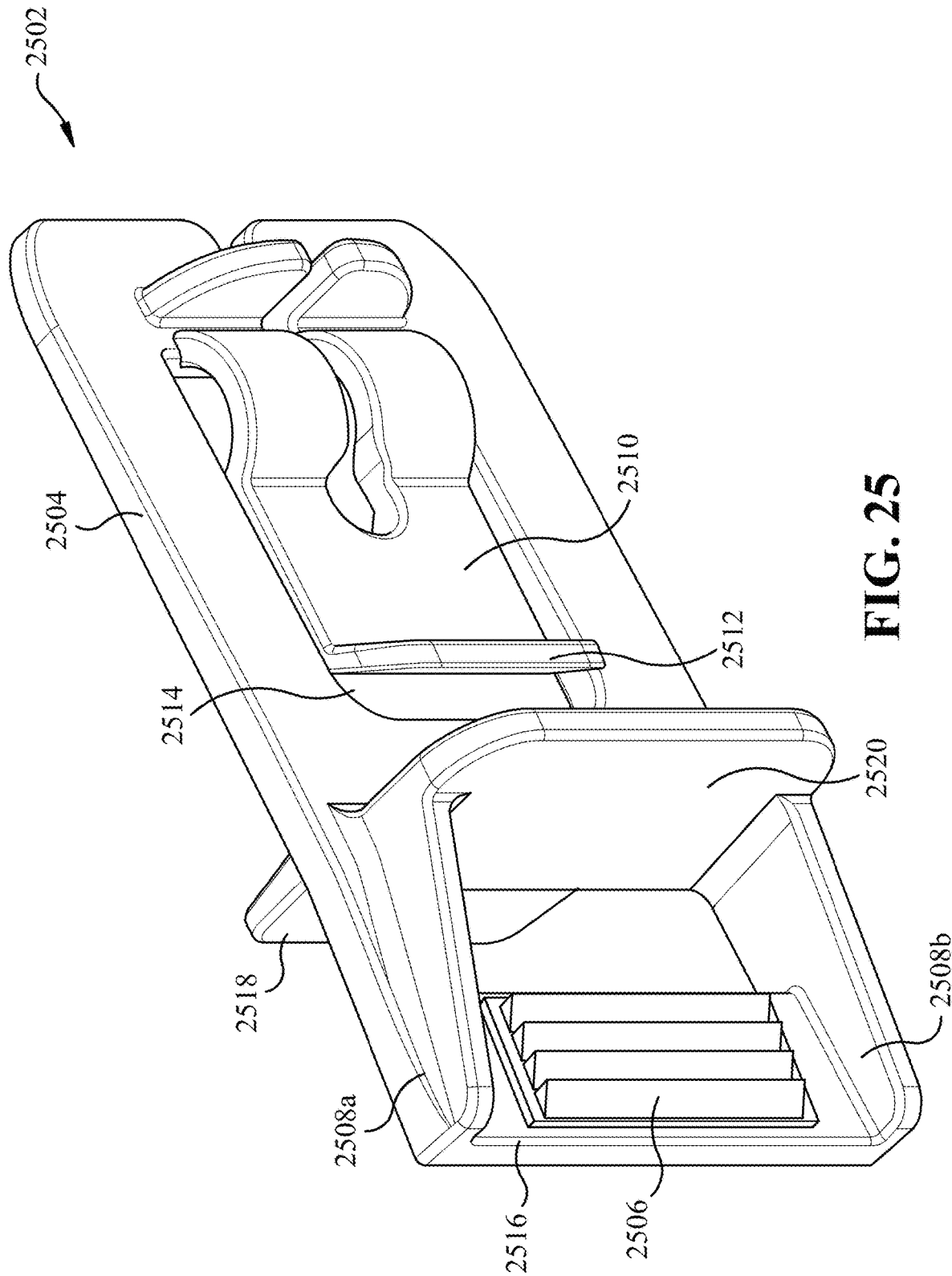
FIG. 25 is a perspective view of an example insertable latch component that serves as a latch for a two-piece embodiment.

As an alternative to the one-piece embodiment described above, some embodiments of the enclosure mounting system may employ a two-piece design in which two different types of insertable mounting components are used as hinges and latches, respectively. FIG. 25 is a perspective view of an example insertable latching component 2502 that serves as a latch for a two-piece embodiment. Similar to the insertable mounting component 308 described above, insertable latching component 2505 comprises a tongue 2504 configured to be inserted into slots 310 of the enclosure's main housing 304. A flexible strip 2510 resides within a cut-out 2514 in the middle portion of tongue 2504, similar to flexible strip 804 of insertable mounting component 308. A release tab 2512 for disengaging insertable latching component 2505 from slot 310 is formed on the free end of flexible strip 2510.

Two arms 2508a and 2508b extend from an end of tongue 2504 opposite the end that is inserted into the slot 310. A latching plate 2516 is held between the two arms 2508a and 2508b. A set of parallel ratchetting teeth 2506 are formed on one side of the latching plate 2516 and are configured to engage with latching protrusion 1502 of hinge 1102 on door 306. A wall stopping surface 2518 extends from one side of the insertable latching component 2502 substantially orthogonally to the plane of tongue 2504. Wall stopping surface 2518 extends from the side of the insertable latching component 2502 opposite the side on which the ratchetting teeth 2506 are formed. A door stopping surface 2520 extends from the side of insertable latching component 2502 opposite the side from which wall stopping surface 2518 extends.

The hinge component of the two-piece embodiments is substantially similar to the insertable mounting component 308 described above for the one-piece embodiment (see, e.g., FIGS. 8-10).

Figure 26:
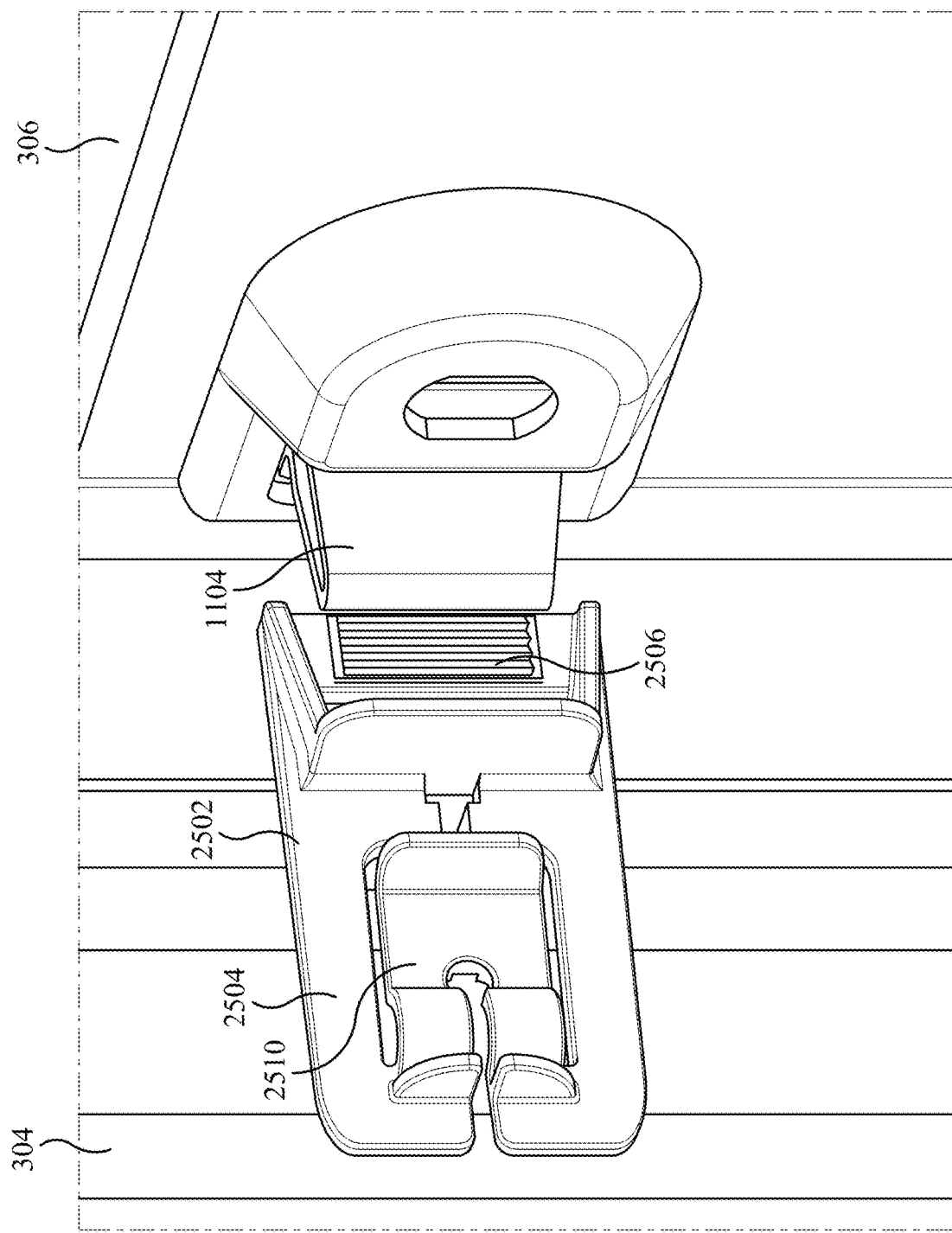
FIG. 26 is an interior view of an enclosure depicting an insertable latching component installed in an enclosure main housing as the door is moved toward the closed position.
Figure 27:
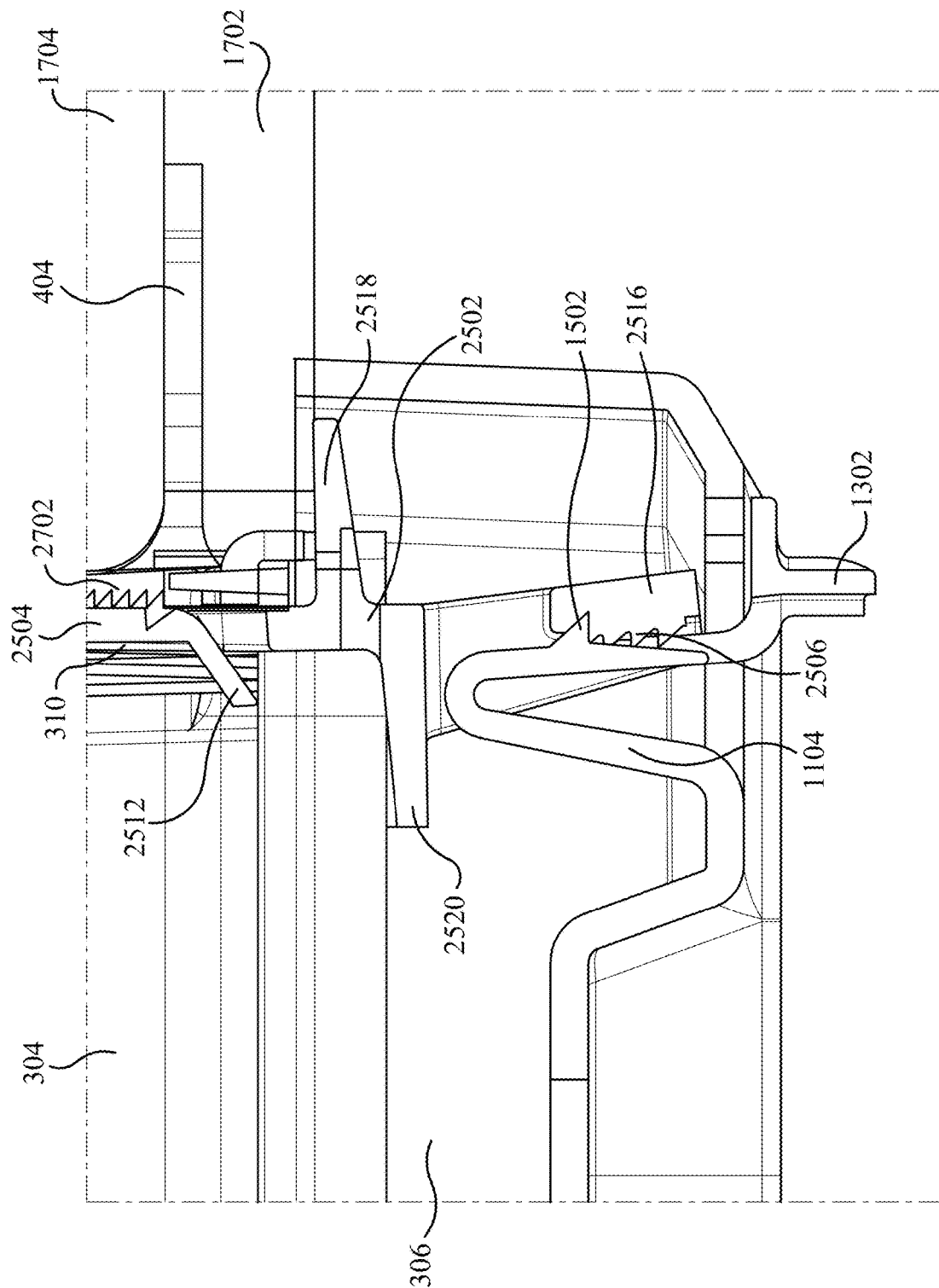
FIG. 27 is a cross-sectional top view of an insertable latching component installed in a slot of an enclosure main housing with the door in the closed position.

FIG. 26 is an interior view of an enclosure depicting insertable latching component 2502 installed in main housing 304 as door 306 is moved toward the closed position. FIG. 27 is a cross-sectional top view of insertable latching component 2502 installed in slot 310 of the main housing 304 with door 306 in the closed position. For clarity, FIGS. 26 and 27 only depict the vertical side of main housing 304 and door 306 containing the latching components. Although not shown in FIGS. 26 and 27, it is assumed that the hinges 1102 of door 306 are engaged with the insertable mounting components 308 on the opposite vertical side (not shown) of the main housing 304.

Tongue 2504 of insertable latching component 2502 has been installed in slot 310. As can be seen in FIG. 27, a second set of parallel ratchetting teeth 2702 are formed on one side of flexible strip 2510 (part of tongue 2504). This second set of parallel ratcheting teeth 2702 perform a similar function to ratchetting teeth 802 of the one-piece embodiments, engaging with engagement feature 704 of slot 310 in a ratchetting manner as the insertable latching component 2502 is inserted into the slot 310, thereby locking the insertable latching component 2502 inside slot 310 at a depth determined by the thickness of drywall 1702. Insertable latching component 2502 is inserted into slot 310 until wall stopping surface 2518 abuts drywall 1702, as described in previous examples.

Latch 1104 of door 306 has the same design as that described and illustrated above for the one-piece embodiments. However, rather than engaging with rod 812, the latching protrusion 1502 of latch 1104 engages with the ratchetting teeth 2506 of latching plate 2516. Latching plate 2516 comprises multiple ratchetting teeth 2506 with which latching protrusion 1502 can engage, thereby affording a degree of installation tolerance between the door 306, main housing 304, and drywall 1702. Door stopping surface 2520 is oriented to block excessive forward travel of latch 1104, and thus serves as a backstop for door 306 if the latching protrusion 1502 travels beyond the deepest of the ratchetting teeth 2506. As in the one-piece embodiments, latch 1104 can be disengaged by applying pressure on release tab 1302 to displace latching protrusion 1502.

Figure 28:
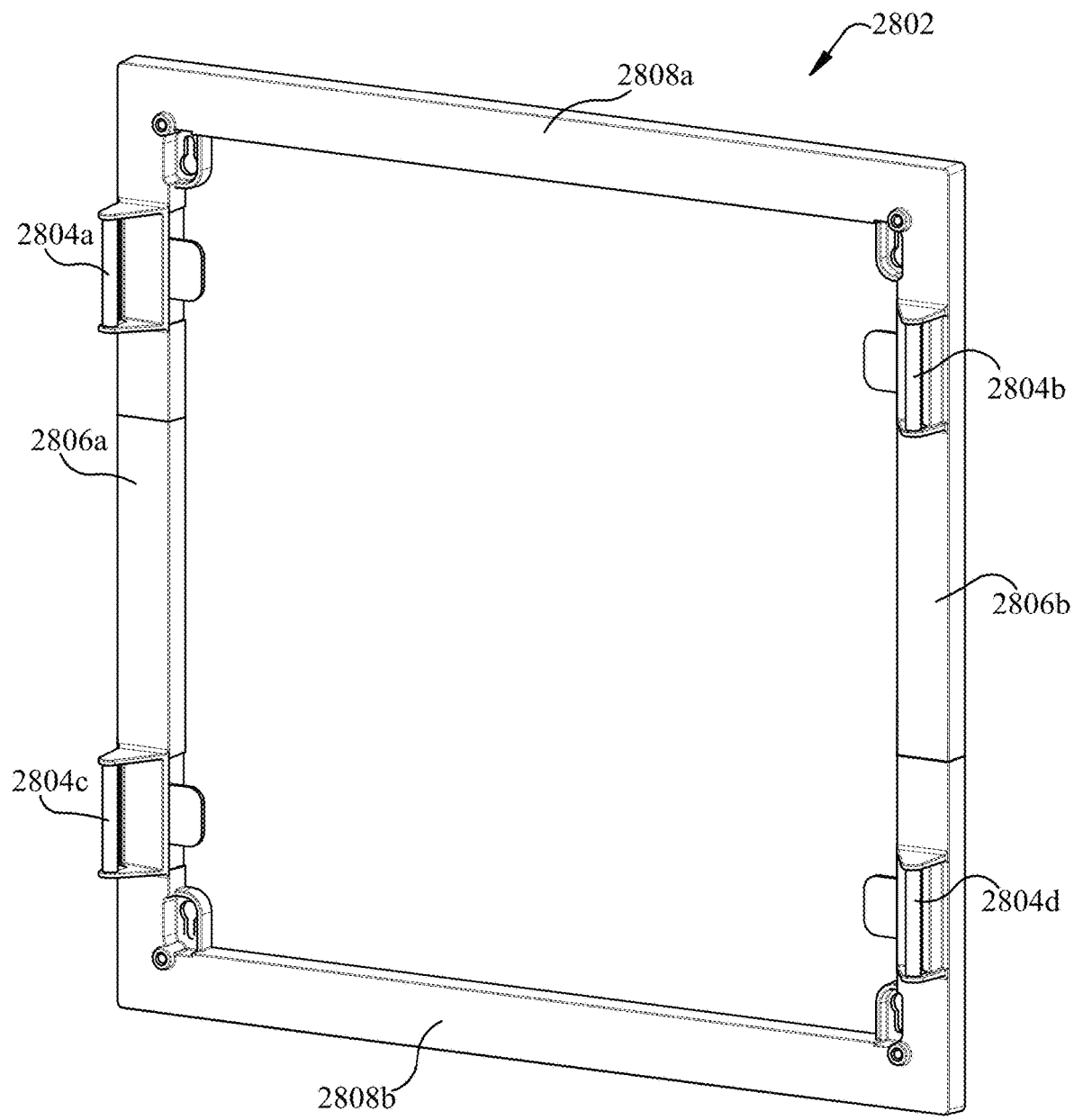
FIG. 28 is a perspective view of an example trim ring that can be used to mount an enclosure door to an enclosure main housing.

The one-piece and two-piece embodiments described above use insertable hinge and latch components to mount door 306 to main housing 304. Some embodiments can also allow a trim ring with integrated hinge and latch components to be installed on main housing 304 as an alternative to the insertable components. FIG. 28 is a perspective view of an example trim ring 2802 that can be used to mount door 306 to main housing 304. Trim ring 2802 comprises a rectangular frame having a profile that substantially matches that of main housing 304. Engagement mechanisms 2804a-2804b are formed on the vertical sides 2806a and 2806b of trim ring 2802. In the example depicted in FIG. 28, each vertical side 2806 includes two engagement mechanisms 2804 located near the respective top and bottom corners of the vertical side 2806.

Figure 29:
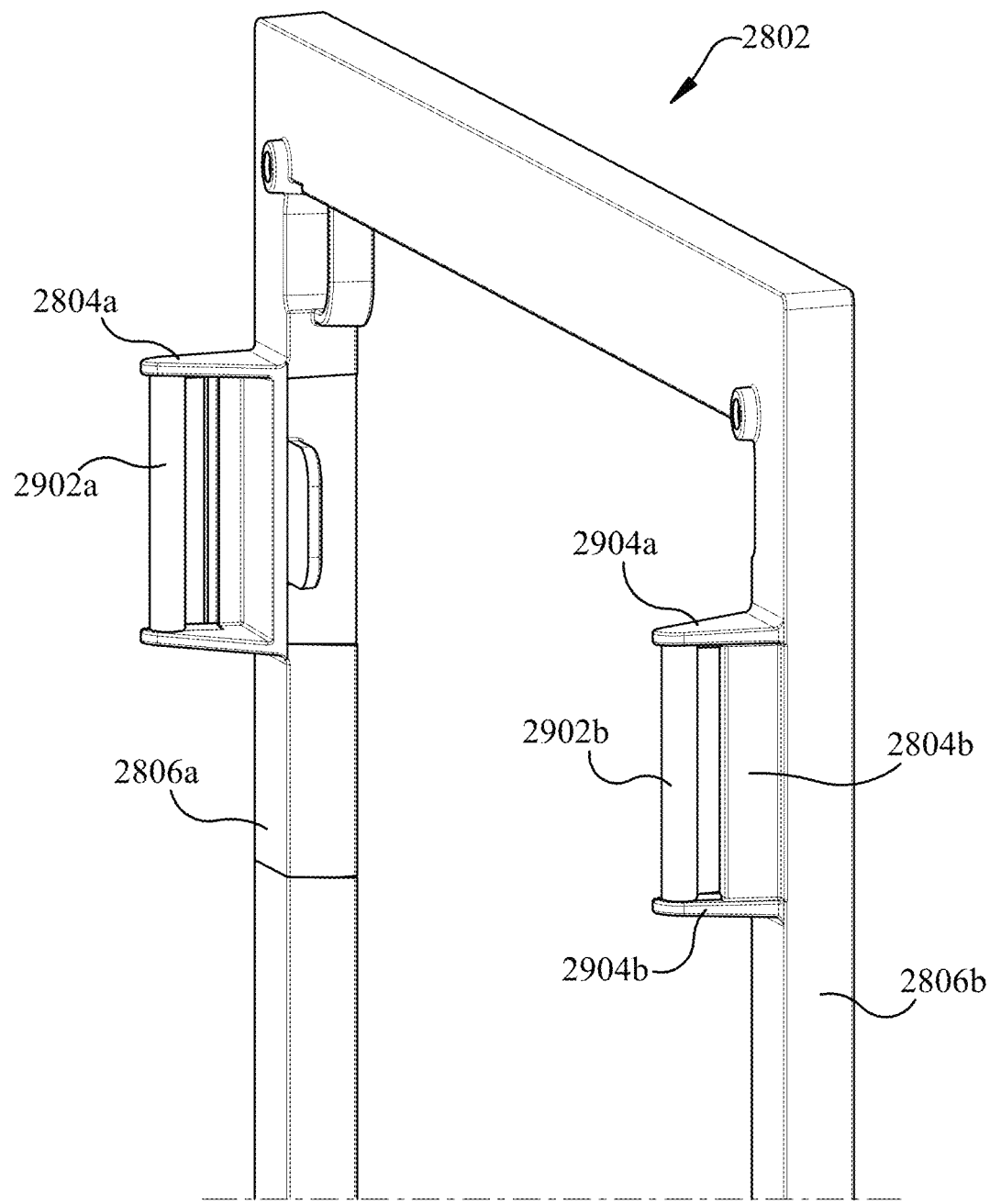
FIG. 29 is a close-up view of a trim ring showing an engagement mechanism formed on the trim ring.

FIG. 29 is a close-up view of trim ring 2802 showing the engagement mechanism 2804 in more detail. The design of each engagement mechanism 2804 is generally similar to that of the engagement mechanism of the insertable mounting component 308 described above. Each engagement mechanism 2804 comprises two arms 2904a and 2904b that protrude from the vertical side 2806 of trim ring 2802 toward a front of the trim ring 2802 (substantially perpendicular to the front face of the vertical side 2806), and a rod 2902 is held vertically between the two arms 2904a and 2904b. The rods 2902 of engagement mechanisms 2804 serve the same function as rods 812 of insertable mounting component 308. Specifically, rods 2902 on one of the vertical sides 2806a of trim ring 2802 serve as hinges for door 306, while the rods 2902 on the other vertical side 2806b serve as latches for door 306.

Figure 30:
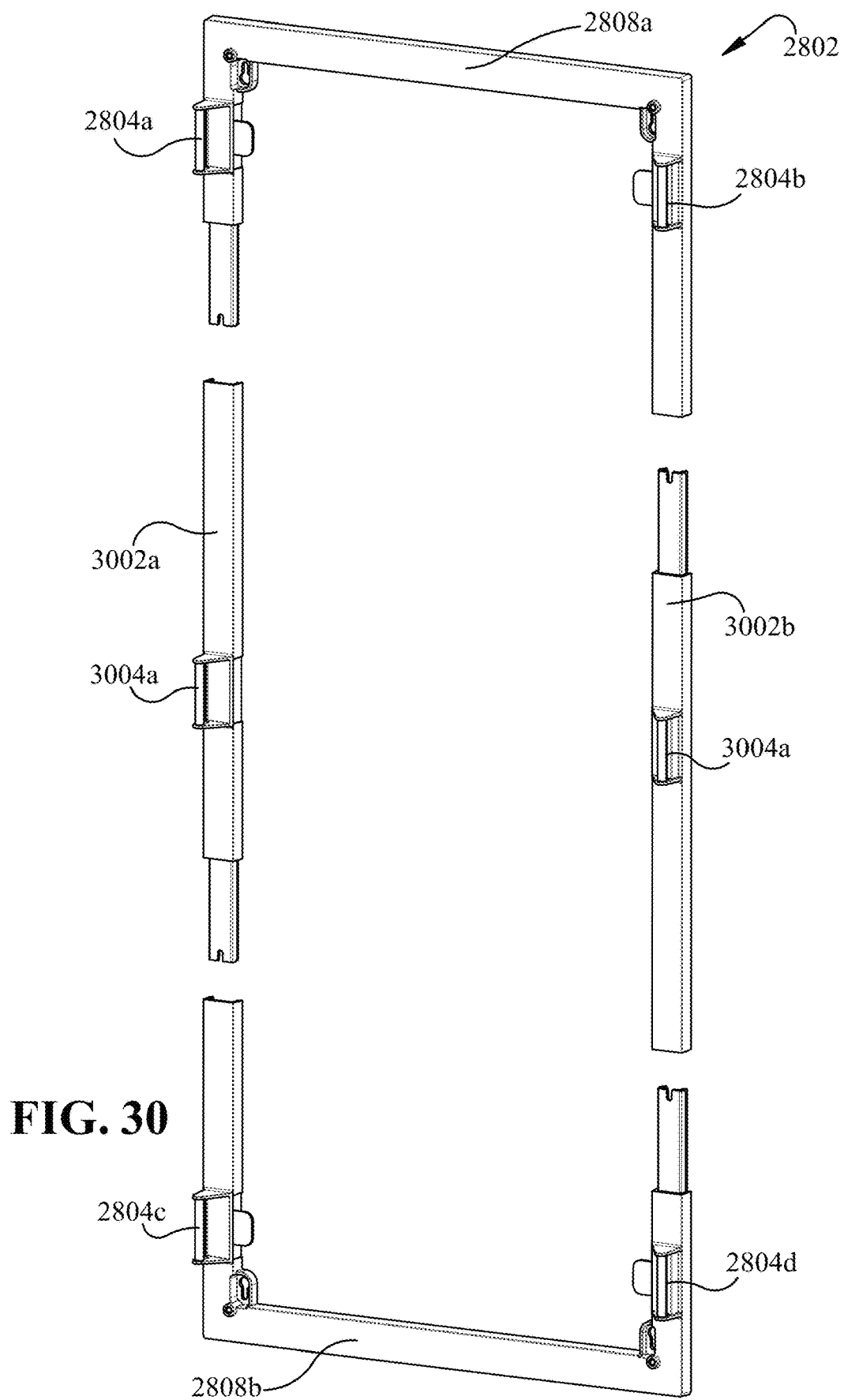
FIG. 30 is an exploded view of an example trim ring illustrating the addition of extension elements to adapt the trim ring for a taller enclosure.

Some embodiments of trim ring 2806 can have a modular construction, whereby the trim ring 2806 comprises two separate trim ring components 2808a and 2808b that snap together to form the assembled trim ring. This modular construction can also allow the trim ring 2806 to be easily adapted for taller enclosures by adding modular extension elements. FIG. 30 is an exploded view of example trim ring 2802 illustrating the addition of extension elements 3002a and 3002b to adapt the trim ring 2802 for a taller enclosure. Upper and lower trim ring components 2808a and 2808b can be separated, and extension elements 3002a and 3002b can be installed between the components 2808a and 2808b. Engagement mechanisms 3004a and 3004b similar to engagement mechanisms 2804a and 2804b are formed on each of the extension elements 3002a and 3002b. Thus, a third hinge and a third latch are added to the trim ring when the extension elements 3002a and 3002b are installed.

Figure 31:
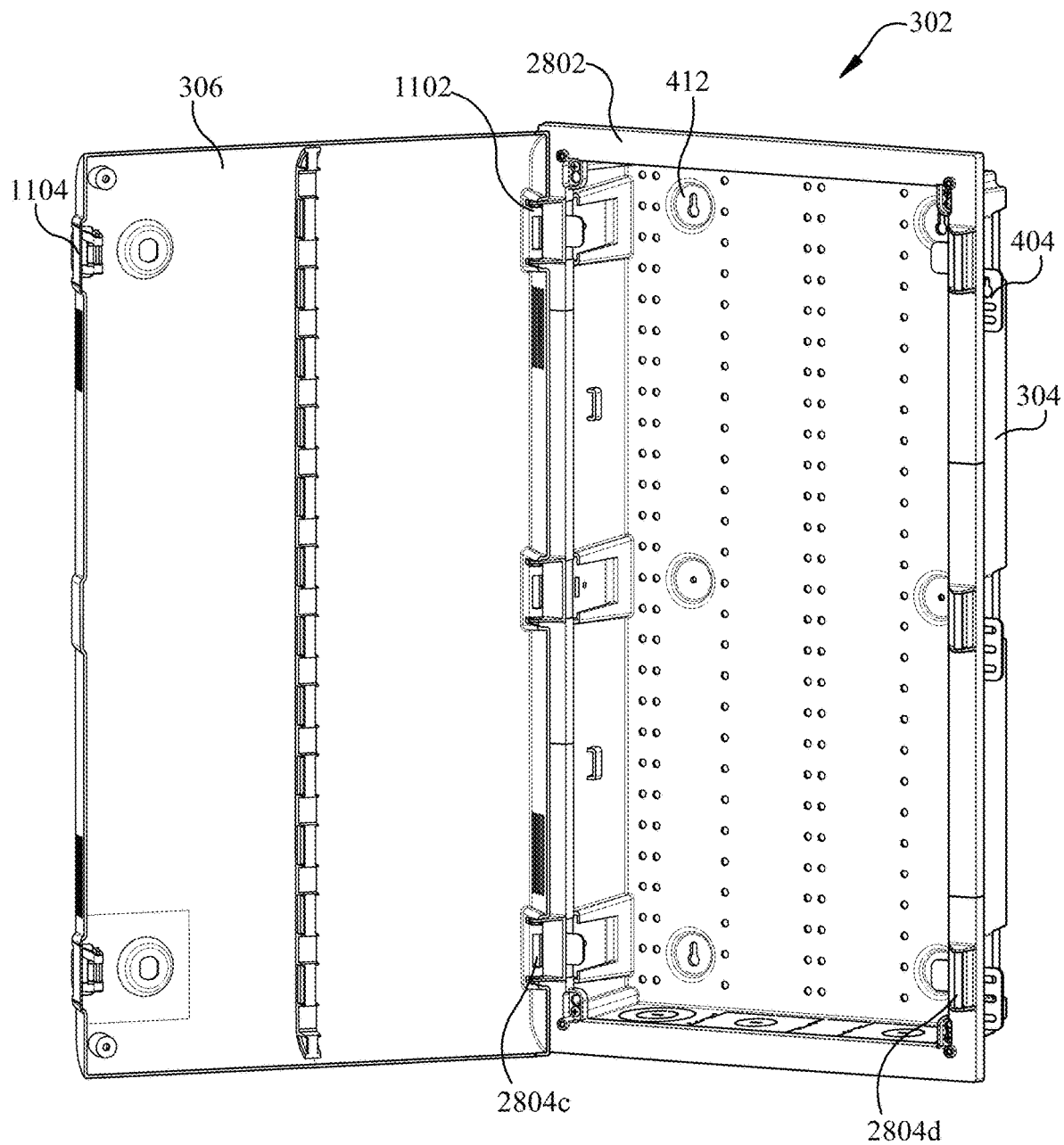
FIG. 31 is a perspective view of an enclosure in which a door is installed on a trim ring.

FIG. 31 is a perspective view of enclosure 302 in which door 306 is installed on trim ring 2802. In the illustrated example, trim ring 2805 has been extended to correspond to the height of main housing 304. This assembled trim ring 2802 can be mounted to the front of main housing 304. Hinges 1102 of door 306 can be rotatably engaged with engagement mechanisms 2804 in the same manner as insertable mounting components 308 (see, e.g., FIGS. 16 and 19). In the example depicted in FIG. 31, hinges 1102 are attached to the engagement mechanisms 2804 on the left vertical side of trim ring 2802 (e.g., engagement mechanism 2804c). When door 306 is closed, latches 1104 of door 306 engage with the engagement mechanisms 2804 on the right vertical side of trim ring 2802 (e.g., 2804d) in a manner similar to engagement between latches 1104 and insertable mounting components 308 (see, e.g., FIGS. 23*a* and 23*b*), thereby holding door 306 in the closed position until the latches 1104 are disengaged using release tab 1302.

Figure 32:
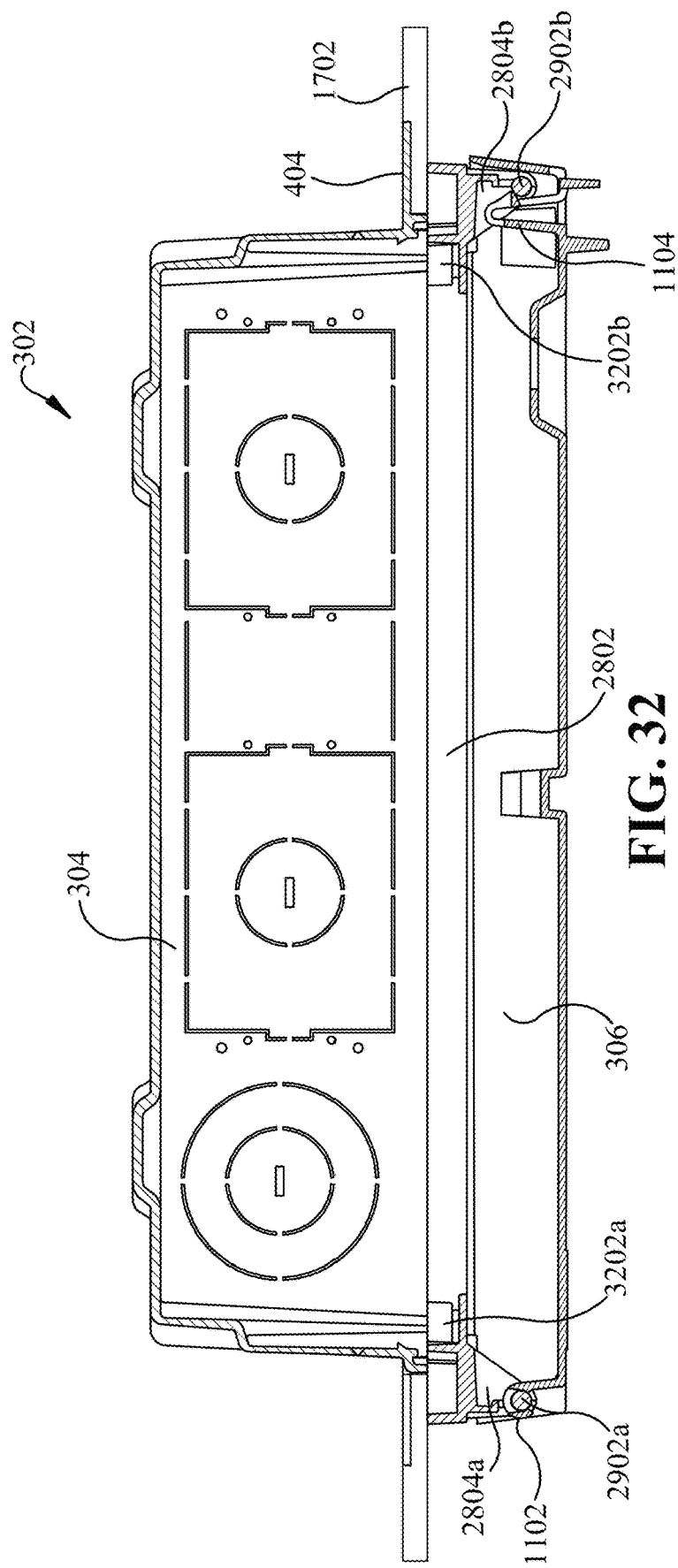
FIG. 32 is a cross-sectional top view of an enclosure installed in a wall with a door attached using a trim ring.

FIG. 32 is a cross-sectional top view of enclosure 302 installed in a wall with door 306 attached using trim ring 2802. After main housing 304 has been installed in the wall and drywall 1702 has been installed around the main housing 304, trim ring 2802 can be attached to the front of main housing 304 using suitable mounting hardware 3202 (e.g., screws or bolts). After trim ring 2802 has been mounted to the front of main housing 304, door 306 can be mounted to the trim ring as described above.

Figure 33:
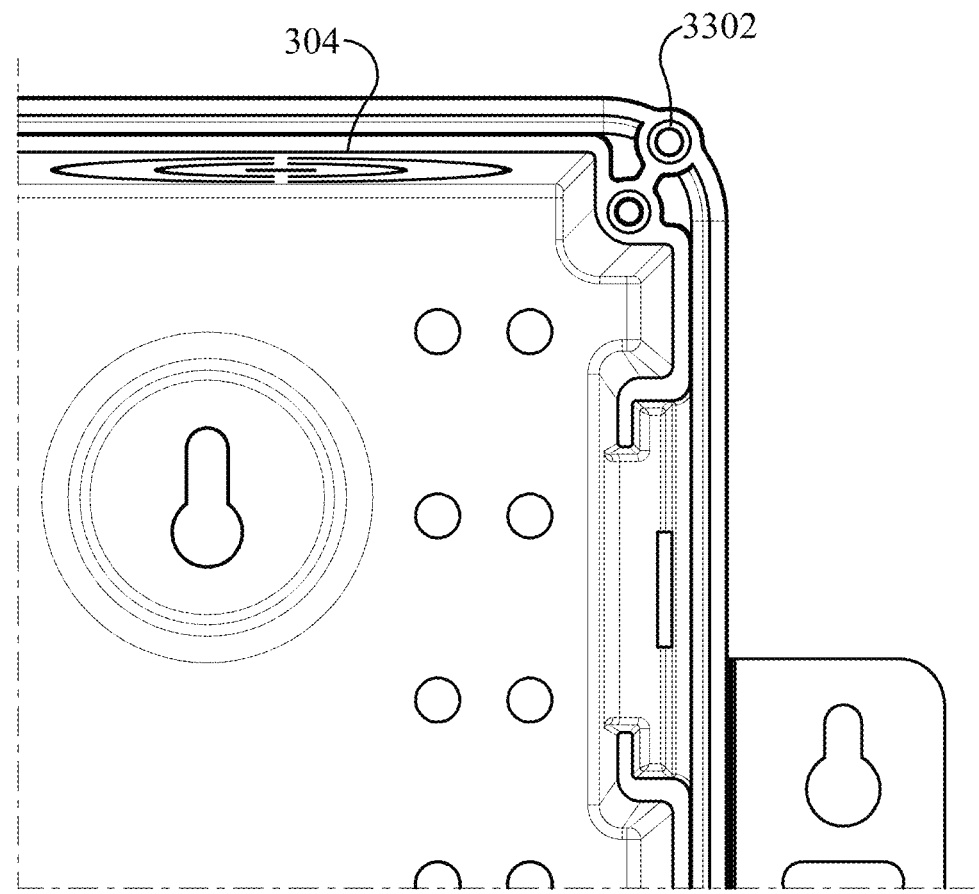
FIG. 33 is a close-up view of the top right corner of an enclosure main housing depicting a trim ring mounting hole that can accommodate trim ring mounting hardware.

FIG. 33 is a close-up view of the top right corner of main housing 304 depicting a trim ring mounting hole 3302 that can accommodate the trim ring mounting hardware 3202. Each corner of main housing 304 can include one or more such trim ring mounting holes 3302 to facilitate mounting trim ring 2802 to the main housing 304.

Figure 34:
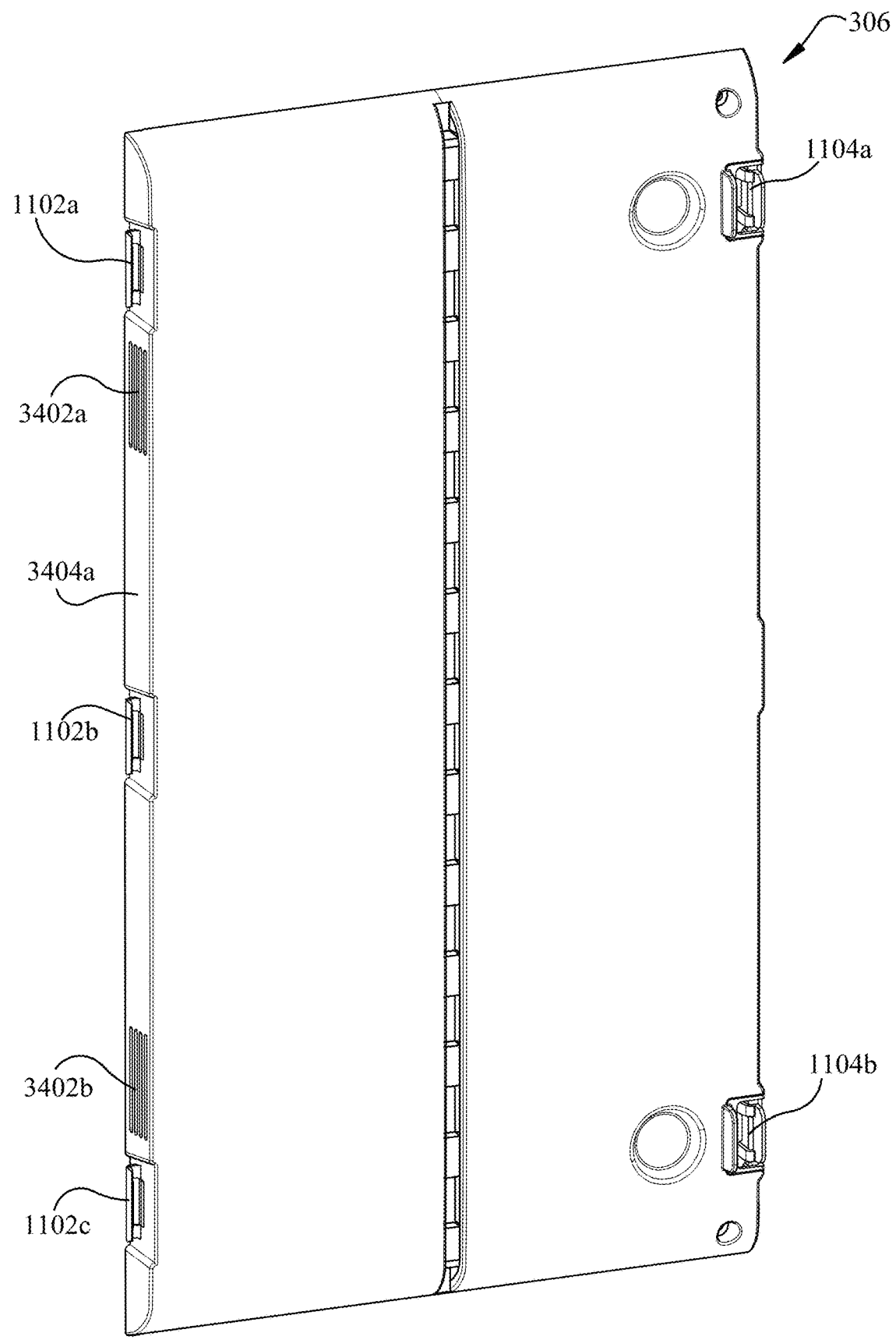
FIG. 34 is a front perspective view of an example door having vertical sides on which side-mounted vents are formed.
Figure 35:
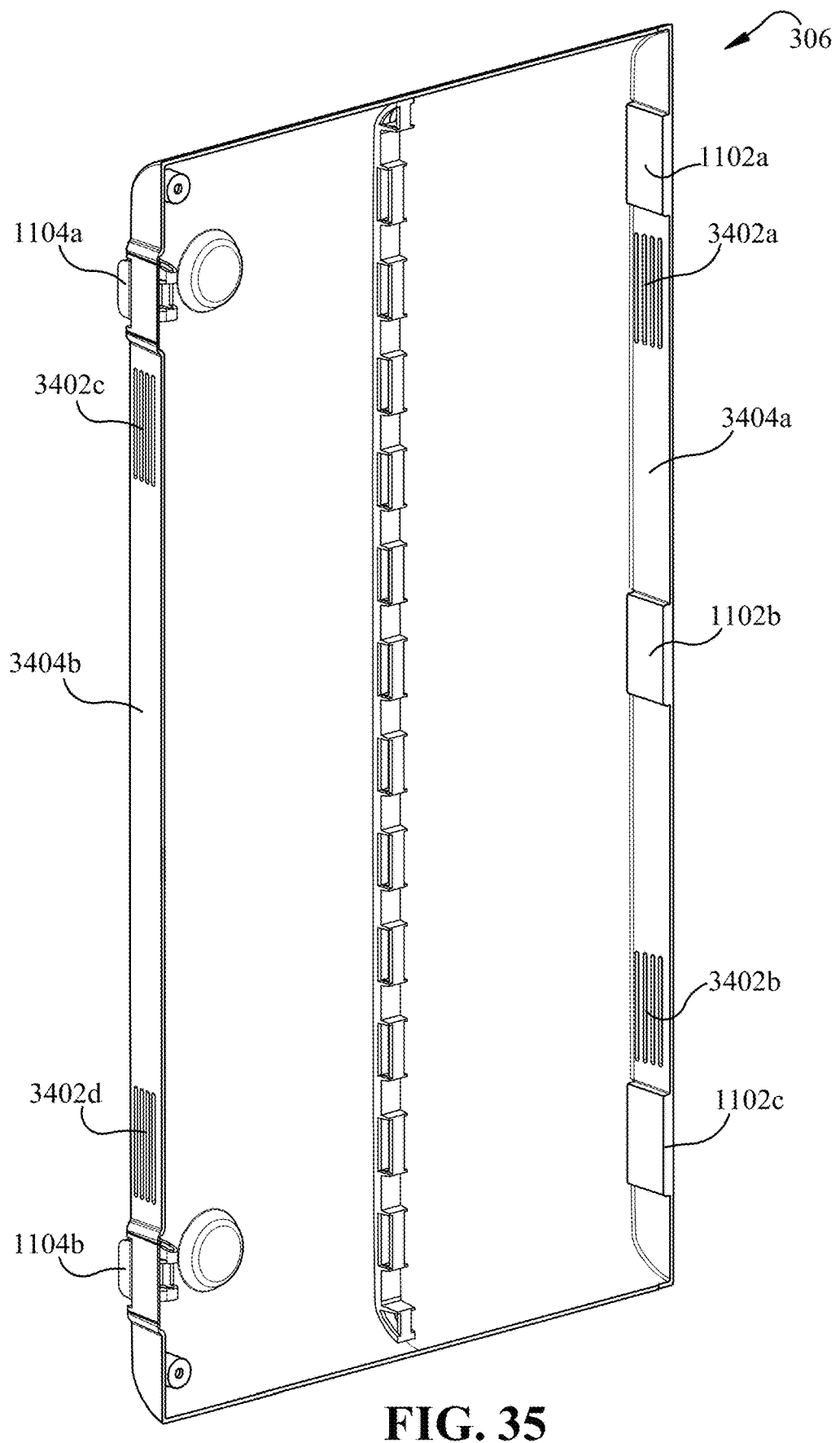
FIG. 35 is a rear perspective view of the example door having vertical sides on which side-mounted vents are formed.

In some embodiments, door 306 can include side-mounted vents that facilitate air flow through the enclosure 302 and allow heat to escape from the enclosure 302. FIGS. 34 and 35 are front and rear perspective views, respectively, of an example door 306 having vertical sides 3404*a* and 3404*b* on which side-mounted vents 3402 are formed. In many constrained installation environments, there may be little or no spacing between the front face of the enclosure door and other equipment. Objects may also sometimes be placed against the front of the enclosure, as when the enclosure is mounted on the rear wall of a closet and is blocked by clothing hung in front of the enclosure. Consequently, air vents formed on the front face of an enclosure door 306 may be susceptible to blockage by other equipment or objects, preventing air flow and heat release. By contrast, air flow vents 3402 located on the vertical sides of door 306 rather than on the front face of the door 306 are less susceptible to blockage and can therefore ensure continuous air flow through the enclosure 302.

In the illustrated example, two side-mounted vents 3402 are formed on each vertical side 3404 of door 306. Vents 3402*a* and 3402*b* are formed on the left vertical side 3404*a*, and vents 3402*c* and 3402*d* are formed on the right vertical side 3404*b*. This configuration can promote air flow in a number of different directions through the enclosure 302 (e.g., from bottom to top, from top to bottom, laterally across the enclosure, or diagonally through the enclosure). Thus, the side-mounted vents 3402 depicted in FIGS. 34 and 35 afford more air flow patterning possibilities relative to front-mounted vents, which only allow heat to be released through the front face of the enclosure door.

Some embodiments of the enclosure's main housing 304 may also include additional features that can streamline the installation process. For example, as shown in FIG. 21, main housing 304 can have a number of knock-outs 2608 formed on one or more of the enclosure's walls. These knock-outs 2608 comprise partially cut holes in which the circular disk of material to be removed is attached to surrounding material of the main housing 304 by four bridges 2610 (uncut segments of the circular cut). These bridges 2610 can be cut by an installer so that the circular disk of material can be removed, thereby opening the hole. Multiple knock-outs 2608 can be formed on the main housing 304 so that the installer can open selected knock-outs 2608 for installation of conduit.

Figure 36B:
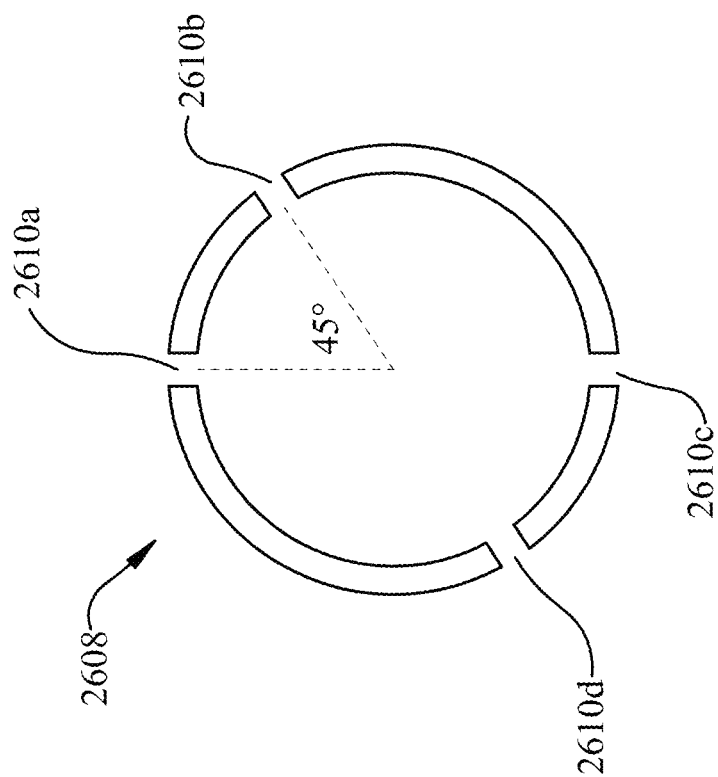
FIG. 36b is an illustration of a second example profile of a knock-out comprising a first pair of bridges that are separated by an angle of 45° and a second pair of bridges opposite the first pair of bridges that are separated by the same angle.
Figure 36A:
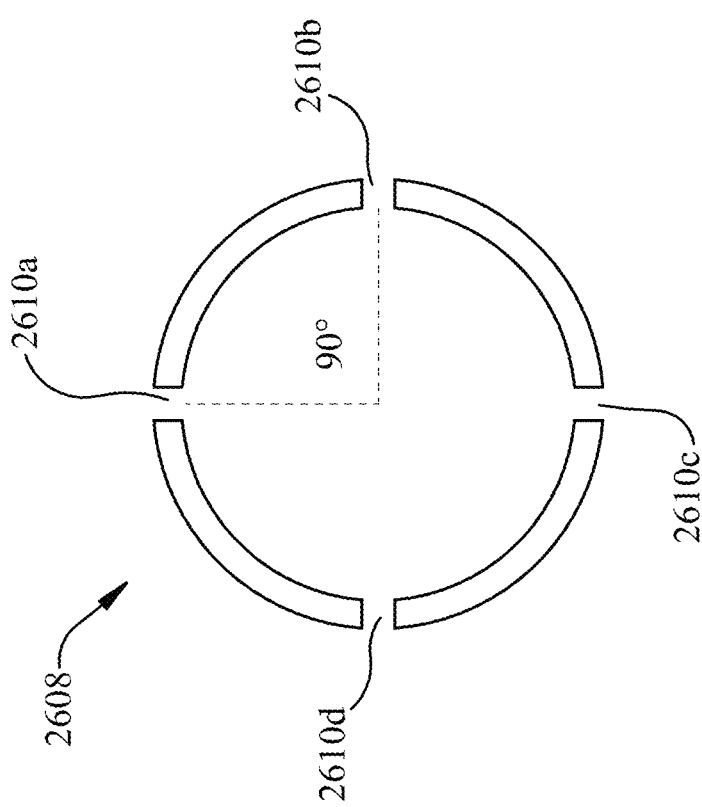
FIG. 36a is an illustration of a first example profile of a knock-out in having bridges that are spaced at 90°.

FIG. 36*a* is an illustration of a first example profile of knock-out 2608. In this example, bridges 2610 are located at 90° intervals around the circular profile of knock-out 2608, as indicated by the dotted lines (the knock-outs depicted in FIG. 21 conform to this embodiment). Typically, when opening a knock-out 2608, two adjacent bridges 2610 are cut, and the installer may attempt to break the remaining two adjacent bridges 2610 by bending the material to be removed about the remaining bridges 2610 until the remaining bridges 2610 break. However, the 90° separation between the adjacent bridges 2610 may inhibit this bending action by limiting the swing of the bend. A larger bending swing could be achieved if the two adjacent bridges 2610 were closer together along the cut profile. Accordingly, one or more embodiments of the main housing 304 can comprise knock-outs 2608 in which the bridges do not conform to the 90° separation depicted in FIG. 36*a*.

FIG. 36*b* is an illustration of a second example profile of knock-out 2608 in which the bridges 2610 comprise a first pair of bridges 2610*a* and 2610*b* that are separated by an angle of less than 90° (e.g., 45° in the illustrated example), and a second pair of bridges 2610*c* and 2610*d* opposite the first pair of bridges 2610*a* and 2610*b* that are separated by the same angle. With this configuration, after two adjacent bridges have been cut (e.g., bridges 2610*a* and 2610*b*), the removable material can be flexed more easily about the remaining two adjacent bridges (e.g., bridges 2610*c* and 2610*d*) until the remaining two bridges 2610 disconnect from the main housing 304.

Compared to the configuration depicted in FIG. 36*a*, the knock-out configuration depicted in FIG. 36*b* rotates the east and west bridges 2610*b* and 2610*d* in a counterclockwise direction about the cut profile of the knock-out 2608, bringing those bridges 2610*b* and 2610*d* closer to the north and south bridges 2610*a* and 2610*c*, respectively. This reduces the span between the two adjacent bridges 2610*a* and 2610*b*, and between adjacent bridges 2610*c* and 2610*d*, allowing the removable knock-out disk to be more easily flexed and removed after the first two bridges 2610 have been cut.

Figure 37:
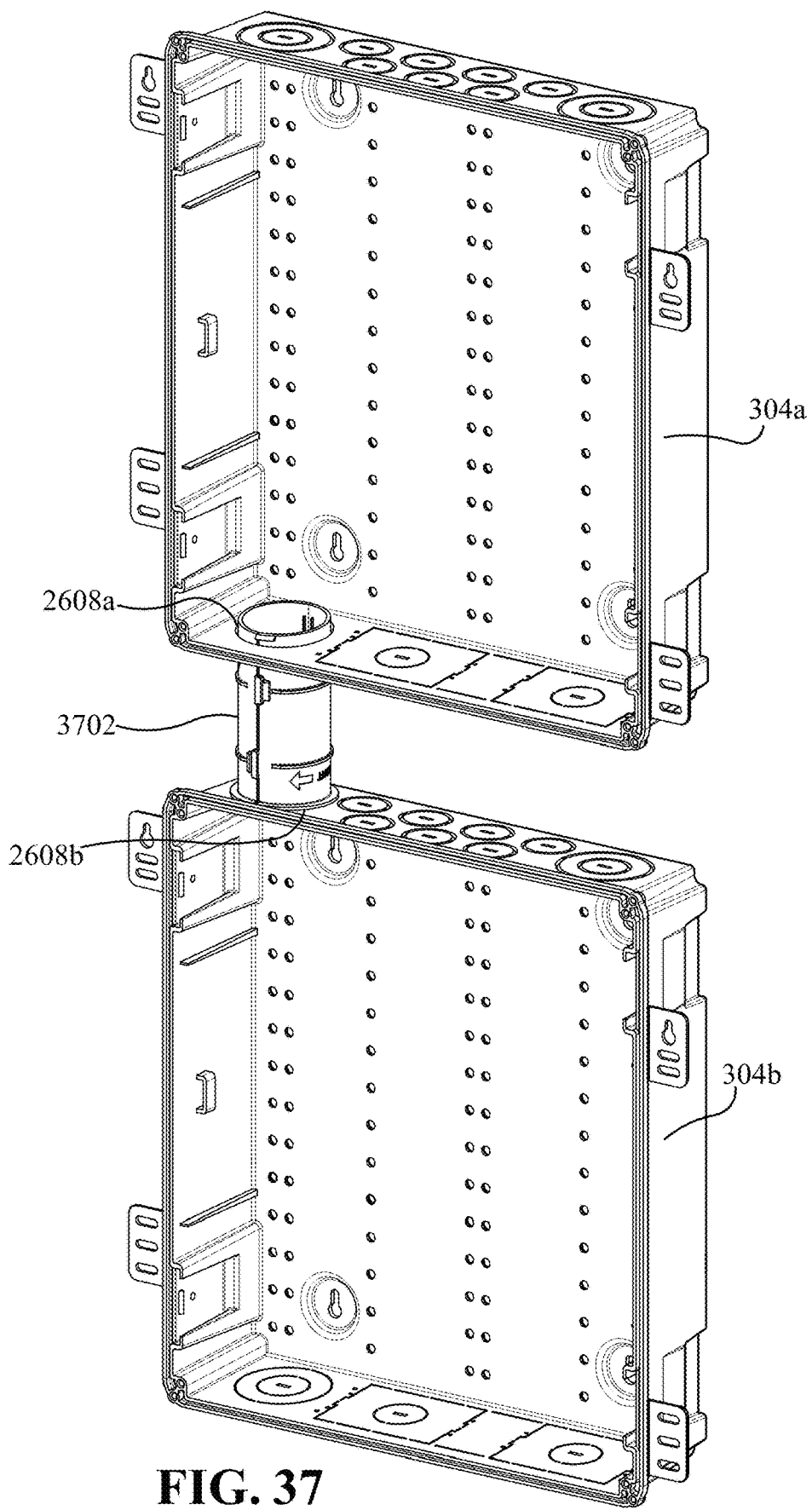
FIG. 37 is an illustration of two main housings that are mounted in a stacked configuration and connected by a hollow connecting tube.

The orientation of the knock-outs 2608 on enclosure main housings 304 can allow multiple main housings 304 to be stacked, with connecting tubes or conduits running between the stacked main housings 304. FIG. 37 is an illustration of two main housings 304*a* and 304*b* that are mounted in a stacked configuration and connected by a hollow connecting tube 3702. In this illustrated example, main housing 304*a* is mounted above main housing 304*b*. One of the knock-outs 2608*a* on the bottom of main housing 304*a* has been removed, and knock-out 2608*b* on the top side of main housing 304*b* has also been removed. When main housings 304*a* and 304*b* are substantially aligned vertically, knock-outs 2608*a* and 2608*b* are also aligned. Hollow connecting tube 3702 has been installed between the two knock-outs 2608*a* and 2608*b*, providing an enclosed passageway between the two main housings 304*a* and 304*b*.

Figure 38A:
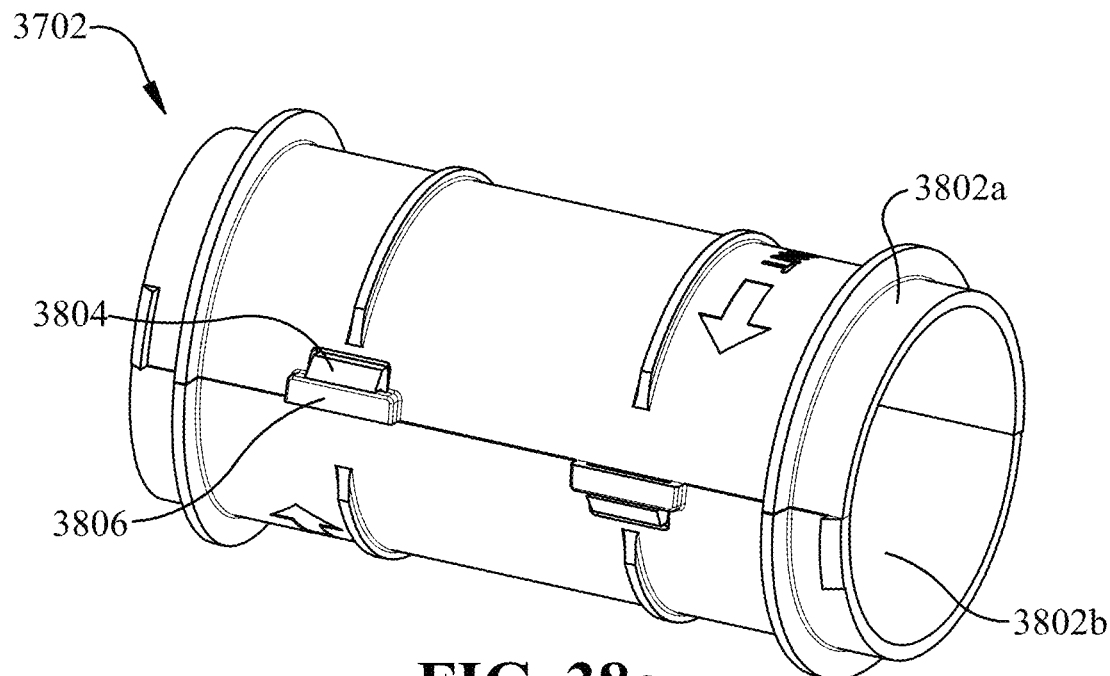
FIG. 38a is a view of an example connecting tube.
Figure 38B:
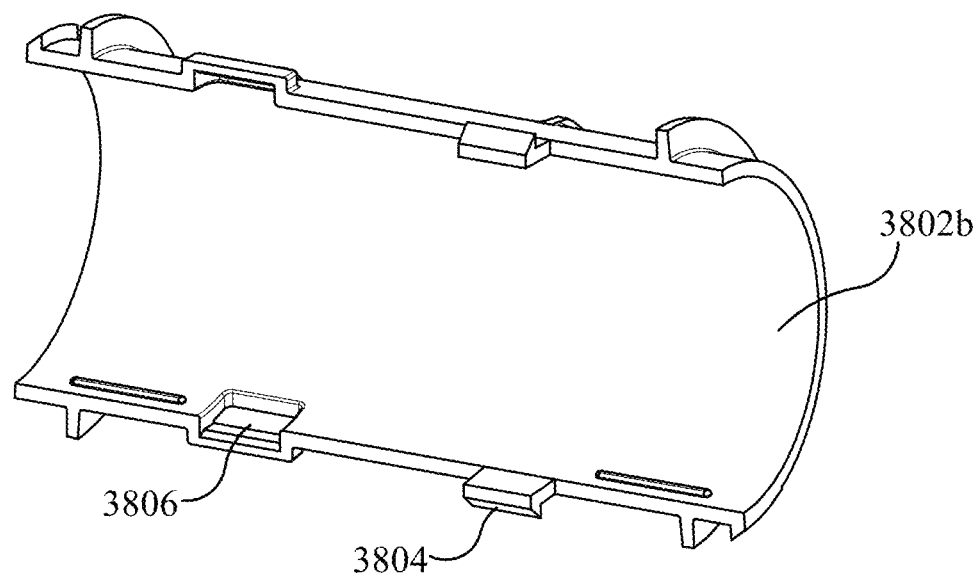
FIG. 38b is a view of one of the two parts that make up the example connecting tube.

FIG. 38*a* is a view of connecting tube 3702 according to one or more embodiments. In this embodiment, connecting tube comprises two identical half-cylindrical parts 3802*a* and 3802*b* that snap together to form the cylindrical connecting tube 3702. FIG. 38*b* is a view of one of the two parts 3802*b* (part 3802*a* is identical to part 3802*b*). Each part 3802 comprises a pair of latches 3804 and a pair of complementary engagement features 3806. Each latch 3804 of one of the parts 3802*a* is configured to engage with a corresponding engagement feature 3806 of the other part 3802*b*, which holds the two parts 3804*a* and 3804*b* together forming connecting tub 3702. Other embodiments of connecting tube 3702 are also within the scope of this disclosure.

Figure 39A:
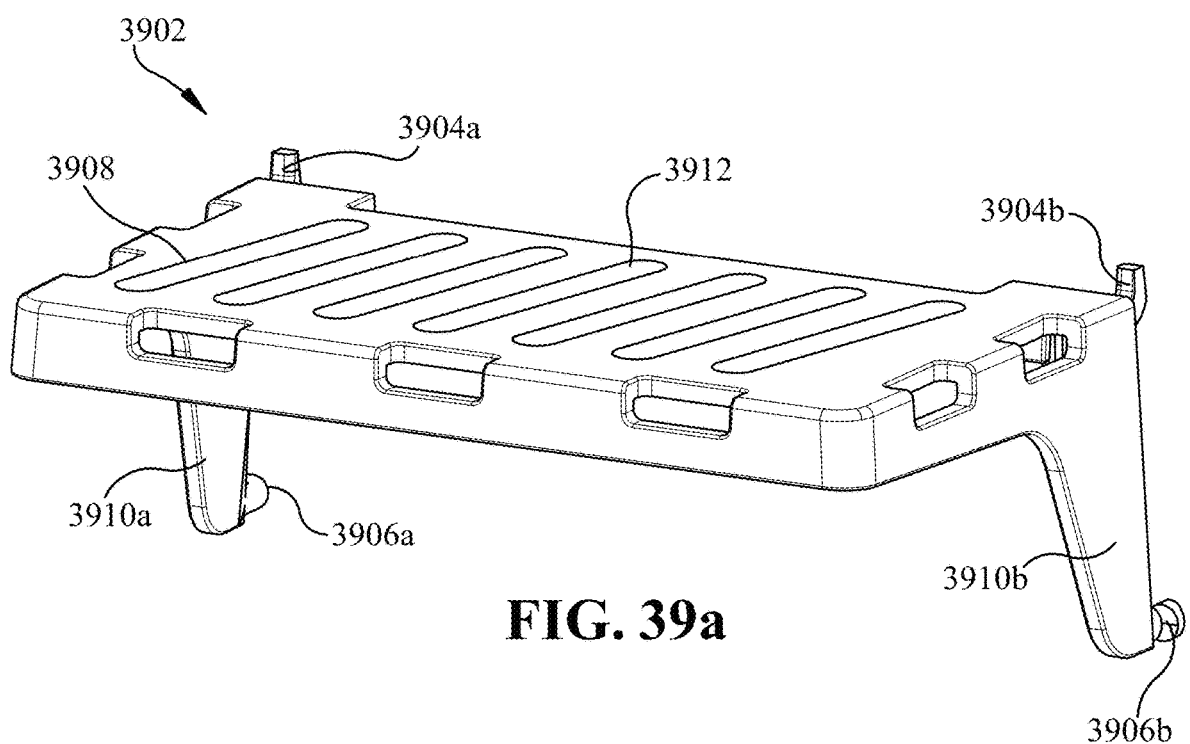
FIG. 39a is a perspective view of an example shelf that can be installed in the main housing of an enclosure.
Figure 39B:
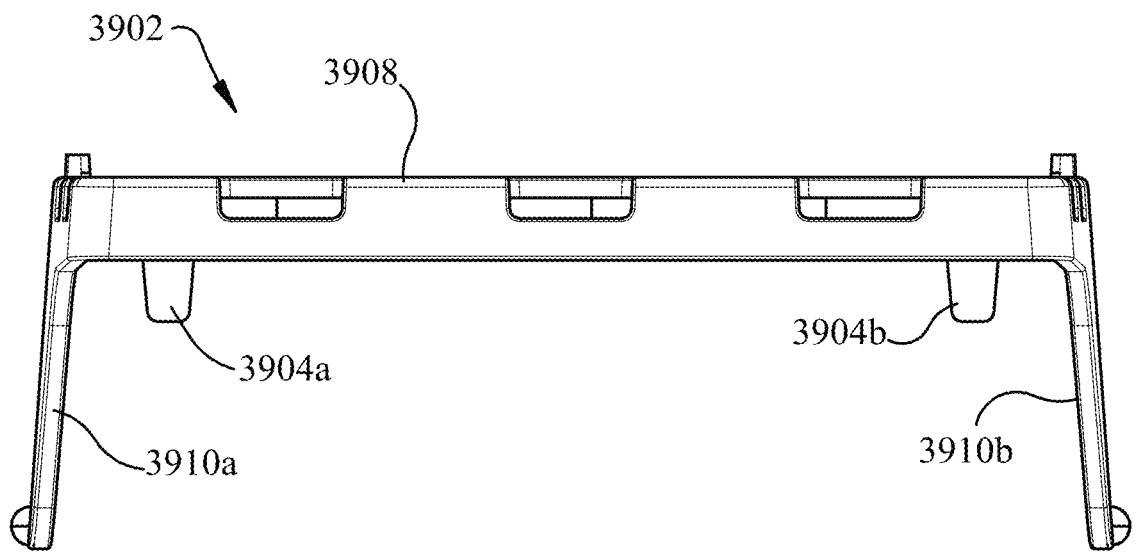
FIG. 39b is a front view of the example shelf.
Figure 39C:
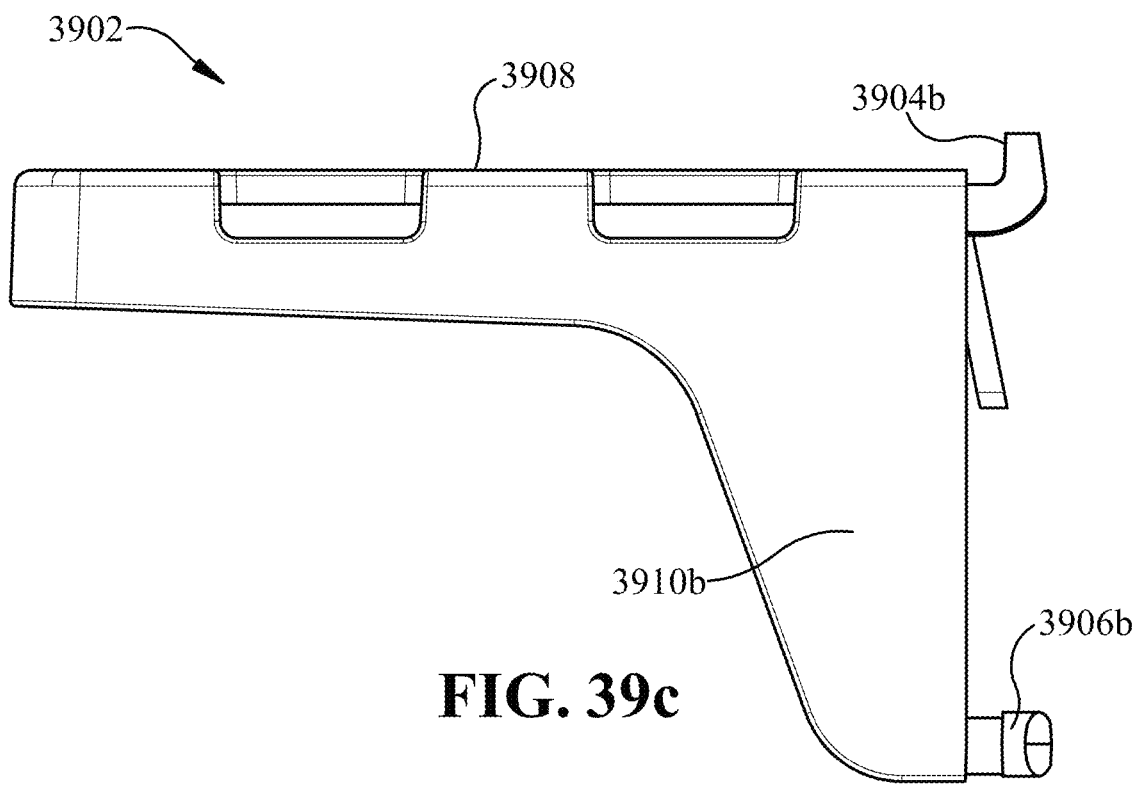
FIG. 39c is a side view of the example shelf.

FIG. 39*a* is a perspective view of an example shelf 3902 that can be installed in the main housing 304 of enclosure 302. FIG. 39b is a front view of the shelf 3902, and FIG. 39c is a side view of the shelf 3902. Shelf 3902 comprises a horizontal flat surface 3908 having a substantially rectangular footprint (although other shelf shapes are also within the scope of one or more embodiments) and two vertical support arms 3910a and 3910b that extend vertically from respective two rear corners of the flat surface 3908. Two upper hooks 3904a and 3904b are formed on respective rear corners of the flat surface 3908 and comprise hook shapes that curve upward. Two lower hooks 3906a and 3906b are formed on the bottom rear corners of the vertical support arms 3910a and 3910b, respectively. Lower hooks 3906a and 3906b comprise hook shapes that curve outward. Shelf 3902 can be installed in the main housing 304 by engaging upper hooks 3904a and 3904b and lower hooks 3906a and 3906b with mounting holes 408 at the rear of the main housing 304, as shown in the perspective view of the main housing 304 depicted in FIG. 41. The pre-formed upper and lower hooks of the shelf 3902 allow the shelf 3902 to be installed without the use of push pins inserted into the mounting holes 408. This yields a secure modular platform on which devices can placed within the enclosure 302. In some embodiments, slots 3912 can be formed on the flat surface 3908, which can be used in conjunction with cable ties, hook-and-loop straps, or other flexible fastening means to secure devices to the shelf 3902.

Figure 40A:
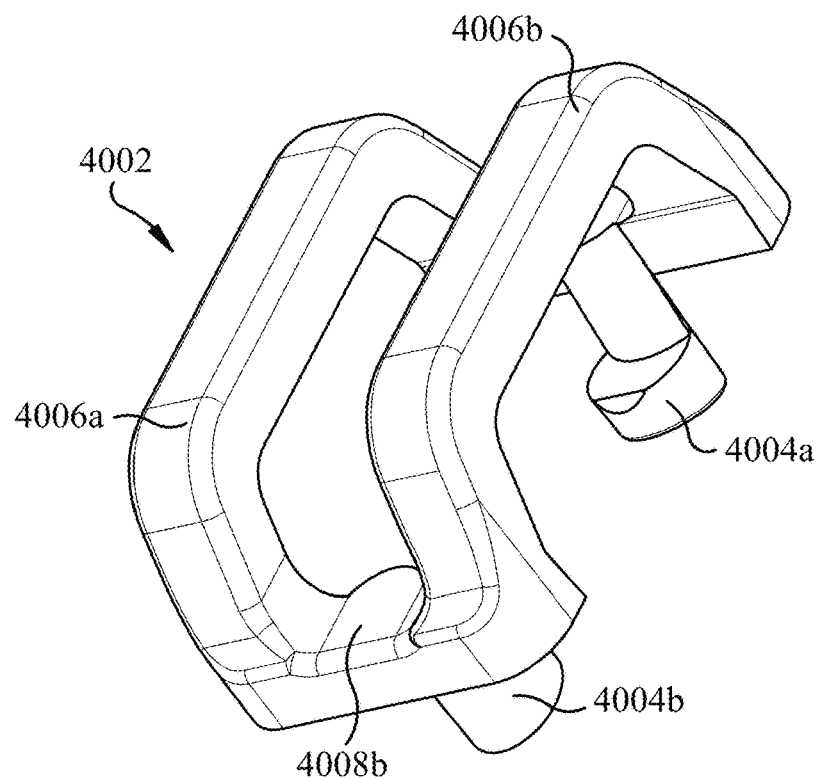
FIG. 40a is a perspective view of an example saddle tie that can be installed in the main housing of an enclosure.
Figure 40B:
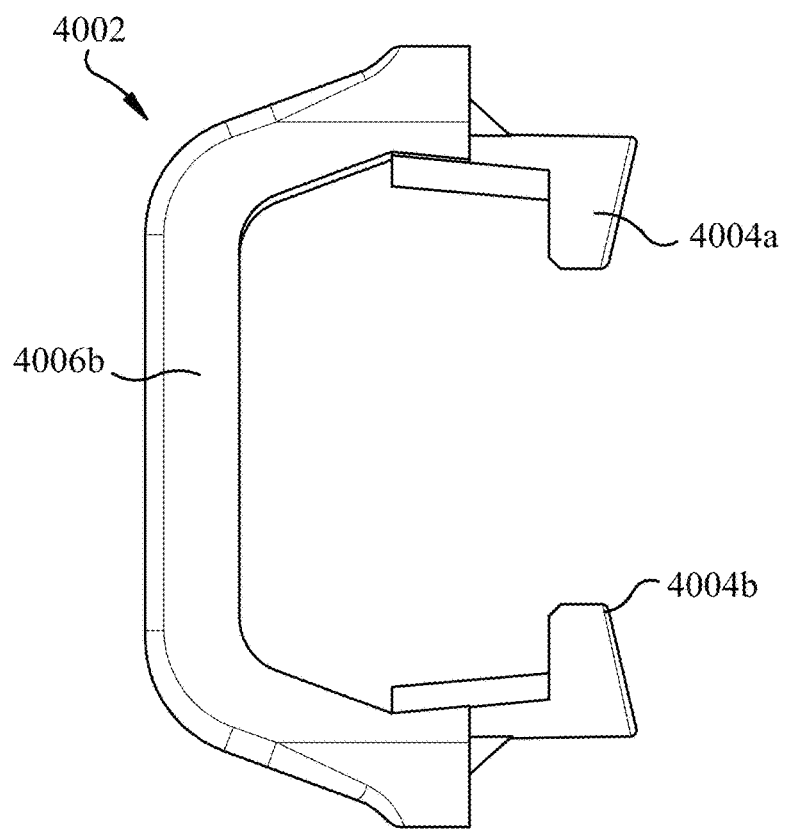
FIG. 40b is a side view of the example saddle tie.
Figure 40C:
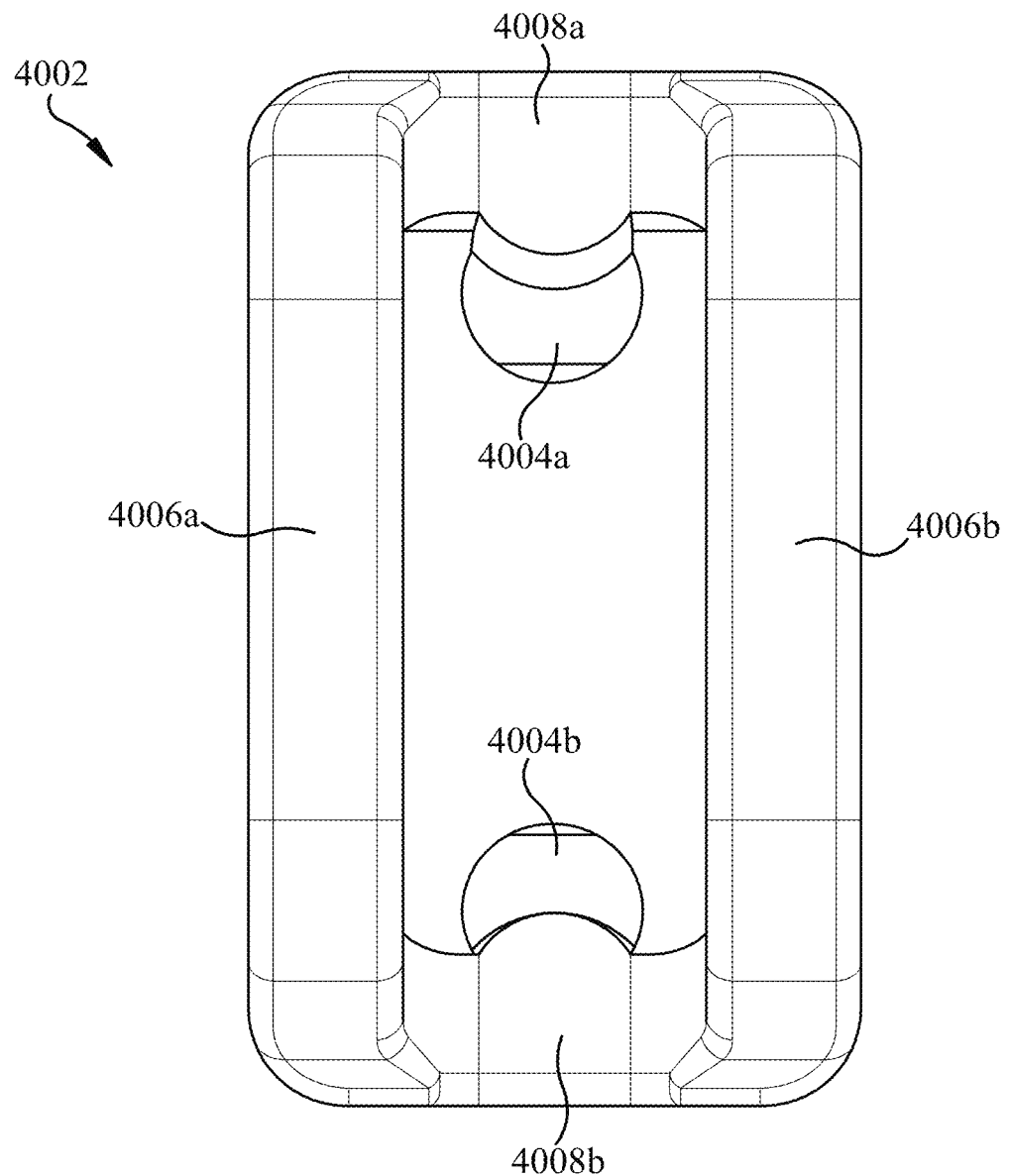
FIG. 40c is a front view of the example saddle tie.
Figure 41:
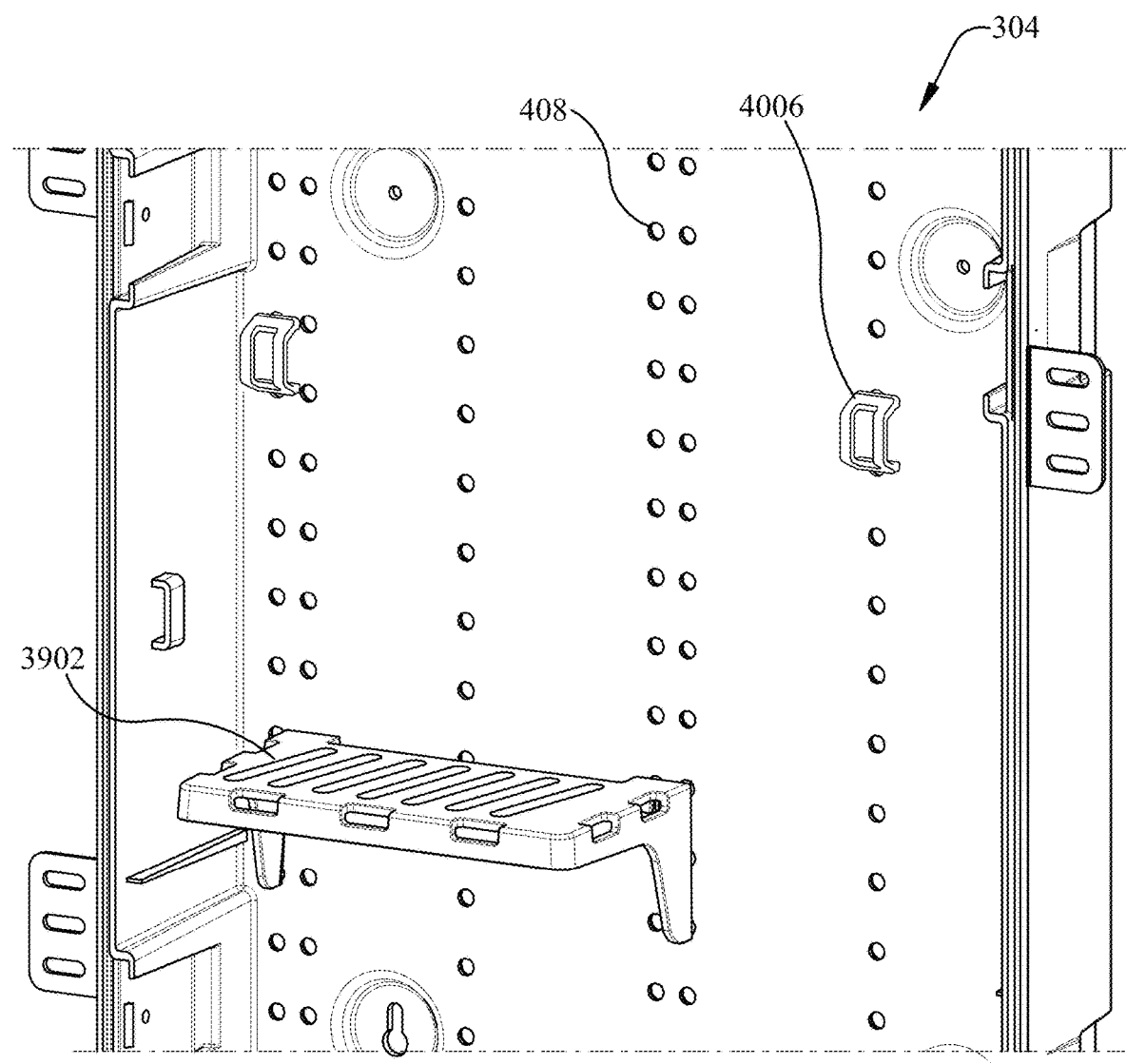
FIG. 41 is a close-up perspective view of an enclosure main housing with a shelf and two saddle ties mounted to the rear wall of the housing.

FIG. 40a is a perspective view of an example saddle tie 4002 that can be installed in the main housing 304 of enclosure 302. FIG. 40b is a side view of the saddle tie 4002, and FIG. 40c is a front view of the saddle tie 4002. Saddle tie 4002 comprises two parallel arches 4006a and 4006b whose adjacent ends are connected by bridges 4008a and 4008b. Two hooks 4004a and 4004b are formed on the bottom of each bridge 4008a and 4008b (facing the direction opposite the arches 4006a and 4006b). Hooks 4004a and 4004b are formed such that their hook shapes face one another. Similar to shelf 3902, saddle tie 4002 can be installed in the main housing 304 by engaging hooks 4004a and 4004b with mounting holes 408 at the rear of the main housing 304, as also shown in FIG. 41. Saddle tie 4002 can be used in conjunction with flexible fastening mechanisms—including but not limited to hook-and-loop straps, cable ties, or other such fasteners—to secure devices, cable bundles, or other equipment to the rear wall of the main housing 304.

Figure 42:
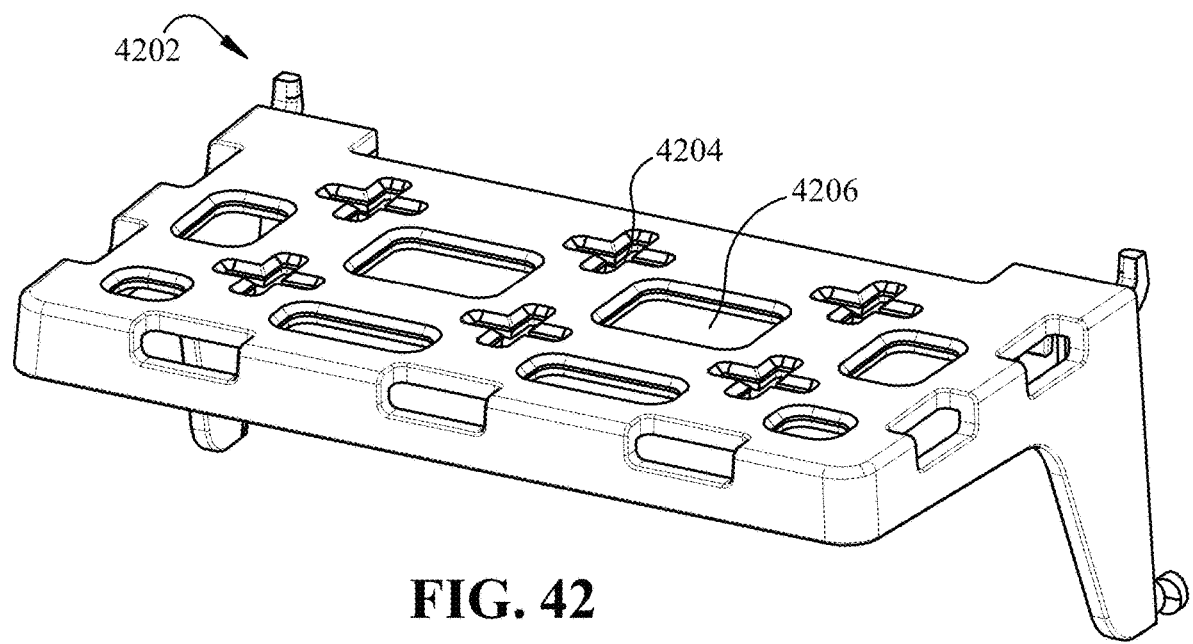
FIG. 42 is a perspective view of another example shelf that can be installed inside main housing.

FIG. 42 is a perspective view of another example shelf 4202 that can be installed inside main housing 304. Shelf 4202 is similar to shelf 3902 depicted in FIGS. 39a-39c, but replaces slots 3912 with cross-shaped perforations 4204 that allow hook-and-loop straps, cable ties, or other flexible mounting mechanisms to be attached to either of two different directions. Shelf 4202 also includes a number of rectangular holes 4206, offering further strapping options. Shelves having other design variations can also be installed in main housing 304.

Figure 43:
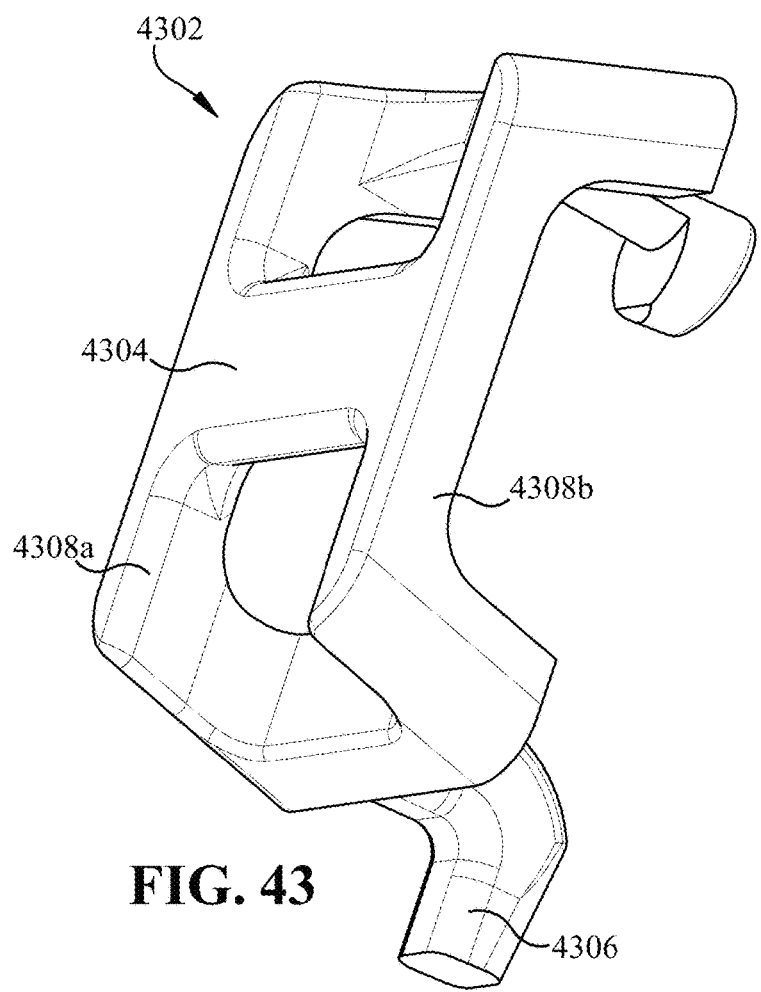
FIG. 43 is a perspective view of another example saddle tie that can be installed in main housing.

FIG. 43 is a perspective view of another example saddle tie 4302 that can be installed in main housing 304. Saddle tie 4302 differs from saddle tie 4002 depicted in FIGS. 40a-40c in that lower hook 4004b of saddle tie 4002, which had a hook shape that faced its opposing upper hook 4004a, is replaced by a downward-facing hook 4306, which can improve engagement strength. Saddle tie 4302 also has a crossbar 4304 that joins the middle sections of arches 4308a and 4308b, which can offer both additional strength and additional strapping options. Other types of saddle ties can also be installed in main housing 304.

Embodiments of the enclosure assembly described herein can simplify installation of wall-mounted electrical enclosures by providing installation features that allow the enclosure door to be installed in a manner that correctly sets the offset of the door to match the thickness of the drywall without the use of tools. Other enclosure features described herein can also yield greater installation flexibility and more efficient cooling of the enclosure's interior.

Figure 44A:
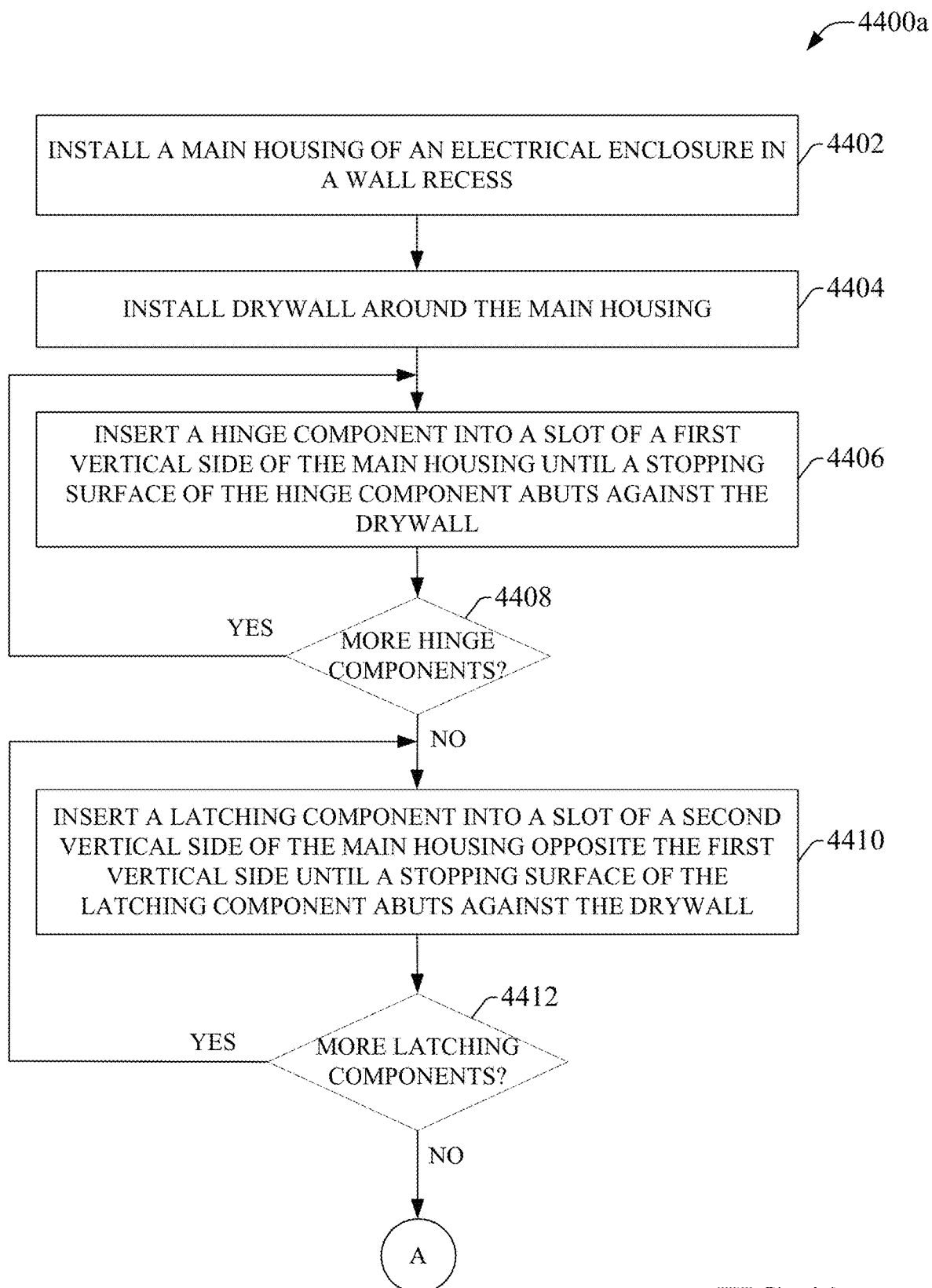
FIG. 44a is a flowchart of a first part of an example methodology for installing a wall-mounted electrical enclosure in a manner that compensates for varying drywall depths.
Figure 44B:
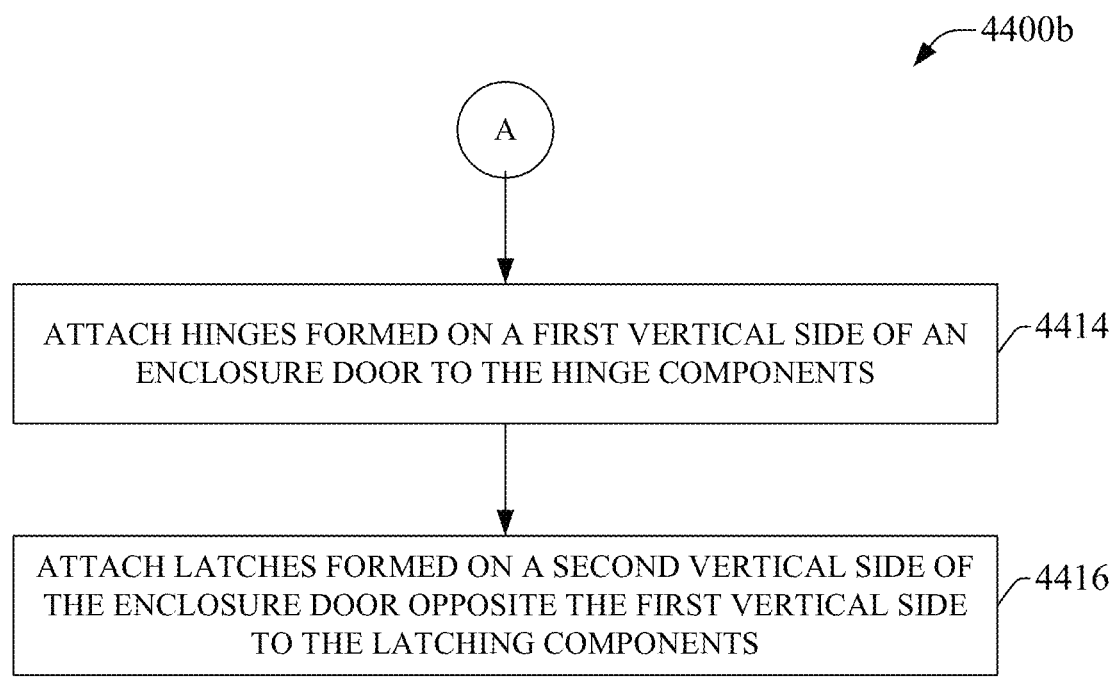
FIG. 44b is a flowchart of a second part of the example methodology for installing a wall-mounted electrical enclosure in a manner that compensates for varying drywall depths.

FIGS. 44a-44b illustrate a methodology in accordance with one or more embodiments of the subject application. While, for purposes of simplicity of explanation, the methodology shown herein is described as a series of steps, it is to be understood and appreciated that the subject innovation is not limited by the order of steps, as some steps may, in accordance therewith, occur in a different order and/or concurrently with other steps from that shown and described herein. For example, those skilled in the art will understand and appreciate that a methodology could alternatively be represented as a series of interrelated states or events, such as in a state diagram. Moreover, not all illustrated steps may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 44a illustrates a first part of an example methodology 4400a for installing a wall-mounted electrical enclosure in a manner that compensates for varying drywall depths. Initially, at 4402, a main housing of an electrical enclosure is installed in a wall recess. Typically, the main housing will be installed prior to installation of drywall; e.g., by attaching side-mounted brackets of the main housing to vertical wall studs. A 4404, drywall is installed around the main housing.

At 4406, a hinge component is inserted into a slot of a first vertical side of the main housing until a stopping surface of the hinge abuts against the drywall. The construction of the slot and the hinge component can be such that the hinge component cannot be retracted from the slot until a release tab or tongue is pressed (e.g., using a ratchetting mechanism for the engagement between the hinge component and the slot). Since the hinge component can be inserted in the slot but cannot be retracted until the hinge component is manually disengaged, the installation depth is adjusted for the depth of the drywall by merely inserting the hinge component into the slot until the stopping surface is flush with the drywall.

At 4408, a determination is made as to whether more hinge components are to be inserted. Typically, two or more hinge components will be inserted into respective two or more slots of the first vertical side of the main housing. If more hinge components are to be installed (YES at step 4408), step 4406 is repeated. If no more hinge components are to be installed (NO at step 4408), the methodology proceeds to step 4410, where a latching component is inserted into a slot of a second vertical side of the main housing opposite the first vertical side until a stopping surface of the latching component abuts against the drywall. In some embodiments, the latching component may have the same construction as the hinge component installed at step 4406, such that the same insertable component can serve as either a hinge component or a latching component. Alternatively, other embodiments may use two different types of insertable components for the hinge component and latching component, respectively. Similar to the hinge component, the latching component cannot be retracted from its slot until a release tab or tongue on the latching component is pressed, thereby disengaging the latching component from the slot.

At 4412, a determination is made as to whether more latching components are to be installed in the second vertical side of the enclosure main housing. If more latching components are to be installed (YES at step 4412), step 4410 is repeated. Typically, two or more latching components will be installed for a given enclosure. If no more latching components are to be installed (NO at step 4412), the methodology proceeds to the second part 4400*b* illustrated in FIG. 44*b*.

At 4412, hinges formed on a first vertical side of an enclosure door are attached to the hinge components, thereby pivotably attaching the door to the main housing. At 4414, latches formed on a second vertical side of the enclosure door opposite the first vertical side are attached to the latching components, thereby holding the door in the closed position.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. An enclosure assembly, comprising:
    a main housing;
    a door comprising a hinge on a first vertical door side and a latch on a second vertical door side; and
    an insertable mounting component configured to be inserted into a slot on a first vertical housing side of the main housing or a second vertical housing side of the main housing,
    wherein
    the insertable mounting component comprises ratchetting teeth that engage with an engagement feature in the slot as the insertable mounting component is inserted into the slot, and
    the insertable mounting component is configured to engage with at least one of the hinge or the latch while inserted in the slot.

2. The enclosure assembly of claim 1, wherein the main housing comprises a rear wall comprising vertically arranged mounting holes.

3. The enclosure assembly of claim 2, wherein the vertically arranged mounting holes comprise at least one single column of vertically arranged mounting holes and at least one pair of columns of vertically arranged mounting holes.

4. The enclosure assembly of claim 2, further comprising a shelf installable on the rear wall.

5. The enclosure assembly of claim 4, wherein the shelf comprises
    vertical support arms that extend downward from respective rear corners of the shelf, and
    upper hooks formed on the respective rear corners that are configured to engage with the mounting holes.

6. The enclosure assembly of claim 5, wherein
    the shelf further comprises lower hooks formed on respective lower ends of the vertical support arms, and
    the lower hooks are configured to engage with the mounting holes.

7. The enclosure assembly of claim 2, further comprising a saddle tie installable on the rear wall, the saddle tie comprising two parallel arches having adjacent ends that are connected by bridges.

8. The enclosure assembly of claim 1, wherein
    the main housing comprises a rear wall comprising raised areas on a rear surface of the rear wall, and
    the raised areas maintain a space between the rear surface and a mounting surface.

9. The enclosure assembly of claim 1, wherein
    the main housing comprises a circular knock-out comprising four bridges that attach a removable disk of material to surrounding material of the main housing, and
    a bridge of the four bridges is separated from an adjacent bridge of the four bridges along the circular profile of the knock-out by an angle that is less than 90 degrees.

10. The enclosure assembly of claim 1, wherein the door further comprises one or more first vents on the first vertical door side and one or more second vents on the second vertical door side.

11. The enclosure assembly of claim 10, wherein
    the one or more first vents comprise at least two first vents formed on an upper section of the first vertical door side and a lower section of the first vertical door side, respectively, and
    the one or more second vents comprise at least two second vents formed on an upper section of the second vertical door side and a lower section of the second vertical door side, respectively.

12. An enclosure for housing electrical equipment, comprising:
    a main housing comprising a left vertical housing side and a right vertical housing side, wherein a first slot is formed on the first left vertical housing side and a second slot is formed on the right vertical housing side; and an insertable mounting component configured to be inserted into either of the first slot or the second slot, wherein insertion of the insertable mounting component into the first slot or the second slot causes ratchetting teeth on the insertable mounting component to engage with an engagement feature in the first slot or the second slot, and the insertable mounting component is configured to engage with either of a hinge or a latch attached to a left vertical side of a door or a right vertical side of the door.

13. The enclosure of claim 12, wherein vertically arranged mounting holes are formed on a rear wall of the main housing, and the vertically arranged mounting holes comprise at least one single column of vertically arranged mounting holes and at least one pair of columns of vertically arranged mounting holes.

14. The enclosure of claim 13, further comprising a shelf installable on the rear wall.

15. The enclosure of claim 12, wherein one or more left vents are formed on the left vertical side of the door and one or more right vents are formed on the right vertical side of the door.

16. The enclosure of claim 15, wherein the one or more left vents comprise at least two left vents formed on an upper section of the left vertical side and a lower section of the left vertical side, respectively, and the one or more right vents comprise at least two right vents formed on an upper section of the right vertical side and a lower section of the right vertical side, respectively.

17. An electrical enclosure, comprising:

a door configured to affix to a main housing, the door comprising a hinge on a first vertical side and a latch on a second vertical side; and an insertable mounting component configured to be inserted into a slot on a first vertical housing side of a main enclosure housing or a second vertical housing side of the main enclosure housing, wherein the insertable mounting component is configured to engage with the hinge or the latch, and ratchetting teeth on the insertable mounting component are configured to engage with an engagement feature in the slot as the insertable mounting component is inserted into the slot.

18. The electrical enclosure of claim 17, wherein the door comprises one or more first side-mounted vents formed on the first vertical side and one or more second side-mounted vents formed on the second vertical side.

19. The electrical enclosure of claim 18, wherein the one or more first side-mounted vents comprise at least two first side-mounted vents formed on an upper section of the first vertical side and a lower section of the first vertical side, respectively, and the one or more second side-mounted vents comprise at least two second side-mounted vents formed on an upper section of the second vertical side and a lower section of the second vertical side, respectively.

* * * * *